US012192917B2

(12) United States Patent
Khoshnevisan et al.

(10) Patent No.: US 12,192,917 B2
(45) Date of Patent: *Jan. 7, 2025

(54) TECHNIQUES FOR REPORTING POWER HEADROOM FOR MULTIPLE UPLINK SHARED CHANNEL REPETITIONS

(71) Applicant: QUALCOMM Incorporated, San Diego, CA (US)

(72) Inventors: Mostafa Khoshnevisan, San Diego, CA (US); Yitao Chen, San Marcos, CA (US); Peter Gaal, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,987

(22) Filed: Nov. 7, 2023

(65) Prior Publication Data

US 2024/0172134 A1 May 23, 2024

Related U.S. Application Data

(63) Continuation of application No. 17/390,644, filed on Jul. 30, 2021, now Pat. No. 11,849,409.

(51) Int. Cl.
*H04W 52/36* (2009.01)
(52) U.S. Cl.
CPC ................................ *H04W 52/365* (2013.01)
(58) Field of Classification Search
CPC .................................................. H04W 52/365
See application file for complete search history.

(56) References Cited

U.S. PATENT DOCUMENTS 11,849,409 B2 * 12/2023 Khoshnevisan .... H04W 52/325
2012/0082043 A1   4/2012 Hwang et al.
(Continued)

FOREIGN PATENT DOCUMENTS

WO   WO-2019099634 A1   5/2019
WO   WO-2021022511 A1   2/2021

OTHER PUBLICATIONS

International Search Report and Written Opinion—PCT/US2022/038147—ISA/EPO—Nov. 7, 2022.

*Primary Examiner* — James P Duffy
(74) *Attorney, Agent, or Firm* — Holland & Hart LLP

(57) ABSTRACT

Methods, systems, and devices for wireless communications are described. A user equipment (UE) may be configured to receive control signaling scheduling multiple uplink transmission repetitions including first and second sets of repetitions associated with first and second sounding reference signal (SRS) resource sets, respectively. The UE may determine first and second power headroom (PHR) values for the respective sets of repetitions, where at least the second PHR value is determined in accordance with a first rule as either an actual value based on a transmission power of one of the uplink transmission repetitions or a virtual value based on default transmission power settings, the first rule pertaining to PHR determination for multiple sets of repetitions corresponding to multiple SRS resource sets. The UE may generate a PHR report that includes the first PHR value, the second PHR value, or both, and may transmit the PHR report to the base station.

30 Claims, 20 Drawing Sheets

(56) References Cited

U.S. PATENT DOCUMENTS

| | | |
|---|---|---|
| 2020/0213955 A1 | 7/2020 | Hosseini et al. |
| 2020/0229104 A1 | 7/2020 | Molavianjazi et al. |
| 2021/0037481 A1 | 2/2021 | Kim et al. |
| 2023/0031429 A1 | 2/2023 | Khoshnevisan et al. |
| 2023/0063015 A1 | 3/2023 | Muruganathan et al. |

* cited by examiner

TECHNIQUES FOR REPORTING POWER HEADROOM FOR MULTIPLE UPLINK SHARED CHANNEL REPETITIONS

CROSS REFERENCE

The present Application for Patent is a continuation of U.S. patent application Ser. No. 17/390,644 by KHOSHNEVISAN et al., entitled "TECHNIQUES FOR REPORTING POWER HEADROOM FOR MULTIPLE UPLINK SHARED CHANNEL REPETITIONS," filed Jul. 30, 2021, issued as U.S. Pat. No. 11,849,409 on Dec. 19, 2023, assigned to the assignee hereof, and expressly incorporated by reference herein.

FIELD OF TECHNOLOGY

The following relates to wireless communications, including techniques for reporting power headroom (PHR) for multiple uplink shared channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may report power headroom (PHR) metrics associated with uplink transmissions to improve coordination with the network (e.g., base stations). In cases where a UE is transmitting uplink communications using multiple uplink beams, such as in cases with multiple transmission-reception points (mTRPs), the UE may report separate PHR values for each respective uplink beam. Separately, UEs may also be scheduled to transmit multiple repetitions of physical uplink shared channel (PUSCH) transmissions. For example, a UE may be configured to transmit multiple repetitions of a PUSCH transmission using a first beam, and multiple repetitions of the PUSCH transmission using a second beam. However, some conventional PHR reporting techniques do not specify how to determine and report multiple PHR values when PUSCH repetitions are configured for multiple TRPs.

SUMMARY

The described techniques relate to improved methods, systems, devices, and apparatuses that support techniques for reporting power headroom (PHR) for multiple uplink shared channel repetitions. Generally, the aspects of the present disclosure provide techniques for reporting multiple power headroom (PHR) metrics for different sets of linked physical uplink shared channel (PUSCH) repetitions. In particular, aspects of the present disclosure may enable user equipments (UEs) to support different rules for reporting multiple PHR values for a single component carrier when the component carrier is scheduled for PUSCH repetitions using multiple beams. For example, a UE may be scheduled to perform multiple linked PUSCH transmissions including a first set of linked PUSCH transmissions and a second set of linked PUSCH transmissions. The UE may determine PHR values for each set of linked PUSCH transmissions according to a rule (e.g., pre-configured PHR reporting configuration), and may subsequently report one or more of the PHR values via a single PHR report.

A method for wireless communication at a UE is described. The method may include receiving, from a base station, control signaling scheduling a set of multiple uplink transmission repetitions, the set of multiple uplink transmission repetitions including a first set of repetitions associated with a first sounding reference signal (SRS) resource set and a second set of repetitions associated with a second SRS resource set, determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets, generating a PHR report that includes the first PHR value, the second PHR value, or both, and transmitting the PHR report to the base station.

An apparatus for wireless communication at a UE is described. The apparatus may include at least one processor, memory coupled with the at least one processor, and instructions stored in the memory. The instructions may be executable by the at least one processor to cause the apparatus to receive, from a base station, control signaling scheduling a set of multiple uplink transmission repetitions, the set of multiple uplink transmission repetitions including a first set of repetitions associated with a first SRS resource set and a second set of repetitions associated with a second SRS resource set, determine a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets, generate a PHR report that includes the first PHR value, the second PHR value, or both, and transmit the PHR report to the base station.

Another apparatus for wireless communication at a UE is described. The apparatus may include means for receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set, means for determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets, means for generating a PHR report that includes the first PHR value, the second PHR value, or both, and means for transmitting the PHR report to the base station.

A non-transitory computer-readable medium storing code for wireless communication at a UE is described. The code may include instructions executable by at least one processor to receive, from a base station, control signaling scheduling a set of multiple uplink transmission repetitions, the set of multiple uplink transmission repetitions including a first set of repetitions associated with a first SRS resource set and a second set of repetitions associated with a second SRS resource set, determine a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets, generate a PHR report that includes the first PHR value, the second PHR value, or both, and transmit the PHR report to the base station.

In some examples of the method, apparatuses, and non-transitory computer-readable medium described herein, determining the first PHR value and the second PHR value may include operations, features, means, or instructions for generating the second PHR value as a virtual PHR value in accordance with the first rule which defines the second PHR value as virtual regardless of whether the first PHR value may be actual or virtual.

In some examples of the method, apparatuses, and non-transitory computer-readable medium described herein, determining the first PHR value and the second PHR value may include operations, features, means, or instructions for generating the second PHR value as an actual PHR value in accordance with the first rule which defines the second PHR value as actual based on the first PHR value also being actual.

In some examples of the method, apparatuses, and non-transitory computer-readable medium described herein, determining the first PHR value and the second PHR value may include operations, features, means, or instructions for generating the second PHR value as a virtual PHR value based on one of an ordered pair of sets of default transmission power settings.

In some examples of the method, apparatuses, and non-transitory computer-readable medium described herein, each of the sets of default transmission power settings includes one or more of a reference power level value, a reference pathloss compensation value, a reference pathloss value associated with a reference signal, or a reference closed loop index.

In some examples of the method, apparatuses, and non-transitory computer-readable medium described herein, a first of the ordered pair of sets of default transmission power settings may be associated with the first sounding reference resource set and a second of the ordered pair of sets of default transmission power settings may be associated with the second sounding reference resource set and the method, apparatuses, and non-transitory computer-readable medium may include further operations, features, means, or instructions for selecting the second of the ordered pair for generating the second PHR value as a virtual PHR value based on the second SRS resource set being associated with the virtual value.

Some examples of the method, apparatuses, and non-transitory computer-readable medium described herein may further include operations, features, means, or instructions for selecting a second of the ordered pair of sets of default transmission power settings as the one of the ordered pair of sets of default transmission power settings based on the PHR report including both the first PHR value and the second PHR value.

In some examples of the method, apparatuses, and non-transitory computer-readable medium described herein, determining the first PHR value and the second PHR value may include operations, features, means, or instructions for generating the first PHR value as a virtual PHR value based on each of the first set of repetitions being transmitted in a different transmission time interval as the PHR report.

In some examples of the method, apparatuses, and non-transitory computer-readable medium described herein, generating the PHR report may include operations, features, means, or instructions for generating the PHR report without including the second PHR value based on the first PHR value being virtual.

In some examples of the method, apparatuses, and non-transitory computer-readable medium described herein, determining the first PHR value and the second PHR value may include operations, features, means, or instructions for generating the first PHR value as an actual PHR value based on an uplink transmission repetition of the first set of repetitions being transmitted in a same transmission time interval as the PHR report.

In some examples of the method, apparatuses, and non-transitory computer-readable medium described herein, determining the first PHR value and the second PHR value may include operations, features, means, or instructions for generating the second PHR value as an actual PHR value based on a first uplink transmission repetition of the first set of repetitions being transmitted in a same transmission time interval as the PHR report.

In some examples of the method, apparatuses, and non-transitory computer-readable medium described herein, determining the first PHR value and the second PHR value may include operations, features, means, or instructions for generating the second PHR value based on a transmission power associated with an uplink transmission repetition of the second set of repetitions which may be closest in time to the same transmission time interval in which the PHR report may be transmitted.

Some examples of the method, apparatuses, and non-transitory computer-readable medium described herein may further include operations, features, means, or instructions for selecting the uplink transmission repetition of the second set of repetitions based on a preference for repetitions of the second set of repetitions that precede or may be during the same transmission time interval in which the PHR report may be transmitted.

In some examples of the method, apparatuses, and non-transitory computer-readable medium described herein, determining the first PHR value and the second PHR value may include operations, features, means, or instructions for generating the second PHR value as an actual PHR value based on a first uplink transmission repetition of the first set of repetitions being transmitted in a same transmission time interval as the PHR report and based on one or more uplink transmission repetitions of the second set of repetitions preceding or being during the same transmission time interval in which the PHR report may be transmitted.

In some examples of the method, apparatuses, and non-transitory computer-readable medium described herein, determining the first PHR value and the second PHR value may include operations, features, means, or instructions for generating the second PHR value based on a transmission power associated with an uplink transmission repetition of the second set of repetitions which may be closest in time to the same transmission time interval in which the PHR report may be transmitted.

In some examples of the method, apparatuses, and non-transitory computer-readable medium described herein, determining the first PHR value and the second PHR value may include operations, features, means, or instructions for generating the second PHR value as an actual PHR value based on a first uplink transmission repetition of the first set of repetitions being transmitted in a same transmission time interval as the PHR report and based on one or more uplink transmission repetitions of the second set of repetitions being during the same transmission time interval in which the PHR report may be transmitted or during an overlapping transmission time interval that overlaps with the same transmission time interval in which the PHR report may be transmitted.

In some examples of the method, apparatuses, and non-transitory computer-readable medium described herein, determining the first PHR value and the second PHR value may include operations, features, means, or instructions for generating the first PHR value as an actual PHR value based on a transmission power of an earliest uplink transmission repetition of the first set of repetitions in the overlapping transmission time interval or in the same transmission time interval in which the PHR report may be transmitted and generating the second PHR value based on a transmission power associated with an earliest uplink transmission repetition of the second set of repetitions in the overlapping transmission time interval or in the same transmission time interval in which the PHR report may be transmitted.

In some examples of the method, apparatuses, and non-transitory computer-readable medium described herein, transmitting the PHR report to the base station may include operations, features, means, or instructions for transmitting, via the PHR report, one or more bit field values indicating whether the PHR report includes the first PHR value, the second PHR value, or both, for a first component carrier.

In some examples of the method, apparatuses, and non-transitory computer-readable medium described herein, generating the PHR report may include operations, features, means, or instructions for arranging the first PHR value and the second PHR value within the PHR report based on an ordering of the first SRS resource set and the second SRS resource set, where the first PHR value may be first in the PHR report if the ordering includes the first SRS resource set before the second SRS resource set, and where the second PHR value may be first in the PHR report if the ordering includes the second SRS resource set before the first SRS resource set.

In some examples of the method, apparatuses, and non-transitory computer-readable medium described herein, generating the PHR report may include operations, features, means, or instructions for arranging the first PHR value and the second PHR value within the PHR report such that actual PHR values precede virtual PHR values in the PHR report.

In some examples of the method, apparatuses, and non-transitory computer-readable medium described herein, generating the PHR report may include operations, features, means, or instructions for arranging the first PHR value and the second PHR value within the PHR report based on an ordering of an earliest uplink transmission repetition of the first set of repetitions and an earliest uplink transmission repetition of the second set of repetitions.

In some examples of the method, apparatuses, and non-transitory computer-readable medium described herein, the one or more bit field values or one or more additional bit field values indicate whether the first PHR value, the second PHR value, or both, may be actual PHR values or virtual PHR values.

Some examples of the method, apparatuses, and non-transitory computer-readable medium described herein may further include operations, features, means, or instructions for transmitting, to the base station, capability signaling indicating that the UE supports one or more PHR reporting configurations for reporting multiple PHR values per component carrier, where generating the PHR report may be based on the capability signaling.

Some examples of the method, apparatuses, and non-transitory computer-readable medium described herein may further include operations, features, means, or instructions for receiving, from the base station, additional control signaling including an indication of a PHR reporting configuration from the one or more PHR reporting configurations.

Some examples of the method, apparatuses, and non-transitory computer-readable medium described herein may further include operations, features, means, or instructions for transmitting, to the base station, capability signaling indicating that the UE supports reporting multiple actual PHR values via the PHR report, where generating the PHR report may be based on the capability signaling.

Some examples of the method, apparatuses, and non-transitory computer-readable medium described herein may further include operations, features, means, or instructions for transmitting, to the base station, capability signaling indicating that the UE supports a determination of actual PHR values based on uplink transmission repetitions scheduled before transmission of the PHR report, scheduled after transmission of the PHR report, or both, where generating the PHR report may be based on the capability signaling.

A method for wireless communication at a base station is described. The method may include transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set and receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

An apparatus for wireless communication at a base station is described. The apparatus may include at least one processor, memory coupled with the at least one processor, and instructions stored in the memory. The instructions may be executable by the at least one processor to cause the apparatus to transmit, to a UE, control signaling scheduling a set of multiple uplink transmission repetitions, the set of multiple uplink transmission repetitions including a first set of repetitions associated with a first SRS resource set and a second set of repetitions associated with a second SRS resource set and receive, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

Another apparatus for wireless communication at a base station is described. The apparatus may include means for transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set and means for receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

A non-transitory computer-readable medium storing code for wireless communication at a base station is described. The code may include instructions executable by at least one processor to transmit, to a UE, control signaling scheduling a set of multiple uplink transmission repetitions, the set of multiple uplink transmission repetitions including a first set of repetitions associated with a first SRS resource set and a second set of repetitions associated with a second SRS resource set and receive, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

In some examples of the method, apparatuses, and non-transitory computer-readable medium described herein, the first rule defines the second PHR value as virtual regardless of whether the first PHR value may be actual or virtual.

In some examples of the method, apparatuses, and non-transitory computer-readable medium described herein, first rule defines the second PHR value as actual based on the first PHR value also being actual.

In some examples of the method, apparatuses, and non-transitory computer-readable medium described herein, receiving the PHR report may include operations, features, means, or instructions for receiving, via the PHR report, one or more bit field values indicating that the PHR report includes the first PHR value and the second PHR value for a first component carrier.

In some examples of the method, apparatuses, and non-transitory computer-readable medium described herein, the first PHR value and the second PHR value may be arranged within the PHR report based on an ordering of the first SRS resource set and the second SRS resource set, the first PHR value may be first in the PHR report if the ordering includes the first SRS resource set before the second SRS resource set, and, and the second PHR value may be first in the PHR report if the ordering includes the second SRS resource set before the first SRS resource set.

In some examples of the method, apparatuses, and non-transitory computer-readable medium described herein, the first PHR value and the second PHR value may be arranged within the PHR report such that actual PHR values precede virtual PHR values in the PHR report.

In some examples of the method, apparatuses, and non-transitory computer-readable medium described herein, the first PHR value and the second PHR value may be arranged within the PHR report based on an ordering of an earliest uplink transmission repetition of the first set of repetitions and an earliest uplink transmission repetition of the second set of repetitions.

In some examples of the method, apparatuses, and non-transitory computer-readable medium described herein, the one or more bit field values or one or more additional bit field values indicate whether the first PHR value, the second PHR value, or both, may be actual PHR values or virtual PHR values.

Some examples of the method, apparatuses, and non-transitory computer-readable medium described herein may further include operations, features, means, or instructions for receiving, from the UE, capability signaling indicating that the UE supports one or more PHR reporting configurations for reporting multiple PHR values per component carrier.

Some examples of the method, apparatuses, and non-transitory computer-readable medium described herein may further include operations, features, means, or instructions for transmitting, to the UE, additional control signaling including an indication of a PHR reporting configuration from the one or more PHR reporting configurations.

Some examples of the method, apparatuses, and non-transitory computer-readable medium described herein may further include operations, features, means, or instructions for receiving, from the UE, capability signaling indicating that the UE supports reporting multiple actual PHR values via the PHR report.

Some examples of the method, apparatuses, and non-transitory computer-readable medium described herein may further include operations, features, means, or instructions for receiving, from the UE, capability signaling indicating that the UE supports a determination of actual PHR values based on uplink transmission repetitions scheduled before transmission of the PHR report, scheduled after transmission of the PHR report, or both.

DETAILED DESCRIPTION

Figure 1:
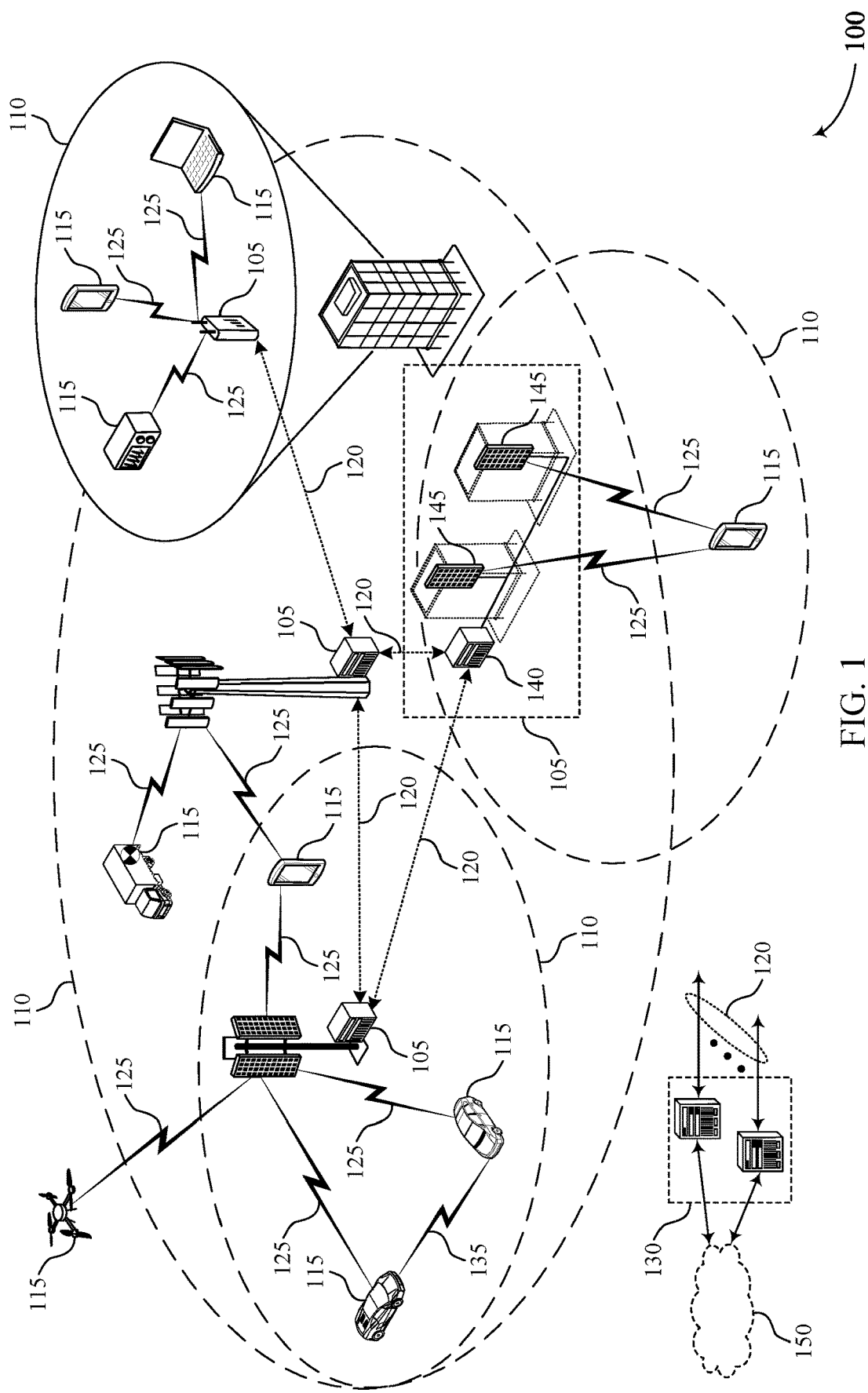
FIG. 1 illustrates an example of a wireless communications system that supports techniques for reporting power headroom (PHR) for multiple uplink shared channel repetitions in accordance with aspects of the present disclosure.

In some wireless communications systems, user equipments (UEs) may report power headroom (PHR) metrics associated with uplink transmissions to improve coordination with the network (e.g., base stations). In cases where a UE is transmitting uplink communications using multiple uplink beams, such as in cases with multiple transmission-reception points (mTRPs), the UE may report separate PHR values (e.g., PHR metrics) for each respective uplink beam. Separately, UEs may also be scheduled to transmit multiple repetitions of physical uplink shared channel (PUSCH) transmissions. For example, a UE may be configured to transmit multiple repetitions of a PUSCH transmission using a first beam, and multiple repetitions of the PUSCH transmission using a second beam.

However, some conventional PHR reporting techniques do not specify how to determine and report multiple PHR values when PUSCH repetitions are configured for multiple TRPs. Moreover, conventional PHR reporting techniques do not specify which PUSCH transmissions from a set of linked PUSCH transmissions should be used as the basis for a reported PHR value, or whether UEs should report actual or virtual PHR values (e.g., actual PHR values determined based on a transmission power of an actual uplink transmission, or virtual values determined based on default transmission power settings). Further, some PHR reporting techniques do not define how multiple PHR values are to be organized within a single PHR report.

Accordingly, to improve PHR reporting at a UE, aspects of the present disclosure provide techniques for reporting multiple PHR values for different sets of linked PUSCH repetitions. In particular, aspects of the present disclosure may enable UEs to support different rules for reporting multiple PHR values for a single component carrier when the component carrier is scheduled for PUSCH repetitions using multiple beams. For example, a UE may be scheduled to perform multiple linked PUSCH transmissions including a first set of linked PUSCH transmissions and a second set of linked PUSCH transmissions. The UE may determine PHR values for each set of linked PUSCH transmissions according to a rule (e.g., pre-configured PHR reporting configuration), and may subsequently report one or more of the PHR values via a single PHR report.

In some aspects, each rule for reporting PHR values defines which PUSCH transmission from each set of linked PUSCH transmissions is to be used to determine the PHR value for the set, and whether reported PHR values can/should include actual or virtual PHR values. In some aspects, PHR reports transmitted by a UE to the network may include indicators or fields which indicate a relative order of reported PHR values, and whether each reported PHR value includes an actual or virtual PHR value. The UE may indicate whether it supports certain PHR reporting configurations via UE capability signaling.

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for reporting PHR for multiple uplink shared channel repetitions.

FIG. 1 illustrates an example of a wireless communications system 100 that supports techniques for reporting PHR for multiple uplink shared channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for reporting multiple PHR values for different sets of linked PUSCH repetitions. In particular, aspects of the present disclosure may enable UEs 115 of the wireless communications system 100 to support different rules for reporting multiple PHR values for a single component carrier when the component carrier is scheduled for PUSCH repetitions using multiple beams. For example, a UE 115 may be scheduled to perform multiple linked PUSCH transmissions including a first set of linked PUSCH transmissions and a second set of linked PUSCH transmissions. The UE 115 may determine PHR values for each set of linked PUSCH transmissions according to a rule (e.g., pre-configured PHR reporting configuration), and may subsequently report one or more of the PHR values via a single PHR report.

In some aspects, each rule for reporting PHR values defines which PUSCH transmission from each set of linked PUSCH transmissions is to be used to determine the PHR value for the set, and whether reported PHR values can/ should include actual or virtual PHR values. In some aspects, PHR reports transmitted by a UE 115 to the network (e.g., base station 105 of the wireless communications system 100) may include indicators or fields which indicate a relative order of reported PHR values, and whether each reported PHR value includes an actual or virtual PHR value. The UE 115 may indicate whether it supports certain PHR reporting configurations via UE capability signaling.

Techniques described herein may provide for improved PHR reporting in the context of linked PUSCH transmissions associated performed using multiple beams at a UE 115 (e.g., mTRP). In particular, aspects of the present disclosure may enable UEs 115 to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting at UEs 115, and may reduce a quantity of signaling used for PHR reporting, which may lead to reduced control signaling and more efficient utilization of resources.

Figure 2:
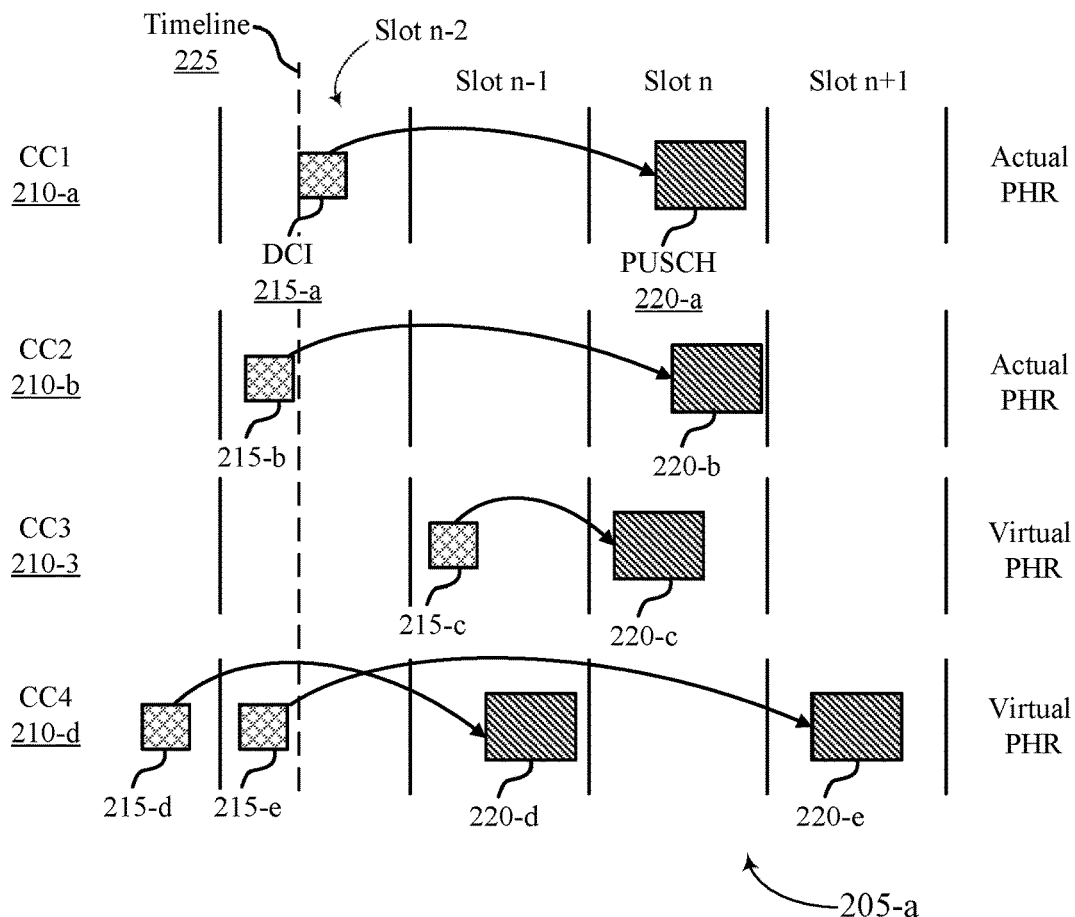
FIG. 2 illustrates an example of a resource configuration that supports techniques for reporting PHR for multiple uplink shared channel repetitions in accordance with aspects of the present disclosure.
Figure 2:
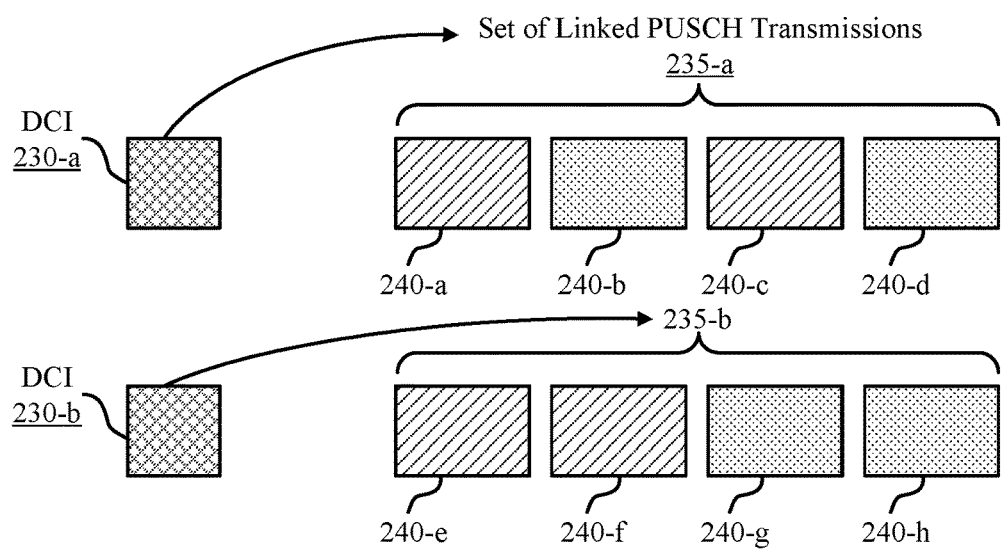

FIG. 2 illustrates an example of a resource configuration 200 that supports techniques for reporting PHR for multiple uplink shared channel repetitions in accordance with aspects of the present disclosure. Aspects of the resource configuration 200 may implement, or be implemented by, wireless communications system 100.

As noted previously herein, in some wireless communications systems, UEs 115 may be configured to report PHR values associated with uplink transmissions to improve coordination with the network (e.g., base stations). In some cases, PHR values may indicate how much additional transmit power may be used by reporting a transmit power for a PUSCH transmission relative to a maximum transmit power which may be used. For example, PHR values may be reported according to Equation 1 below:

$$P_{PUSCH,b,f,c}(i, j, q_d, l) = \quad (1)$$
$$\min \left\{ \begin{array}{c} P_{CMAX,f,c}(i) \\ P_{O_{PUSCH},b,f,c}(j) + 10\log_{10}(2^\mu \cdot M_{RB,b,f,c}^{PUSCH}(i)) + \ldots \end{array} \right\}$$
$$\{ \ldots + \alpha_{b,f,c}(j) \cdot PL_{b,f,c}(q_d) + \Delta_{TF,b,f,c}(i) + f_{b,f,c}(i, l) \}$$

where $P_O$ (from the term $P_{O_{PUSCH},b,f,c}(j)$) is a value for controlling received power level (e.g., reference power level value), α (from the term $\alpha_{b,f,c}(j)$) is a value for partial pathloss compensation (e.g., reference pathloss compensation value), and PL (from term $PL_{b,f,c}(q_d)$) is a pathloss value based on measured downlink reference signals with an index $q_d$ (e.g., reference pathloss value associated with a reference signal). Further, the term $\Delta_{TF,b,f,c}(i)$ may depend on resource allocation and modulation and coding scheme (MCS) of PUSCH transmissions, and the term $f_{b,f,c}(i,l)$ may be associated with closed loop power control based on transmission power control (TPC) commands with closed loop index l.

A PUSCH transmission may be configured with a set of uplink power control parameters. Further, whether there are two separate loops for closed loop power control may be dependent upon whether two PUSCH-PC-AcjustmentStates are configured. If so, TPC commands may be applied separately for the two respective closed power control loops. When reporting PHR values for PUSCH transmissions, and with reference to Equation 1 above, $P_O$ and α values may be defined for open loop power control (e.g., $P_O$-AlphaSets), where each member in the set has an identifier (e.g., $P_O$-PUSCH-AlphaSetID: 0, 1, . . . , 29). Each member of the list may have an identifier for pathloss reference signals (e.g., pusch-PathlossReferenceRS-ID: 0, 1, . . . , 3). Further each member of the list may have an identifier for sounding reference signal (SRS) resource indicator (SRI) to PUSCH mapping (e.g., sri-PUSCH-PowerControlId: 0, . . . , 15). In other words, a network may support up to sixteen (e.g., 0 through 15) sets of power control parameters for closed loop power control. Each SRI-PUSCH mapping identifier (sri-PUSCH-PowerControlId) may include multiple parameters including sri-PUSCH-PowerControlId, sri-PUSCH-PathlossRefernceRS-Id, sri-P0-PUSCH-AlphaSetId, and sri-PUSCH-ClosedLoopindex.

In some aspects, sri-PUSCH-PowerControlId may be used as a codepoint of the SRI field in a downlink control information (DCI). In other words, a DCI message which schedules a PUSCH transmission may indicate which set of power control parameters (e.g., which sri-PUSCH-PowerControlId) is to be used for the respective PUSCH transmission. For example, if the value of the SRI field in an uplink DCI message scheduling a PUSCH transmission is x, then the uplink power control parameters (e.g., PL RS, $P_O$, α, closed loop index) corresponding to sri-PUSCH-PowerControlId=x may be used for the scheduled PUSCH transmission. The SRI field within DCI may be up to four bits depending on the respective configurations of the network, which may enable up to sixteen values of x to be indicated (e.g., sixteen sri-PUSCH-PowerControlId values).

Different wireless communications systems (e.g., wireless communications system 100) may support different types of PHR reports for reporting PHR values at a UE 115, including Type 1 for PUSCH transmissions, Type 2 for physical uplink control channel (PUCCH) transmissions, and Type 3 for SRS transmissions. Aspects of the present disclosure are primarily described in the context of Type 1 PHR reports for PUSCH transmissions. However, aspects of the present disclosure may be implemented in the context of other types of PHR reports (e.g., Type 2, Type 3). As such, aspects of the present disclosure should not be regarded as limited to only Type 1 PHR reports, unless noted otherwise herein.

In some implementations, a UE 115 may determine an actual PHR value for a PUSCH transmission performed over a given component carrier or serving cell. As it is used herein, the term "actual PHR value" may refer to a PHR value which is determined based on a transmission power of a PUSCH transmission (e.g., transmission power of an actual uplink transmission repetition). A UE 115 may determine actual PHR values for an actual PUSCH transmission on a given component carrier or serving cell in accordance with Equation 2 below:

$$PH_{type1,b,f,c}(i,j,q_d,l) = P_{CMAX,f,c}(i) - \{P_{O_{PUSCH},b,f,c}(j) + \\ \cdot 10\log_{10}(2^\mu \cdot M_{RB,b,f,c}^{PUSCH}) + \alpha_{b,f,c}(j) \cdot PL_{b,f,c} \\ (q_d) + \Delta_{TF,b,f,c}(i) + f_{b,f,c}(i,l)\}$$

where $P_{CMAX,f,c}(i)$ is a UE-configured maximum output power after backoff due to power management (backoff due to maximum power reduction (MPR)). The remaining parameters of Equation 2 above are the same parameters for determining PUSCH transmit power defined in Equation 1 above.

In additional or alternative implementations, a UE 115 may determine virtual PHR value for a PUSCH transmission performed over a given component carrier or serving cell. As compared to "actual PHR values," which are determined based on a transmission power of an uplink transmissions, the term "virtual PHR value" may refer to a PHR value which is determined based on some "reference" or "virtual" PUSCH transmission using a set of reference or default parameters (e.g., default transmission power settings). A UE 115 may determine virtual PHR values for a reference/virtual PUSCH transmission on a given component carrier or serving cell in accordance with Equation 3 below:

$$PH_{type1,b,f,c}(i,j,q_d,l) = \tilde{P}_{CMAX,f,c}(i) - \{P_{O_{PUSCH},b,f,c}(l) + \\ \cdot + \alpha_{b,f,c}(j) \cdot PL_{b,f,c}(q_d) + f_{b,f,c}(i,l)\}$$

where $\tilde{P}_{CMAX,f,c}(i)$ is computed assuming now backoff (e.g., MPR values assumed to be zero dB). The remaining parameters of Equation 3 above may be determined based on some set of default/reference parameters of j, i, l and $q_d$ where $P_O$ and α are determined according to a default set of parameters for p0-PUSCH-AlphaSetId=0, and PL is determined according to a default parameters corresponding to pusch-PathlossReferenceRS-ID=0 and closed loop index l=0. In this regard, sets of default transmission power settings used to determine virtual PHR values may include, but are not limited to, reference power level values ($P_O$), reference pathloss compensation values (α), reference pathloss values associated with a reference signal (PL), a reference closed loop index (l), or any combination thereof.

When reporting PHR values in the context of uplink carrier aggregation (CA), PHR reporting may be triggered by the MAC layer. Moreover, PHR reporting may be dependent on one or more of the following: a set of timers (e.g., phr-PeriodicTimer, phr-ProhibitTimer), a power change larger than a configurable threshold for PL RS used for power control in any uplink component carrier, an activation of a secondary cell (SCell), and an active BWP of a configured component carrier being changed (e.g., from dormant to non-dormant).

When triggered, PHR reports are to be transmitted/reported in the PHR MAC-CE on a first available PUSCH transmission corresponding to an initial transmission of a transport block that can accommodate the MAC-CE as a result of logical channel prioritization (LCP). PUSCH transmissions for which PHR values can be reported may be dynamic (e.g., scheduled by DCI messages), configured via configured grants, or both. In some cases, a UE 115 may transmit a PHR report which reports PHR value(s) for a single component carrier. Additionally, or alternatively, in cases where a UE 115 is configured with multiple component carriers for PUSCH transmissions, a PHR MAC-CE may include a PHR report for multiple component carriers if "multiple PHR reporting" is enabled (e.g., "multiplePHR" enabled via RRC signaling from the network). In other words, a single PHR report may indicate PHR values for multiple component carriers if the network has enabled multiple PHR reporting. Otherwise, PHR values are reported only for a single component carrier (e.g., component carrier of a primary cell (PCell)), and a single-entry MAC-CE format for the PHR report may be used.

PHR MAC-CE messages (e.g., PHR reports) may include "P" values which indicate whether the AMC entity applies power backoff due to power management (e.g., due to MPR related power backoff), as well as "V" values which indicate whether real or virtual PHR is reported. In some aspects, a corresponding $P_{CMAX}$ field may be present within the PHR MAC-CE only if the reported PHR values include actual PHR values. Further, when reporting PHR values for multiple component carriers (e.g., multiple PHR reporting), a bitmap within the PHR MAC-CE may be used to report PHR values for multiple component carriers (e.g., component carriers other than the PCell).

In the context of multiple PHR reporting (e.g., reporting PHR values for multiple component carriers), reported PHR values may include actual or virtual PHR values for the respective component carriers. For example, in cases where a PHR report on a first component carrier indicates PHR values for the first component carrier and a second component carrier, the PHR values for the second component carrier may include actual PHR values (e.g., PHR values determined based on a transmission power of an actual PUSCH transmissions) or virtual PHR values (e.g., PHR values determined using reference format or default parameter settings). In this example, the type of PHR values reported for the second component carrier (e.g., actual or virtual PHR values) may be based on whether there is a PUSCH transmission on the second component carrier at the time of the PHR reporting (e.g., in the slot/transmission time interval (TTI) of a first PUSCH transmission on the first component carrier). Additionally, the type of PHR values reported for the second component carrier (e.g., actual or virtual PHR values) may be based on whether the PUSCH transmission on the second component carrier is scheduled by a DCI message which satisfies a respective timeline condition. The timeline condition may be based on processing capabilities and required processing times at the UE 115. In cases where the timeline condition is satisfied, actual PHR values may be reported, otherwise virtual PHR values may be reported if the timeline condition is not satisfied.

For example, referring to a resource allocation scheme 205-a illustrated in FIG. 2, a UE 115 may be scheduled via DCI messages 215 to perform multiple PUSCH transmissions 220 within multiple component carriers 210 (e.g., first component carrier 210-a, second component carrier 210-b, third component carrier 210-c, fourth component carrier 210-d). For instance, a first DCI message 215-a received via the first component carrier 210-a may schedule a PUSCH transmission 220-a on the first component carrier 210-a. In this example, PHR may be reported via the PUSCH transmission 220-a in the first component carrier 210-a in slot n. Moreover, multiple PHR reporting may be enabled for the UE 115 (e.g., via RRC signaling). In other words, the PUSCH transmission 220-a may carry MAC-CE PHR values for each of the respective component carriers 210-a, 210-b, 210-c, and 210-d.

In this example, an actual PHR value may be reported for the first component carrier 210-a (e.g., for the PUSCH transmission 220-a). Moreover, an actual PHR value may be reported via the PUSCH transmission 220-a for the second component carrier 210-b (e.g., for the PUSCH transmission 220-b) based on the PUSCH transmission 220-b being scheduled within the same slot as the first PUSCH transmission 220-a carrying the PHR report, and based on a timeline condition 225 being satisfied. The timeline condition 225 may be determined based on a relative timing of the first DCI message 215-a scheduling the first PUSCH transmission 220-a carrying the PHR report. In this regard, actual PHR values may be reported for the second component carrier 210-b based on the second DCI message 215-b being received prior to the timeline condition 225, thereby satisfying the timeline condition and enabling the UE 115 sufficient time to process the DCI message 215-b and compute an actual PHR value for the PUSCH transmission 220-b.

Comparatively, a virtual PHR value (e.g., PHR value determined using default/reference parameters) may be reported for the third component carrier 210-c (e.g., for the PUSCH transmission 220-c). Although the PUSCH transmission 220-c is scheduled in the same slot n as the first PUSCH transmission 220-a carrying the PHR report, the DCI message 215-c does not satisfy the timeline condition 225. Stated differently, the DCI message 215-c is received after the DCI message 215-a, which may not enable the UE 115 sufficient time to process the DCI message 215-c and determine actual PHR for the PUSCH transmission 220-c. As such, the timeline condition 225 for the third component carrier 210-c is not satisfied, and the UE 115 may therefore report a virtual PHR value for the third component carrier 210-a via the PHR report transmitted via the PUSCH transmission 220-a.

Lastly, one or more virtual PHR values may be reported for the fourth component carrier 210-d. In this example, the timeline condition 225 may be satisfied for the fourth component carrier 210-d due to the fact that the DCI message 215-d and 215-e were received prior to the DCI message 215-a. However, neither the PUSCH transmission 220-d nor the PUSCH transmission 220-e are scheduled in the same slot (slot n) as the first PUSCH transmission 220-a carrying the PHR report. As such, virtual PHR value(s) may be reported for the fourth component carrier 210-d (e.g., for the PUSCH transmissions 220-d, 220-e).

There is a motivation to improve a reliability and robustness for PUSCH transmissions in order to improve a reliability of wireless communications. One such technique for improving uplink reliability and robustness is the use of mTRP or multi-panel transmissions. For example, in the context of mTRP transmissions, a UE 115 may be configured to transmit a first set of PUSCH transmissions (e.g., PUSCH repetitions) using a first beam or first SRS resource set, and a second set of PUSCH transmissions (e.g., PUSCH repetitions) using a second beam or second SRS resource set. The use of different transmit beams/SRS resource sets may improve link diversity, and improve a probability that one of the PUSCH repetitions will be successfully received by the network. For instance, if one link is blocked (e.g., if one transmit beam is interrupted), PUSCH transmissions performed using the other uplink beam may still be successfully received using another TRP.

For example, as shown in a resource allocation scheme 205-b, a UE 115 may receive a DCI message 230-a and a DCI message 230-b which schedule sets of linked PUSCH transmissions 235-a and 235-b, respectively. Each of the respective sets of PUSCH transmissions 235-a and 235-b may include PUSCH repetitions 240 which are associated with a first beam and/or first SRS resource set, and PUSCH repetitions 240 which are associated with a second beam and/or second SRS resource set. In some aspects, PUSCH repetitions 240 associated with the first beam/first SRS resource set may be targeted toward a first TRP at a base station 105, whereas PUSCH repetitions 240 associated with the second beam/second SRS resource set may be targeted toward a second TRP at a base station 105, For example, the first set of PUSCH transmissions 235-a may include a first PUSCH repetition 240-a and a third PUSCH repetition 240-c which are associated with a first uplink beam (first SRS resource set) and/or a first set of uplink power control parameters. Moreover, the first set of PUSCH transmissions 235-a may further include a second PUSCH repetition 240-b and a fourth PUSCH repetition 240-d which are associated with a second uplink beam (second SRS resource set) and/or a second set of uplink power control parameters. Similarly, the second set of linked PUSCH transmissions 235-b includes first and second PUSCH repetitions 240-e and 240-f associated with the first uplink beam/first SRS resource set, and third and fourth PUSCH repetitions 240-g and 240-h associated with the second uplink beam/second SRS resource set. In this regard, the first set of linked PUSCH transmissions 235-a may illustrate an example of a cyclical beam mapping pattern, whereas second set of linked PUSCH transmissions 235-b may illustrate an example of a sequential beam mapping pattern.

Some wireless communications systems may support multiple types of PUSCH repetitions, including Type A and Type B, which may be based on a relative timing of the respective PUSCH transmissions. In PUSCH repetition Type A, different PUSCH transmission occasions (e.g., PUSCH repetitions) corresponding to the same transport block may be transmitted in different slots. Comparatively, in PUSCH repetition Type B, different PUSCH transmission occasions (e.g., PUSCH repetitions) corresponding to the same transport block may be transmitted in mini-slots (e.g., multiple PUSCH repetitions may be transmitted within the same slot). The resource allocation scheme 205-b illustrated in FIG. 2 may be configured as PUSCH repetition Type A or Type B. In some aspects, the number of PUSCH repetitions (e.g., the quantity of PUSCH repetitions 240 within the sets of linked PUSCH transmissions) may be RRC configured, or may be dynamically indicated via time domain resource allocation (TDRA) fields of the respective DCI messages 230-a, 230-b.

In some aspects, each of the respective PUSCH repetitions 240 corresponding to the respective SRS resource sets are transmitted using the same beam (e.g., first uplink beam, second uplink beam). In other words, the SRI field of the DCI message 230-a is applied to each of the PUSCH repetitions 240 corresponding to the respective uplink beams within the set of linked PUSCH transmissions 235-a. As noted previously herein, the SRI is a field in the DCI which determines the beam and uplink power control parameters for PUSCH transmissions by pointing to one or more SRS resources within an SRS resource set.

When different PUSCH repetitions 240 are intended to be received at different TRPs, different panels, and/or different antennas at a base station 105, it may not be preferable to transmit all the PUSCH repetitions 240 using the same beam. For example, as noted previously herein, one of the uplink beams may be blocked, or otherwise experience interference. As such, a reliability of the PUSCH repetitions 240 may be improved by transmitting different PUSCH repetitions 240 using different beams, as shown in the resource allocation scheme 205-b. In particular, scheduled PUSCH repetitions 240 may belong to two or more sets, where each set is associated with its own uplink beam and power control parameters.

For example, referring to the resource allocation scheme 205-b, PUSCH repetitions 240 may correspond to two SRS resource sets, where the DCI messages 230 indicate two different uplink beams and two sets of power control params (e.g., $P_O$, α, PL RS, closed loop index) by two corresponding SRI fields within the respective DCI messages 230. In other words, the DCI message 230-a may include a first SRI field for the PUSCH repetitions 240-a and 240-c corresponding to the first uplink beam and first set of power control parameters, and a second SRI field for the PUSCH repetitions 240-b and 240-d corresponding to the second uplink beam and second set of power control parameters.

Moreover, in some cases, a network may be able to dynamically switch between single TRP (sTRP) communications and mTRP communications. In particular, a field within the DCI message 230 may be used to dynamically switch between sTRP and mTRP. The field for sTRP/mTRP switching may include two bits which indicate which/how many sets of parameters are to be used for the scheduled PUSCH transmissions. For example, a field in the DCI message 230-a may indicate for the UE 115 to transmit scheduled PUSCH transmissions according to one of the following: (1) use only a first set of parameters corresponding to a first TRP (TRP1) for sTRP communications; (2) use only a second set of parameters corresponding to a second TRP (TRP2) for sTRP communications; (3) use both sets of parameters for two sets of repetitions with a first order (TRP1, TRP2) for mTRP communications; or (4) use both sets of parameters for two sets of repetitions with a second order (TRP2, TRP1) mapped to codepoints. The four different options for indicating sTRP/mTRP communications may be mapped to the bit field values {00, 01, 10, and 11} within the respective DCI messages 230-a, 230-b.

Some wireless communications systems (e.g., wireless communications system 100) may support multiple options or implementations for mTRP PUSCH repetitions. In a first implementation, a UE 115 may be configured to calculate one PHR associated with a first PUSCH occasion/transmission which corresponds to an earliest PUSCH repetition that overlaps with the first slot in which the PUSCH carrying the PHR MAC-CE is transmitted. In this regard, referring to the resource allocation scheme 205-b, the UE 115 would only report a single PHR value for the set of linked PUSCH transmissions 235-a.

In a second implementation, the UE 115 may calculate two different PHR values, where each PHR value is associated with a first PUSCH occasion/repetition to each TRP, but only report one of the PHR values. For example, the UE 115 may calculate a first PHR value for the PUSCH repetition 240-a and second PHR value for the PUSCH repetition 240-b, but may only report one of the PHR values. By way of another example, the UE 115 may calculate a first PHR value for the PUSCH repetition 240-e and second PHR value for the PUSCH repetition 240-g, but may only report one of the PHR values. In a third implementation, the UE 115 may calculate two PHR values, where each PHR value is associated with a first PUSCH occasion/repetition to each TRP, and may report both PHR values (e.g., report PHR values for both PUSCH repetitions 240-*a* and 240-*c*, report PHR values for both PUSCH repetitions 240-*e*, 240-*g*). In another implementation, the UE 115 may report PHR values according to legacy (e.g., conventional) PHR reporting techniques.

In cases where the UE 115 reports multiple PHR values (e.g., second implementation above in which the UE 115 reports two PHR values), there may be several complications with PHR reporting that are not addressed, or even contemplated, by previous PHR reporting techniques. For example, in accordance with the second implementation, a UE 115 may calculate two PHR values (at least corresponding to a component carrier that applies mTRP PUSCH repetitions), were each PHR value is associated with a first PUSCH occasion/repetition to each TRP, and may report both PHR values. In this case, conventional PHR reporting techniques do not define how the UE 115 is to report the respective PHR values. Specifically, current PHR reporting techniques do not define whether the UE 115 should calculate actual or virtual PHR values. Moreover, according to current PHR reporting techniques, it is unclear how PHRs are calculated for reporting on other component carriers if multi-cell PHR-MAC-CE is enabled (e.g., if multiple PHR is enabled). Further, there may be some changes to current PHR reporting techniques to enable triggering conditions including the required higher layer parameters as TRP-specific (e.g., phr-PeriodicTimer, phr-ProhibitTimer, phr-Tx-PowerFactorChange), as well as reporting P-MPR and maximum permissible exposure (MPE) per TRP within the same MAC-CE extension.

Accordingly, aspects of the present disclosure provide techniques for reporting multiple PHR values for different sets of linked PUSCH repetitions. Aspects of the present disclosure may enable UEs to support different rules for reporting multiple PHR values for a single component carrier when the component carrier is scheduled for PUSCH repetitions using multiple beams. In particular, aspects of the present disclosure address several of the deficiencies of previous PHR reporting techniques described above. For example, in the context of reporting PHR values for mTRP PUSCH repetitions, aspects of the present disclosure address how PHRs metrics are calculated for reporting (e.g., whether actual or virtual PHR values are calculated for PUSCH repetitions), and how the PHR values are calculated for other component carriers if multi-cell PHR MAC-CE is applied.

Figure 3:
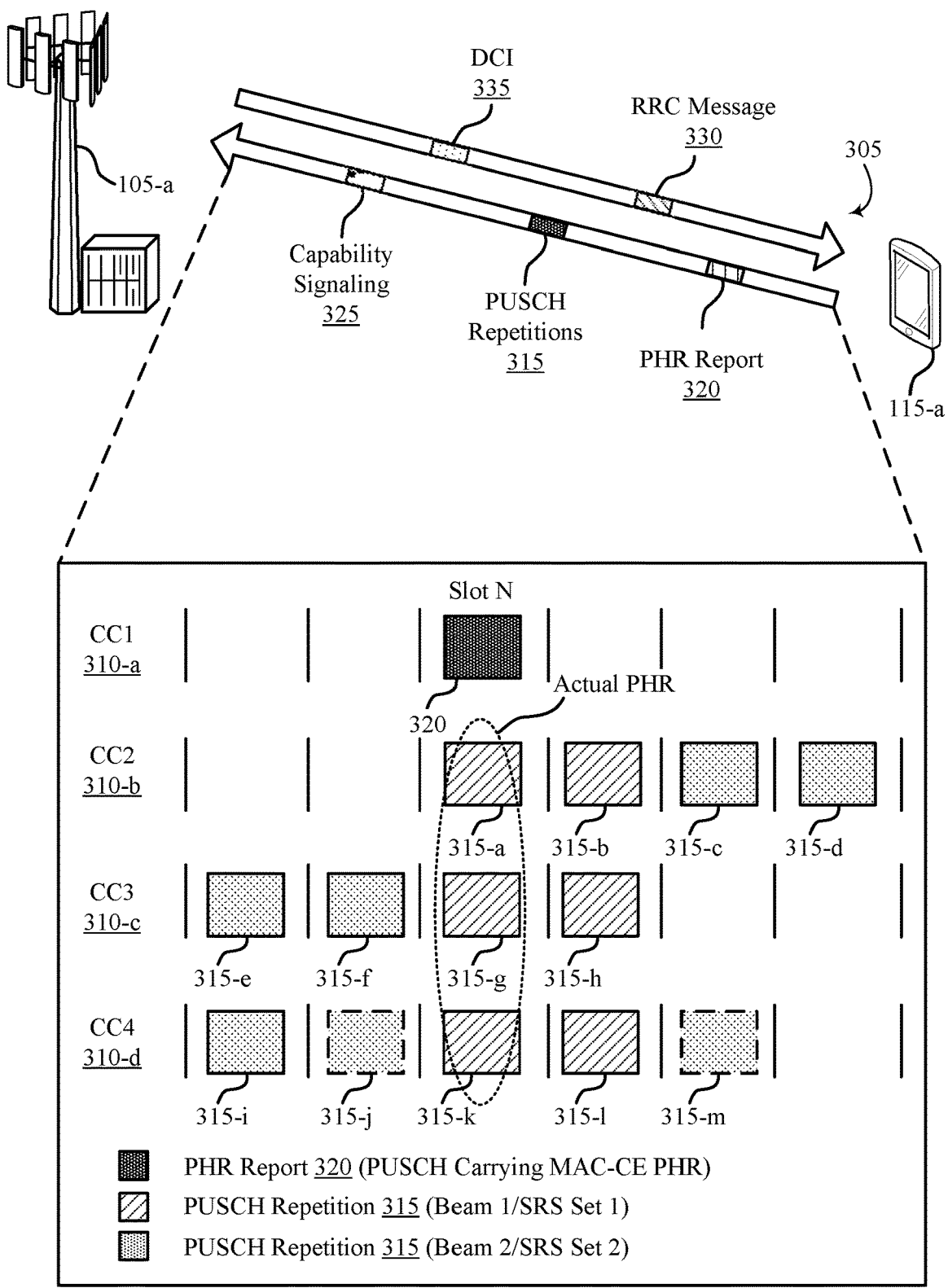
FIG. 3 illustrates an example of a wireless communications system that supports techniques for reporting PHR for multiple uplink shared channel repetitions in accordance with aspects of the present disclosure.

FIG. 3 illustrates an example of a wireless communications system 300 that supports techniques for reporting PHR for multiple uplink shared channel repetitions in accordance with aspects of the present disclosure. In some examples, wireless communications system 300 may implement, or be implemented by, aspects of wireless communications system 100, resource configuration 200, or both. For example, wireless communications system 300 may support techniques for reporting multiple PHR values for different sets of linked PUSCH repetitions, as described in FIGS. 1-2.

The wireless communications system 300 may include a base station 105-*a* and a UE 115-*a*, which may be examples base stations 105 and UEs 115 as described with reference to FIG. 1. The UE 115-*a* may communicate with the base station 105-*a* using a communication link 305, which may be an example of an NR or LTE link between the UE 115-*a* and the base station 105-*a*. In some cases, the communication link 305 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals (e.g., PUSCH transmissions), to the base station 105-*a* using the communication link 305 and the base station 105-*a* may transmit downlink signals, such as downlink control signals or downlink data signals, to the UE 115-*a* using the communication link 305.

As noted previously herein, some UEs 115 may report PHR values associated with uplink transmissions to improve coordination with the network (e.g., base stations 105). In cases where a UE 115 is transmitting uplink communications using multiple uplink beams, such as in cases with mTRPs, the UE 115 may report separate PHR values for each respective uplink beam. Separately, UEs 115 may also be scheduled to transmit multiple PUSCH repetitions. For example, as shown in FIG. 3, the UE 115-*a* may be scheduled to transmit a set of multiple linked PUSCH repetitions 315-*a*, 315-*b*, 315-*c*, and 315-*d* in a component carrier 310-*b*, where PUSCH repetitions 315-*a* and 315-*b* are transmitted using a first beam/first SRS resource set, and where PUSCH repetitions 315-*c* and 315-*d* are transmitted using a second beam/second SRS resource set. Similarly, the UE 115-*a* may be scheduled to transmit a set of linked PUSCH repetitions 315-*e*, 3154, 315-*g*, and 315-*h* and a set of linked PUSCH repetitions 315-*i*, 315-*j*, 315-*k*, and 315-1 in component carriers 310-*c* and 310-*d*, respectively. In each of these examples, the UE 115-*a* may be configured to report one or more PHR values for each of the respective component carriers 310-*b*, 310-*c*, and 310-*d* via a PHR report 320 transmitted in slot n. For example, the UE 115-*a* may be configured to report one or more PHR values for the set of linked PUSCH repetitions 315-*a*, 315-*b*, 315-*c*, and 315-*d* on component carrier 310-*b* via the PHR report 320.

When reporting multiple PHR values for a single component carrier configured with mTRP PUSCH repetitions, there are several complications which are not addressed, or even contemplated, by existing PHR reporting techniques. First, reporting multiple PHR values per component carrier increases processing complexity at the UE 115-*a*, as two PHR values are calculated and reported for a single uplink component carrier 310. Moreover, in cases where both PHR values for a given component carrier 310 include actual PHR values (e.g., PHR values calculated based on an actual PUSCH repetition 315), the UE 115-*a* may be required to calculate one of the PHR values for a PUSCH repetition 315 in the future or in the past, which may further increase processing complexity or memory requirements, respectively. For example, when reporting PHR values for the second component carrier 310-*b* via a PHR report 320 transmitted in a first component carrier 310-*a*, the UE 115-*a* may report an actual PHR value for the PUSCH repetition 315-*a* (based on the PUSCH repetition 315-*a* being scheduled in the same slot n as the PHR report 320), but may be required to calculate an actual PHR value for PUSCH repetition 315-*c* or 315-*d* which is in the future. Such reporting of PHR values based on PUSCH repetitions 315 in the future may result in more complex PHR calculations at the UE 115-*a*.

Further, when performing PHR reporting for mTRP PUSCH repetitions, it may not always be clear whether a second PHR value for a given component carrier 310 should be based on PUSCH repetitions 315 in the future (e.g., PUSCH repetitions 315 in slots which are subsequent to slot n) or in the past (e.g., PUSCH repetitions 315 in slots which precede slot n). For example, referring to the component carrier 310-d, the UE 115-a may report a first actual PHR value associated with PUSCH repetition 315-k based on PUSCH repetition 315-k being scheduled within the same slot n as the PHR report 320. However, according to conventional PHR reporting techniques, it may be unclear whether the UE 115-a should determine the second PHR value based on the PUSCH repetition 315-j in the past (e.g., PUSCH repetition 315-j which is performed prior to slot n), or based on the PUSCH repetition 315-m in the future (e.g., PUSCH repetition 315-m which is performed after slot n).

Lastly, whether the UE 115-a reports one or two PHR values via the PHR report 320 may depend on a presence (or lack thereof) of at least one PUSCH repetition 315 among each set of PUSCH repetitions associated with different beams/SRS resource sets in the slot in which the PHR report 320 is transmitted (e.g., based on a presence/absence of PUSCH repetitions 315 for each beam/SRS resource set in slot n). This makes the payload of the PHR report 320 (PHR MAC-CE) variable and vulnerable to DCI missing errors.

Accordingly, to improve PHR reporting, the UE 115-a and the base station 105-a of the wireless communications system 300 may support techniques for reporting multiple PHR values for different sets of linked PUSCH repetitions 315. In particular, the wireless communications system 300 may support signaling and other configurations which enable the UE 115-a to support different rules for reporting multiple PHR values for a single component carrier 310 when the component carrier 310 is scheduled for PUSCH repetitions 315 using multiple beams. For example, a UE may be scheduled to perform multiple linked PUSCH transmissions including a first set of linked PUSCH transmissions and a second set of linked PUSCH transmissions. The UE may determine PHR values for each set of linked PUSCH transmissions according to a rule (e.g., pre-configured PHR reporting configuration), and may subsequently report one or more of the PHR values via a single PHR report.

For example, in some implementations, the UE 115-a may transmit capability signaling 325 (e.g., UE capability signaling, UE capability report) to the base station 105-a via the communication link 305. The capability signaling may indicate one or more capabilities associated with reporting PHR values which are supported by the UE 115-a. In particular, the capability signaling 325 may indicate various capabilities which are associated with PHR reporting in the context of mTRP PUSCH repetitions.

For example, the capability signaling 325 may indicate whether the UE 115-a supports one or more PHR reporting configurations for reporting multiple PHR values per component carrier. Additionally, or alternatively, the capability signaling 325 may indicate whether the UE 115-a supports reporting two PHR values in one PHR report (e.g., PHR MAC-CE) for a given component carrier, and/or whether the UE 115-a supports reporting two actual PHR values in one PHR report for a given component carrier. In other words, the capability signaling 325 may indicate whether the UE 115-a is capable of reporting multiple PHR values (and types of PHR values) via a single PHR report. Additionally, or alternatively, the capability signaling 325 may indicate whether the UE 115-a supports reporting an actual PHR value for slots that are before or after a slot on which a PHR report is transmitted. In other words, the capability signaling 325 may indicate whether the UE 115-a supports a determination of actual PHR values based on uplink transmission repetitions scheduled before transmission of the PHR report 320 (e.g., in the past) and/or after transmission of the PHR report 320 (e.g., in the future).

In some cases, the network (e.g., base station 105-a) may semi-statically configure the UE 115-a to perform PHR reporting in the case of mTRP PUSCH repetitions. In other words, the base station 105-a may configure the UE 115-a to perform PHR reporting for mTRP PUSCH repetitions based on the various capabilities indicated via the capability signaling 325. The various PHR reporting configurations or rules which may be enabled/triggered by the RRC message 330 may be per BWP of a component carrier, per component carrier 310, per cell group, and the like. In other words, the RRC message 330 may indicate different PHR reporting configurations/rules for different BWPs, different component carriers 310, or different cell groups.

For example, the UE 115-a may receive, from the base station 105-a, control signaling (e.g., an RRC message 330) indicating one or more parameters/characteristics associated with PHR reporting at the UE 115-a. The base station 105-a may transmit the RRC message 330 based on (e.g., in response to) the capability signaling 325. In some aspects, the RRC message 330 may semi-statically configure the UE 115-a to perform PHR reporting in the case of mTRP uplink transmission repetitions. In other words, the base station 105-a may configure the UE 115-a to perform PHR reporting for mTRP uplink transmission repetitions (e.g., PUSCH repetitions) based on the various capabilities indicated via the capability signaling 325.

For instance, in cases where the capability signaling 325 indicates one or more PHR reporting configurations which are supported by the UE 115-a, the RRC message 330 may indicate one of the PHR reporting configurations supported by the UE 115-a which are to be used for PHR reporting. By way of another example, the RRC message 330 may configure the UE 115-a to report one or two PHR values in a single PHR report 320 for a given component carrier 310. In cases where the UE 115-a is configured to report one PHR value per PHR report (or in cases where the UE 115-a is not explicitly configured to report multiple PHR values per PHR report), the UE 115-a may be configured to report one PHR value per PHR report, where the PHR value (actual or virtual PHR value) is determined based on an earliest PUSCH repetition, if any, in the slot carrying the PHR report (e.g., legacy behavior).

By way of another example, the RRC message 330 may configure the UE 115-a to report actual PHR values for PUSCH transmissions in slots which are before and/or after the slot carrying the PHR report 320. In other words, the RRC message 330 may enable or trigger the reporting of actual PHR values which are calculated based on uplink control repetitions which are scheduled before or after transmission of a PHR report 320 (e.g., PUSCH repetitions in the past or future relative to transmission of the PHR report 320).

In some aspects, the UE 115-a may receive control signaling (e.g., a DCI message 335) from the base station 105-a. In some aspects, the DCI message 335 may schedule multiple uplink transmission repetitions (e.g., PUSCH repetitions 315) including a first set of repetitions associated with a first SRS resource set (e.g., first beam), and a second set of repetitions associated with a second SRS resource set (e.g., second beam). For example, as shown in component carrier 310-b in FIG. 2, the UE 115-a may be scheduled to perform multiple PUSCH transmissions including PUSCH repetitions 315-a and 315-b associated with a first beam/first SRS resource set and PUSCH repetitions 315-c and 315-d associated with a second beam/second SRS resource set. In some aspects, the UE 115-a may receive the DCI message 335 based on transmitting the capability signaling 325, receiving the RRC message 330, or both. In some cases, the multiple uplink transmission repetitions (e.g., PUSCH repetitions 315) may include multiple repetitions of the same uplink data message which are scheduled in the same component carrier 310.

Subsequently, the UE 115-a may determine PHR values for the respective sets of uplink transmission repetitions (e.g., PHR values for the PUSCH repetitions 315 corresponding to the respective beams/SRS resource sets). In particular, the UE 115-a may determine a first PHR value for the first set of repetitions associated with the first SRS resource set and a second PHR value for the second set of repetitions associated with the second SRS resource set. For example, referring to component carrier 310-b, the UE 115-b may determine a first PHR value associated with the PUSCH repetitions 315-a, 315-b corresponding to the first SRS resource set and a second PHR value associated with the PUSCH repetitions 315-c, 315-d corresponding to the second SRS resource set. The UE 115-a may be configured to determine the PHR values based on transmitting the capability signaling 325, receiving the RRC message 330, receiving the DCI message 335, or any combination thereof.

In some aspects, the UE 115-a may determine the second PHR value for the second set of repetitions (e.g., second set of PUSCH repetitions 315) in accordance with a rule (e.g., first rule) for determining PHR values. In particular, the rule may be associated with PHR determination for multiple sets of repetitions (e.g., PUSCH repetitions 315) corresponding to multiple SRS resource sets. In other words, the rule may be associated with the determination of PHR values in the case of mTRP uplink transmission repetitions. In some aspects, each of the first PHR value and the second PHR value may include one of an actual PHR value which is based on a transmission power of one of the uplink transmission repetitions (e.g., PUSCH repetitions 315), or a virtual PHR value which is based on a set of default/reference transmission power settings. The default/reference transmission power settings used to determine virtual PHR values may include, but are not limited to, reference power level values ($P_O$), reference pathloss compensation values ($\alpha$), reference pathloss values associated with a reference signal (PL), a reference closed loop index (l), or any combination thereof.

In some cases, as noted previously herein with respect to the resource allocation scheme 205-a illustrated in FIG. 2, a PHR value corresponding to a PUSCH repetition transmitted in the same slot as the PHR report 320 may include an actual PHR value. Otherwise, the PHR value may include a virtual PHR value. For example, the UE 115-b may be configured to determine actual PHR values associated with PUSCH repetitions 315-a, 315-g, and 315-k based on the respective PUSCH repetitions 315-a, 315-g, and 315-k being scheduled within the same slot (slot n) as the PHR report 320. In other cases, in which PUSCH repetitions 315 are not scheduled in the same slot (slot n) as the PHR report 320, the UE 115-b may be configured to generate the first PHR value as a virtual PHR value based on the PHR report being transmitted in a different TTI as each of the PUSCH repetitions 315. In cases in which the first PHR value includes a virtual PHR value, the UE 115-a may be configured to refrain from determining a second PHR value and/or refrain from including the second PHR value within the PHR report. In other words, whether the UE 115-a determines and/or reports the second PHR value may be dependent upon whether the first PHR value is actual or virtual (e.g., if the first PHR value is virtual, the second PHR value is not determined/reported).

According to one rule for determining PHR values for the schedules PUSCH repetitions, a first reported PHR value may include an actual or virtual PHR value, where the second PHR value is always a virtual PHR value. In other words, the UE 115-a may generate the second PHR value as a virtual PHR value in accordance with one rule for determining PHR values which defines the second PHR value as virtual regardless of whether the first PHR value is actual or virtual.

In such cases, the second PHR value may be determined according to a set of default transmission power settings (e.g., reference power level values ($P_O$), reference pathloss compensation values ($\alpha$), reference pathloss values associated with a reference signal (PL), a reference closed loop index (l), or any combination thereof). In some cases, there may be multiple sets of default/reference parameters (e.g., multiple sets of default transmission power settings) which may be used to determine virtual PHR values. For example, a first set of default transmission power settings may be based on {p0-PUSCH-AlphaSetId=0, closedloopindex l=0}. By way of another example, a second set of default transmission power settings may be based on {p0-PUSCH-AlphaSetId=1, pusch-PathlossReferenceRS-Id=1, closedloopindex l=1} if two PUSCH-PC-AdjustmentStates are configured, otherwise {p0-PUSCH-AlphaSetId=1, pusch-PathlossReferenceRS-Id=1, closedloopindex l=0}.

In this regard, the UE 115-b may generate the second PHR value as a virtual PHR value based on one of an ordered pair of sets of default transmission power settings (e.g., one of the first or second set of default transmission power settings). In some cases, and in accordance with the first rule for determining PHR values, the set of default transmission power settings used to determine the second, virtual PHR value may depend on whether the first, actual PHR value is associated with the first or second SRS resource set. In other words, the UE 115-b may use the first or second set of default transmission settings to determine the second, virtual PHR value based on a relative ordering of the SRS resource sets corresponding to the scheduled PUSCH repetitions 315. In particular, the UE 115-a may utilize the second set of default transmission settings if the first PHR value is associated with the first SRS resource set, and may utilize the first set of default transmission settings if the first PHR value is associated with the second SRS resource set. This may be further shown and described with reference to FIG. 4.

Figure 4:
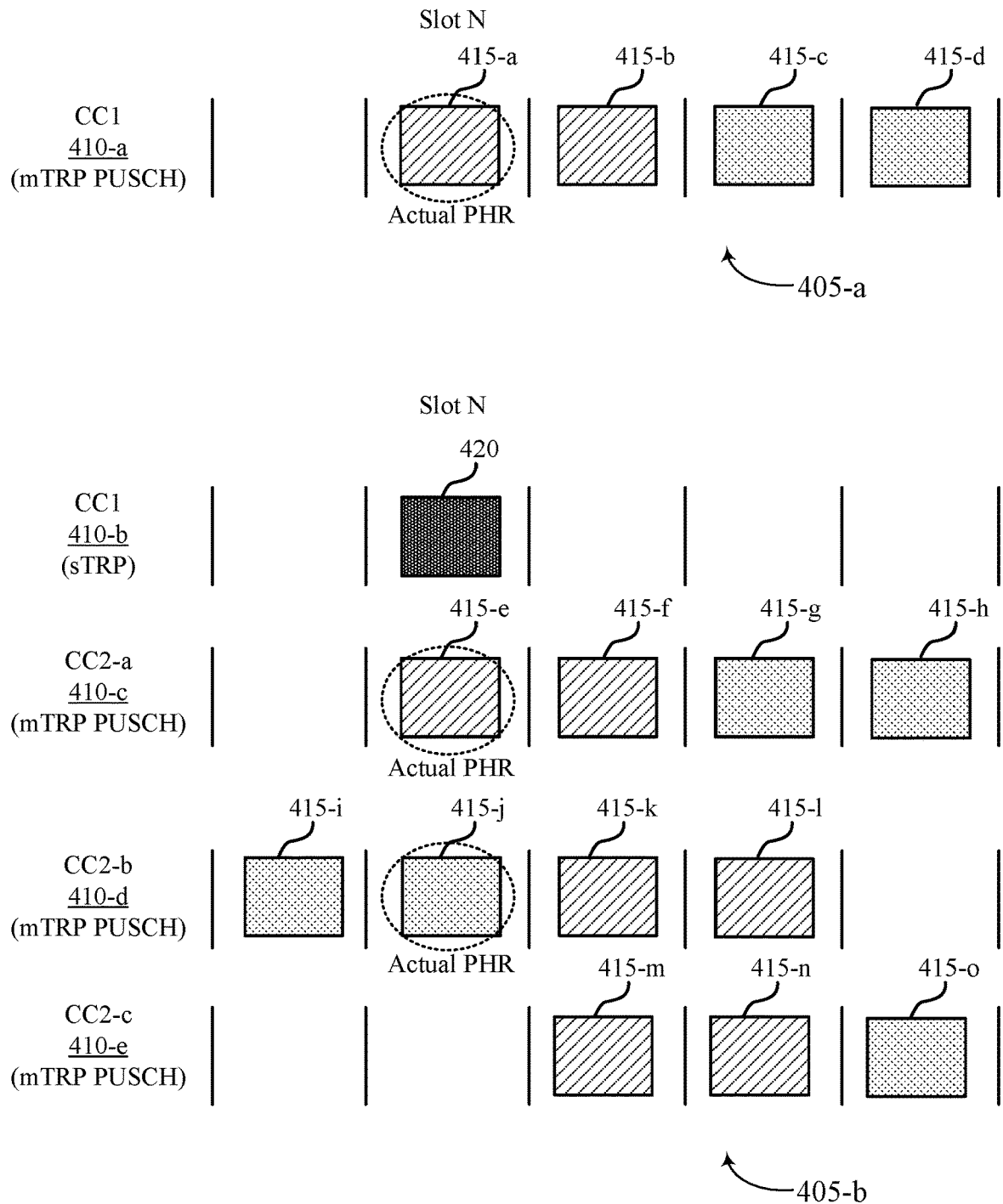
FIG. 4 illustrates an example of a resource configuration that supports techniques for reporting PHR for multiple uplink shared channel repetitions in accordance with aspects of the present disclosure.

FIG. 4 illustrates an example of a resource configuration 400 that supports techniques for reporting PHR for multiple uplink shared channel repetitions in accordance with aspects of the present disclosure. Aspects of the resource configuration 400 may implement, or be implemented, by wireless communications system 100, resource configuration 200, wireless communications system 300, or any combination thereof. In particular, the resource configuration 400 illustrates various examples/PHR reporting schemes 405 which are based on the first rule for determining PHR values in which case the second reported PHR value is always virtual.

The resource configuration 400 illustrates sets of linked PUSCH transmissions including linked PUSCH repetitions 415 which may be scheduled at a UE 115. In particular, resource configuration illustrates PUSCH repetitions 415 (e.g., PUSCH repetitions 415-a, 415-b, 415-e, 415-f, 415-k, 415-l, 415-m, 415-n) which are associated with a first beam (first SRS resource set) and first set of power control parameters and which are targeted toward a first TRP at a base station 105, as well as PUSCH repetitions 415 (e.g., PUSCH repetitions 415-c, 415-d, 415-g, 415-h, 415-i, 415-j, 415-o) which are associated with a second beam (second SRS resource set) and second set of power control parameters and which are targeted toward a second TRP at the base station 105, as described previously herein.

A first PHR reporting scheme 405—*a* shown in FIG. 4 illustrates a single-component carrier PHR reporting scheme in which PHR MAC-CE (e.g., PHR reports) are reported on PUSCH repetitions. For example, as shown in the first PHR reporting scheme 405—*a*, a UE 115 may be scheduled with multiple linked PUSCH repetitions 415 which are associated with different beams/SRS resource sets. Each of the PUSCH repetitions 415 may be scheduled on a single component carrier 410-*a* (CC1). Moreover, the UE 115 may be configured to transmit PHR MAC-CE (e.g., a PHR report) via a first PUSCH repetition 415-*a* within slot N. In this example, the UE 115 may report a first PHR value for the PUSCH repetitions 415-*a*, 415-*b* associated with the first beam/first SRS resource set, and may report a second PHR value for the PUSCH repetitions 415-*c*, 415-*d* associated with the second beam/second SRS resource set. In this example, the first PHR value (e.g., PHR value for PUSCH repetitions 415-*a*, 415-*b*) may include an actual PHR value, whereas the second PHR value (e.g., PHR value for PUSCH repetitions 415-*c*, 415-*d*) may include a virtual PHR value. In particular, the virtual PHR value for PUSCH repetitions 415-*c*, 415-*d* may be determined according to the second set of default transmission power settings (e.g., {p0-PUSCH-AlphaSetId=1, pusch-PathlossReferenceRS-Id=1, closedloopindex l=1} or {p0-PUSCH-AlphaSetId=1, pusch-PathlossReferenceRS-Id=1, closedloopindex l=0}) based on the first, actual PHR value being associated with the first SRS resource set (e.g., based on the actual PHR value being associated with PUSCH repetition 415-*a*).

A second PHR reporting scheme 405—*b* illustrates additional examples for reporting PHR values in the case of mTRP PUSCH repetitions. In each of the examples illustrated in the second PHR reporting scheme 405—*b*, a PHR report 420 (e.g., PUSCH transmission carrying PHR MAC-CE) is transmitted on a first component carrier 410-*b* (CC1) and may include PHR value(s) for PUSCH repetitions on a second component carrier 410 (e.g., CC2). For example, the PHR report 420 may include PHR values for one of the component carrier 410-*c* component carrier 410-*d*, or component carrier 410-*e*. In other words, each illustrated CC2 (e.g., CC2-*a*, CC2-*b*, CC2-*c*) is shown as an alternative or example, where the PHR report 420 on CC1 may be used to report PHR values for one of the CC2s configured with mTRP PUSCH.

Referring to the component carrier 410-*c* (CC2-*a*), a UE 115 may be scheduled to perform linked PUSCH repetitions 415-*e*, 415-*f*, 415-*g*, and 415-*h*. In this example, the UE 115 may report (via the PHR report 420 on the first component carrier 410-*b*) a first actual PHR value for PUSCH repetitions 415-*e*, 415-*f* corresponding to the first beam. The first PHR value may include an actual PHR value based on the PUSCH repetition 415-*e* being scheduled within the same slot (slot n) as the slot in which the PHR report 420 is transmitted. Moreover, the UE 115 may report (via the PHR report 420 on the first component carrier 410-*b*) a second, virtual PHR value for PUSCH repetitions 415-*g*, 415-*h* corresponding to the second beam based on the second set of default transmission power settings (e.g., {p0-PUSCH-AlphaSetId=1, pusch-PathlossReferenceRS-Id=1, closedloopindex l=1} or {p0-PUSCH-AlphaSetId=1, pusch-PathlossReferenceRS-Id=1, closedloopindex l=0}) based on the first, actual PHR value being associated with the first SRS resource set (e.g., based on the actual PHR value being associated with PUSCH repetition 415-*e*).

Referring to the component carrier 410-*d* (CC2-*b*), a UE 115 may be scheduled to perform linked PUSCH repetitions 415-*i*, 415-*j*, 415-*k*, and 415-*l*. In this example, the UE 115 may report (via the PHR report 420 on the first component carrier 410-*b*) a first actual PHR value for PUSCH repetitions 415-*i*, 415-*j* corresponding to the second beam/second SRS resource. The first PHR value may include an actual PHR value based on the PUSCH repetition 415-*j* being scheduled within the same slot (slot n) as the slot in which the PHR report 420 is transmitted. Moreover, the UE 115 may a second, virtual PHR value for PUSCH repetitions 415-*k*, 415-*l* corresponding to the first beam/first SRS resource set using the first set of default transmission power settings (e.g., {p0-PUSCH-AlphaSetId=0, closedloopindex l=0}) based on the first, actual PHR value being associated with the second SRS resource set (e.g., based on the actual PHR value being associated with PUSCH repetition 415-*j*).

Referring to the component carrier 410-*e* (CC2-*c*), a UE 115 may be scheduled to perform linked PUSCH repetitions 415-*m*, 415-*n*, and 415-*o*. In this example, the UE 115 may report (via the PHR report 420 on the first component carrier 410-*b*) a first virtual PHR value for PUSCH repetitions 415-*m*, 415-*n* corresponding to the second beam. The first PHR value may include a virtual PHR value based on neither of the PUSCH repetitions 415-*m*, 420-*n* being scheduled within the same slot (slot n) as the slot in which the PHR report 420 is transmitted. Moreover, the UE 115 may not report a second PHR value for the PUSCH repetition 415-*o* corresponding to the second beam based on the first PHR value including a virtual PHR value. In other words, the UE 115 may refrain from reporting a second PHR value via the PHR report 420 based on the first PHR value not including an actual PHR value (e.g., to avoid calculating/reporting multiple virtual PHR values in the same PHR report).

In additional or alternative cases, the UE 115-*a* may always utilize the second set of default transmission power settings based on the second PHR value being reported in the PHR report 320 or PHR report 420. In other words, in some cases, the UE 115-*a* may utilize the second set of default transmission power settings (e.g., a second of the ordered pair of sets of default transmission power settings) based on the PHR report 320, 420 including both the first PHR value and the second PHR value, and regardless of whether the first, actual PHR value is associated with the first or second SRS resource sets. In such cases, the UE 115-*a* may utilize the second set of default transmission power settings to determine the second, virtual PHR value for each of the component carriers 410-*a*, 410-*c*, 410-*d*, and 410-*e*.

In additional or alternative cases, the UE 115-*a* may implement another rule for determining PHR values which may enable the second PHR value to be actual or virtual. In other words, as opposed to the rule illustrated in FIG. 4 in which the second PHR value is always virtual (if the second PHR value is reported), another rule which may be implemented by the UE 115-*a* may allow the second PHR value to be virtual or actual. This concept may be further shown and described with reference to FIG. 5.

Figure 5:
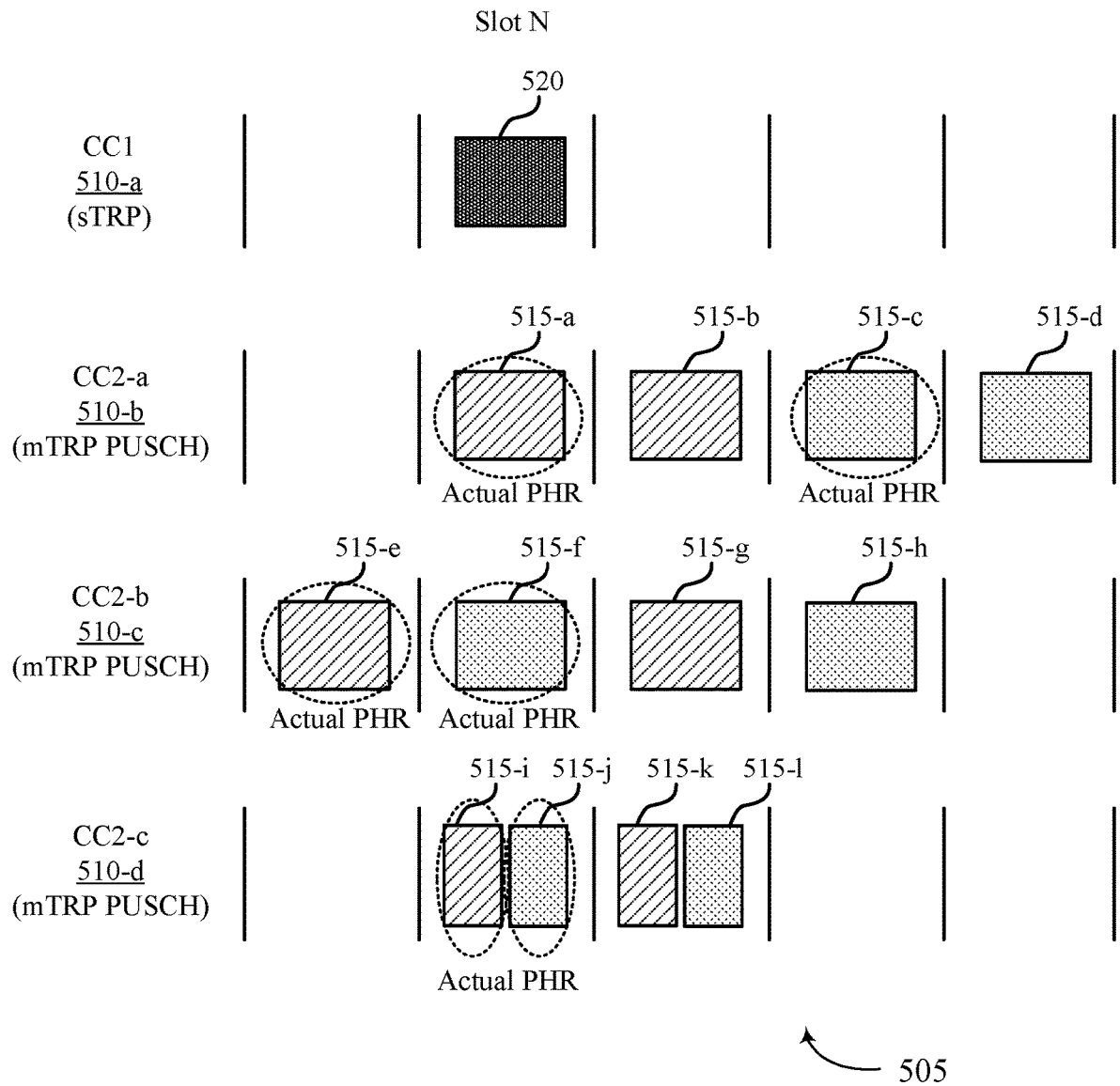
FIG. 5 illustrates an example of a resource configuration that supports techniques for reporting PHR for multiple uplink shared channel repetitions in accordance with aspects of the present disclosure.

FIG. 5 illustrates an example of a resource configuration 500 that supports techniques for reporting PHR for multiple uplink shared channel repetitions in accordance with aspects of the present disclosure. Aspects of the resource configuration 500 may implement, or be implemented by, wireless communications system 100, resource configuration 200, wireless communications system 300, or any combination thereof. In particular, the resource configuration 500 includes a PHR reporting scheme 505 which illustrates various examples which are based on the rule for determining PHR values in which case the second reported PHR may include an actual PHR value or a virtual PHR value. Accordingly, as compared to the examples illustrated in FIG. 4 in which case the second PHR value is always virtual (if the second PHR value is reported), FIG. 5 illustrates examples in which case the second PHR value (if reported) may be actual or virtual.

The PHR reporting scheme 505 illustrates examples for reporting PHR values in the case of mTRP PUSCH repetitions. In each of the examples illustrated in the PHR reporting scheme 505, a PHR report 520 (e.g., PUSCH transmission carrying PHR MAC-CE) is transmitted on a first component carrier 510-a (CC1) and may include PHR value(s) for PUSCH repetitions 515 on a second component carrier 410 (e.g., CC2). For example, the PHR report 520 may include PHR values for one of the component carrier 510-b component carrier 510-c, or component carrier 510-d. In other words, each illustrated CC2 (e.g., CC2-a, CC2-b, CC2-c) is shown as an alternative or example, where the PHR report 520 on CC1 may be used to report PHR values for one of the CC2s configured with mTRP PUSCH.

In association with the rule in which the second PHR value may be actual or virtual, the UE 115-a may be configured to implement one or more conditions which control whether the second PHR value is actual or virtual. For example, according to a first condition, the UE 115-a may be configured to determine an actual PHR value for the second PHR value if the first PHR value includes an actual PHR value which is determined based on a first PUSCH repetition of a set of PUSCH repetitions associated with one of the SRS resource sets. Otherwise, the second PHR value may be virtual. In other words, if the first actual PHR value is based on a first PUSCH repetition 515 of corresponding SRS resource set, the first condition is satisfied, and the second PHR value may include an actual PHR value. This condition ensures that the first reported PHR value is an actual PHR value based on a PUSCH repetition 515 in the same slot/same TTI as the PHR report 520, and may prevent the UE 115-a from having to determine multiple actual PHR values based on PUSCH repetitions 515 transmitted in different slots from the PHR report 520.

Referring to the component carrier 510-b (CC2-a), the UE 115-a may be scheduled to perform linked PUSCH repetitions 515-a, 515-b, 515-c, and 515-d. In this example, the UE 115-a may report (via the PHR report 520 on the first component carrier 510-a) a first actual PHR value for PUSCH repetitions 515-a, 515-b corresponding to the first beam/first SRS resource set. Moreover, in accordance with the first condition being satisfied, the UE 115-a may determine an actual PHR value for the second PHR value based on the first, actual PHR value being determined based on a first PUSCH repetition of an SRS resource set. In other words, because the first, actual PHR value is determined based on the PUSCH repetition 515-a which is the first PUSCH repetition of the corresponding SRS resource set (as opposed to PUSCH repetition 515-b which is the second repetition of the corresponding SRS resource set), the UE 115-b may determine a second, actual PHR value for the second SRS resource set.

Upon determining that the second PHR value should be actual (e.g., based on the first actual PHR value being based on a first PUSCH repetition 515 of a corresponding SRS resource set), there are several implementations/alternatives for determining which PUSCH repetition 515 should be used to determine the second, actual PHR value. In a first implementation, the PUSCH repetition 515 which is closest to the slot/TTI carrying the PHR report 520 (either before or after) may be used to determine the second actual PHR value. For example, as shown in component carrier 510-b, the PUSCH repetition 515-c may be used to determine the second, actual PHR value based on the PUSCH repetition 515-c being the closest to slot n from the set of PUSCH repetitions 515-c, 515-d corresponding to the second SRS resource set.

In another implementation, if there is a PUSCH repetition 515 within or before the slot/TTI carrying the PHR report 520, that PUSCH repetition 515 is used to determine the second, actual PHR value. Otherwise, the earliest PUSCH repetition 515 after slot n is considered. In other words, in accordance with the second implementation, the UE 115-b may prioritize PUSCH repetitions 515 which are within or before slot n for determining the second, actual PHR value.

For example, referring to the component carrier 510-c (CC2-b), the UE 115-a may be scheduled to perform linked PUSCH repetitions 515-e, 515-f, 515-g, and 515-h. In this example, the UE 115-a may report (via the PHR report 520 on the first component carrier 510-a) a first actual PHR value for PUSCH repetitions 515-f corresponding to the first beam/first SRS resource set. Moreover, in accordance with the first condition being satisfied, the UE 115-a may determine an actual PHR value for the second PHR value based on the first, actual PHR value being determined based on a first PUSCH repetition of an SRS resource set. In other words, because the first, actual PHR value is determined based on the PUSCH repetition 515-f which is the first PUSCH repetition of the corresponding SRS resource set (as opposed to PUSCH repetition 515-h which is the second repetition of the corresponding SRS resource set), the UE 115-ba may determine a second, actual PHR value for the second SRS resource set. Further, in accordance with the second implementation, the UE 115-a may prioritize PUSCH repetitions 515 which are prior to slot n for determining the second, actual PHR value. In this regard, the UE 115-b may determine a second, actual PHR value based on the PUSCH repetition 515-e.

When implementing the rule for determining PHR values which enables the second PHR value to be actual or virtual (when reported), the UE 115-a may be configured to apply one or more additional conditions for determining whether the second PHR value should be actual or virtual.

In accordance with a second condition, and in addition to the first condition, in order for the second PHR value to be an actual PHR value, there should be at least one other PUSCH repetition transmitted before or at the slot/TTI carrying the PHR report 520 and having different sets of power control parameters (e.g., different SRS resource set) than the first PUSCH repetition 515. Otherwise, the second PHR value is virtual, or the second PHR is not reported. In other words, the UE 115-a may generate the second PHR value as an actual PHR value based on the PHR report 520 being transmitted in a same TTI as a first PUSCH repetition 515 of the first set of repetitions and based on one or more PUSCH repetitions 515 of the second set of repetitions being during the same TTI in which the PHR report 520 is transmitted or during an overlapping TTI that overlaps with the same TTI in which the PHR report 520 is transmitted. If this second condition is satisfied, the second PHR value may be virtual. This second condition is more stringent than the first condition in that it ensures that actual PHR for the second PHR value does not correspond to slots/TTIs in the future. As described in further detail below, the second condition is satisfied in component carriers 510-c and 510-d, but is not satisfied in component carrier 510-b.

For example, the second condition would be satisfied in component carrier 510-c based on the PUSCH repetition 515-e being scheduled before slot n carrying the PHR report 520. In this case, the UE 115-a would generate a first actual PHR value based on PUSCH repetition 515-f, and a second actual PHR value based on PUSCH repetition 515-e based on the second condition (and the first condition) being satisfied. Moreover, the second condition would be satisfied in component carrier 510-d based on the PUSCH repetition 515-j being scheduled within slot n carrying the PHR report 520. In this case, the UE 115-a would generate a first actual PHR value based on PUSCH repetition 515-i, and a second actual PHR value based on PUSCH repetition 515-j based on the second condition (and the first condition) being satisfied. In cases where the UE 115-a generates an actual PHR value based on satisfaction of the second condition, the UE 115-a may generate the second, actual PHR value based on a PUSCH repetition 515 which is closest to the slot/TTI carrying the PHR report in the time domain.

Comparatively, the second condition would not be satisfied in component carrier 510-b based on the PUSCH repetition 515-c being scheduled after slot n carrying the PHR report 520. In this case, the UE 115-a would generate a first actual PHR value based on PUSCH repetition 515-a, and a second, virtual PHR value for the second SRS resource set based on the second condition not being satisfied. Additionally, or alternatively, the UE 115-a may refrain from determining the second PHR value, or refrain from including the second PHR value in the PHR report 520, based on the second condition not being satisfied.

In accordance with a third condition, in order for the second PHR value to be an actual PHR value, there should be two different PUSCH repetitions 515 with different power control parameters (e.g., two PUSCH repetitions 515 associated with different SRS resource sets) which are transmitted in the same slot/TTI as the PHR report 520. Otherwise, the second PHR value is virtual, or the second PHR is not reported. In other words, the UE 115-a may determine an actual PHR value for the second PHR value only in cases where PUSCH repetitions 515 for both SRS resource sets are scheduled in the same slot/TTI as the PHR report 520. This third condition is more stringent than both the first and second conditions in that it ensures that actual PHR for the second PHR value does not correspond to slots/TTIs in the future or the past. Further, this third condition only applies to PUSCH repetition Type B, as in PUSCH repetition Type A, PUSCH repetitions 515 are scheduled in different slots. As described in further detail below, the third condition is satisfied in component carrier 510-d, but is not satisfied in component carriers 510-b or 510-c.

For example, the third condition would not be satisfied in component carriers 510-b or 510-c due to the fact that there are not PUSCH repetitions 515 for both SRS resource sets which are scheduled in the same slot n as the PHR report 520. Accordingly, because the third condition is not satisfied, the UE 115-a may either determine an actual PHR value for the second PHR value, or may refrain from determining/reporting the second PHR value.

Comparatively, the third condition would be satisfied in component 510-d due to the fact that there are PUSCH repetitions 515 for both SRS resource sets which are scheduled in the same slot n as the PHR report 520 (e.g., PUSCH repetitions 515-i and 515-j). Accordingly, the UE 115-a may determine a first actual PHR value based on the PUSCH repetition 515-i and a second actual PHR value based on the PUSCH repetition 515-j based on the third condition being satisfied.

In cases where the third condition is satisfied and there are more than two PUSCH repetitions in the same slot/TTI carrying the PHR report 520, the two earliest PUSCH repetitions 515 having different power control parameters (e.g., two earliest PUSCH repetitions 515 associated with different SRS resource sets) may be used to determine the actual PHR values. Further, in cases where the component carrier 510 carrying the PHR report 520 has a different subcarrier spacing (SCS) from the component carrier 510 including the PUSCH repetitions 515, the slot/TTI including the PHR report 520 which is used to determine the satisfaction of the respective conditions may be considered to be the first slot in the component carrier 510 carrying the PUSCH repetitions 515 that overlaps with the slot carrying the PHR report 520. For example, the component carrier 510-a carrying the PHR report 520 may have a first SCS (e.g., 15 kHz SCS) which is different from a second SCS (e.g., 30 kHz SCS) of the component carrier 510-b including the PUSCH repetitions 515-a through 515-d. In other words, the component carrier 510-b may include multiple slots which overlap with each slot in the component carrier 510-a. In this case, the first slot in the component carrier 510-b which overlaps with slot n on the component carrier 510-a may be considered as the "slot n" for determining satisfaction of the respective conditions.

Reference will again be made to FIG. 3. Upon generating the respective PHR values, the UE 115-a may generate the PHR report 320 (e.g., PHR MAC-CE). The generated PHR report 320 may include the first PHR value and/or the second PHR value. In particular, the PHR values included within the PHR report 320 may be dependent on a PHR reporting configuration used to report PHR values and/or the rule which was used to determine the PHR values, as shown and described in FIGS. 4 and 5. Moreover, the UE 115-a may generate the PHR report 320 based on transmitting the capability signaling 325, receiving the RRC message 330, receiving the DCI message 335, or any combination thereof.

In some implementations, the PHR report 320 may include one or more fields or field values (e.g., MAC-CE fields, bit fields) which indicate parameters for the PHR values reported within the PHR report 320. For example, the PHR report 320 may include one or more fields which indicate whether the reported PHR values include actual or virtual PHR values. In cases where a reported PHR value includes an actual PHR value, the PHR report 320 may further include the corresponding $P_{CMAX}$ value.

Additionally, or alternatively, the PHR report 320 may include fields which indicate whether the PHR report 320 includes one or two (or more) PHR values, fields which indicate whether PHR values reported via the PHR report 320 include actual or virtual PHR values, or both. The use of such fields to indicate quantity and type of reported PHR values may enable PHR reporting to be dynamically changed such that PHR reports are not fixed for a component carrier configured with mTRP PUSCH repetitions 315.

For example, a field in the PHR report 320 (e.g., PHR MAC-CE) may indicate whether one or two PHR values are reported in the PHR report 320 for a given component carrier configured with two resource sets for codebook/non-codebook based PUSCH. In other words, the PHR report 320 may include one or more fields which indicate whether the PHR report 320 includes one or two PHR values for a component carrier configured for mTRP PUSCH repetitions. For instance, when reporting PHR values for the PUSCH repetitions 315-*a*, 315-*b*, 315-*c*, 315-*d* in component carrier 310-*b*, the PHR report 320 may indicate whether the PHR report 320 includes one or two PHR values for the respective PUSCH repetitions 315-*a*, 315-*b*, 315-*c*, 315-*d*. In cases where the PHR report includes a single PHR value (e.g., PHR value for PUSCH repetitions 315-*a*, 315-*b* or PHR value for PUSCH repetitions 315-*c*, 315-*d*), the PHR report 320 may further include one or more fields indicating which beam/SRS resource set is associated with the reported PHR value.

In cases where there are multiple component carriers 310 which are configured with mTRP PUSCH repetitions that are being reported via the PHR report 320, the indication as to whether one or two (or more) PHR values are being reported for each component carrier 310 may be indicated for each individual component carrier 310. For example, if the PHR report 320 includes PHR values for both the component carrier 310-*b* and the component carrier 310-*c*, the PHR report 320 may include a first field value which indicates whether the PHR report 320 includes one or two PHR values for the component carrier 310-*b*, and a second field value which indicates whether the PHR report 320 includes one or two PHR values for the component carrier 310-*c*.

In cases where the PHR report 320 includes two PHR values for a given component carrier 310, the relative order of the reported PHR values may be determined/arranged according to multiple implementations. In a first implementation, the relative order of the reported PHR values within the PHR report 320 may be based on the order of association with the respective beam/SRS resource set (e.g., based on an order of the first and second SRS resource sets in the time domain). For example, in some cases, the PHR value associated with the SRS resource set which is earlier in the time domain may be arranged first within the PHR report. For instance, the PHR value associated with the first SRS resource set may be arranged first within the PHR report 320 for the component carrier 310-*b*, whereas the PHR value associated with the second SRS resource set may be arranged first within the PHR report 320 for the component carriers 310-*c* and 310-*d*.

By way of another example, in some cases, the PHR value associated with the first SRS resource set may be placed/reported first within the PHR report 320, followed by the PHR value associated with the second SRS resource set. For example, when reporting PHR values for the component carrier 310-*b*, a PHR value associated with PUSCH repetitions 315-*a*, 315-*b* may be reported prior to a PHR value associated with PUSCH repetitions 315-*c*, 315-*d*. By way of another example, when reporting PHR values for the component carrier 310-*b*, a PHR value associated with PUSCH repetitions 315-*g*, 315-*h* may be reported prior to a PHR value associated with PUSCH repetitions 315-*e*, 315-*f*.

In a second implementation, the relative order of the reported PHR values within the PHR report 320 may be based on whether the PHR values include actual or virtual PHR values. In some cases, actual PHR values may be arranged/reported within the PHR report prior to virtual PHR values (e.g., actual PHR values precede virtual PHR values). In a third implementation, the relative order of the reported PHR values within the PHR report 320 may be based on the relative order of corresponding PUSCH repetitions in the time domain. In particular, the PHR value associated with the earliest PUSCH repetition which is earlier in the time domain may be placed first in the PHR report 320, followed by the PHR value associated with the PUSCH repetition which is later in the time domain. In some implementations, this implementation may apply only in cases where both reported PHR values are actual PHR values, or in cases where both PHR values are virtual PHR values. For example, in cases where the UE 115-*a* determines a first actual PHR value based on the PUSCH repetition 315-*f* and a second actual PHR value based on the PUSCH repetition 315-*g*, the first actual PHR value may be reported first in the PHR report 320 based on the PUSCH repetition 315-*f* preceding the PUSCH repetition 315-*g* in the time domain.

Subsequently, the UE 115-*a* may transmit the PHR report 320 to the base station 105-*a*. The UE 115-*a* may transmit the PHR report 320 based on transmitting the capability signaling 325, receiving the RRC message 330, receiving the DCI message 335, determining the PHR value(s), generating the PHR report 320, or any combination thereof. Moreover in some cases, the UE 115-*a* may transmit the PHR report 320 within a PUSCH repetition 315 For example, as shown in the first PHR reporting scheme 405—illustrated in FIG. 4, the PHR report 320 may be included within an uplink transmission repetitions which was scheduled by the DCI message 335.

Techniques described herein may provide for improved PHR reporting in the context of linked PUSCH transmissions associated performed using multiple beams at the UE 115-*a* (e.g., mTRP). In particular, aspects of the present disclosure may enable the UE 115-*a* to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting the UE 115-*a*, and may reduce a quantity of signaling used for PHR reporting, which may lead to reduced control signaling and more efficient utilization of resources.

Figure 6:
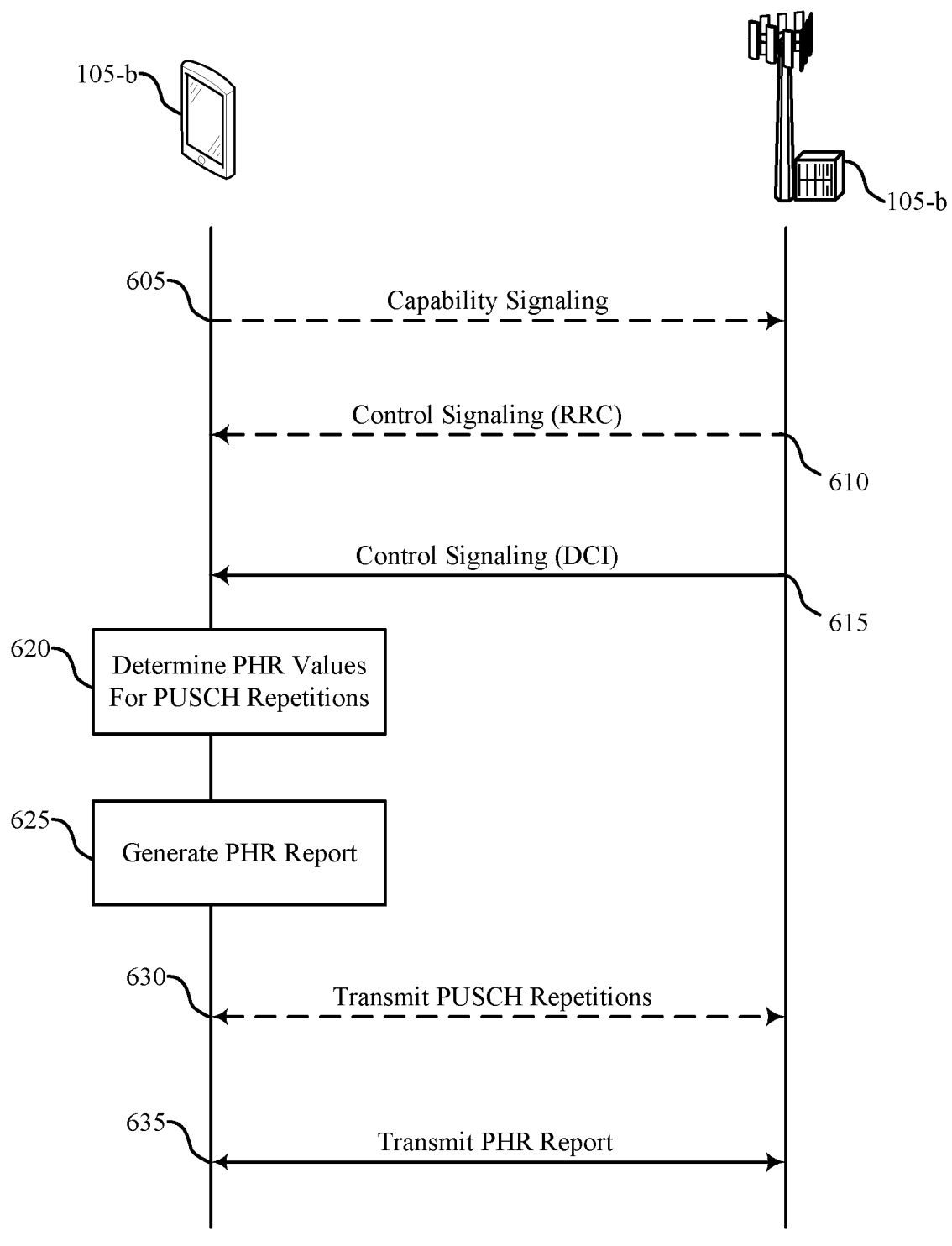
FIG. 6 illustrates an example of a resource process flow that supports techniques for reporting PHR for multiple uplink shared channel repetitions in accordance with aspects of the present disclosure.

FIG. 6 illustrates an example of a process flow 600 that supports techniques for reporting PHR for multiple uplink shared channel repetitions in accordance with aspects of the present disclosure. In some examples, process flow 600 may implement, or be implemented by, aspects of wireless communications systems 100, resource configuration 200, wireless communications system 300, resource configuration 400, resource configuration 500, or any combination thereof.

In some cases, process flow 600 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 4.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 605, the UE 115-*b* may transmit capability signaling to the base station 105-*b*. The capability signaling may include UE capability signaling, a UE capability report, and the like. In some aspects, the capability signaling may indicate one or more capabilities associated with reporting PHR values which are supported by the UE 115-*a*. In particular, the capability signaling may indicate various capabilities which are associated with PHR reporting in the context of mTRP uplink transmission repetitions (PUSCH repetitions).

For example, the capability signaling may indicate whether the UE 115-b supports one or more PHR reporting configurations for reporting multiple PHR values per component carrier. Additionally, or alternatively, the capability signaling may indicate whether the UE 115-b supports reporting two actual PHR values in one PHR report for a given component carrier. In other words, the capability signaling may indicate whether the UE 115-a is capable of reporting multiple PHR values (and types of PHR values) via a single PHR report. In some aspects, the capability signaling may indicate whether the UE 115-b supports reporting actual PHR value for slots that are before or after a slot on which a PHR report is transmitted. In other words, the capability signaling may indicate whether the UE 115-b supports a determination of actual PHR values based on uplink transmission repetitions scheduled before transmission of the PHR report and/or after transmission of the PHR report.

At 610, the UE 115-b may receive, from the base station 105-b, control signaling (e.g., RRC signaling) indicating one or more parameters/characteristics associated with PHR reporting at the UE 115-b. The base station 105-b may transmit the control signaling at 610 based on (e.g., in response to) the capability signaling at 605. In some aspects, the control signaling may semi-statically configure the UE 115-b to perform PHR reporting in the case of mTRP uplink transmission repetitions. In other words, the base station 105-a may configure the UE 115-b to perform PHR reporting for mTRP uplink transmission repetitions (e.g., PUSCH repetitions) based on the various capabilities indicated via the capability signaling at 605.

For example, in cases where the capability signaling at 605 indicates one or more PHR reporting configurations which are supported by the UE 115-b, the control signaling at 610 may indicate one of the PHR reporting configurations supported by the UE 115-b which are to be used for PHR reporting. By way of another example, the control signaling may configure the UE 115-b to report one or two PHR values in a single PHR report for a given component carrier. By way of another example, the control signaling may configure the UE 115-b to report actual PHR values for PUSCH transmissions in slots which are before and/or after the slot carrying the PHR report. In other words, the control signaling may enable or trigger the reporting of actual PHR values which are calculated based on uplink control repetitions which are scheduled before or after transmission of a PHR report.

At 615, the UE 115-b may receive control signaling (e.g., a DCI message) from the base station 105-b. In some aspects, the control signaling may schedule multiple uplink transmission repetitions (e.g., PUSCH repetitions) including a first set of repetitions associated with a first SRS resource set (e.g., first beam), and a second set of repetitions associated with a second SRS resource set (e.g., second beam). For example, as shown in FIG. 2, the UE 115-b may be scheduled to perform multiple PUSCH transmissions including PUSCH repetitions 315 associated with a first beam/first SRS resource set and PUSCH repetitions 315 associated with a second beam/second SRS resource set. In some aspects, the UE 115-b may receive the control signaling at 615 based on transmitting the capability signaling at 605, receiving the capability signaling at 610, or both In some cases, the multiple uplink transmission repetitions (e.g., PUSCH repetitions) may include multiple repetitions of the same uplink data message which are scheduled in the same component carrier.

At 620, the UE 115-b may determine PHR values for the respective sets of uplink transmission repetitions. In particular, the UE 115-b may determine a first PHR value for the first set of repetitions associated with the first SRS resource set and a second PHR value for the second set of repetitions associated with the second SRS resource set. The UE 115-b may be configured to determine the PHR values at 620 based on transmitting the capability signaling at 605, receiving the capability signaling at 610, receiving the capability signaling at 615, or any combination thereof.

In some aspects, the UE 115-b may determine the second PHR value for the second set of repetitions (e.g., second set of PUSCH repetitions) in accordance with a rule (e.g., first rule) for determining PHR values. In particular, the rule may be associated with PHR determination for multiple sets of repetitions (e.g., PUSCH repetitions) corresponding to multiple SRS resource sets. In other words, the rule may be associated with the determination of PHR values in the case of mTRP uplink transmission repetitions. In some aspects, each of the first PHR value and the second PHR value may include one of an actual PHR value which is based on a transmission power of one of the uplink transmission repetitions, or a virtual PHR value which is based on a set of default/reference transmission power settings. The default/reference transmission power settings used to determine virtual PHR values may include, but are not limited to, reference power level values ($P_O$), reference pathloss compensation values ($\alpha$), reference pathloss values associated with a reference signal (PL), a reference closed loop index (l), or any combination thereof.

At 625, the UE 115-b may generate the PHR report (e.g., PHR MAC-CE). The generated PHR report may include the first PHR value and/or the second PHR value which were determined at 620. In particular, the PHR values included within the PHR report generated at 625 may be dependent on a PHR reporting configuration used to report PHR values and/or the rule which was used to determine the PHR values at 620. Moreover, the UE 115-b may generate the PHR report at 625 based on transmitting the capability signaling at 605, receiving the capability signaling at 610, receiving the capability signaling at 615, or any combination thereof.

In some aspects, the PHR report may include one or more bit field values which indicate whether the respective PHR values include actual PHR values or virtual PHR values, a relative order of the PHR values, or both. Additionally, as noted previously herein, the relative order/arrangement of the PHR values included within the PHR report may be based on a number of factors, including the type of PHR values (e.g., actual PHR values may be arranged within the PHR report before virtual PHR values), the corresponding SRS resource sets (e.g., the first PHR value associated with repetitions corresponding to the first SRS resource set may be arranged first within the PHR report), a relative order in the time domain of uplink transmission repetitions on which the respective PHR values were determined, and the like.

At 630, the UE 115-b may transmit one or more of the uplink transmission repetitions (e.g., PUSCH repetitions) which were scheduled by the control signaling (e.g., DCI) received at 615. In this regard, the UE 115-b may transmit the uplink transmission repetitions based on transmitting the capability signaling at 605, receiving the capability signaling at 610, receiving the capability signaling at 615, determining the PHR values at 620, generating the PHR report at 625, or any combination thereof. As shown in FIGS. 3-5, the UE 115-*b* may be configured to transmit one or more of the PUSCH repetitions in TTIs which precede transmission of the PHR report, in a same TTI as the PHR report, in TTIs which are subsequent to transmission of the PHR report, or any combination thereof. In this regard, the relative ordering of the steps illustrated in process flow 600 is not to be regarded as limiting, unless noted otherwise herein.

At 635, the UE 115-*b* may transmit the PHR report to the base station 105-*b*. The UE 115-*b* may transmit the PHR report at 635 based on transmitting the capability signaling at 605, receiving the capability signaling at 610, receiving the capability signaling at 615, determining the PHR values at 620, generating the PHR report at 625, transmitting the uplink transmission repetitions (e.g., PUSCH repetitions) at 630, or any combination thereof. Moreover in some cases, the UE 115-*b* may transmit the PHR report within an uplink transmission repetition at 630. For example, as shown in the first PHR reporting scheme 405—illustrated in FIG. 4, the PHR report may be included within an uplink transmission repetitions which was scheduled by the DCI received at 615.

Techniques described herein may provide for improved PHR reporting in the context of linked PUSCH transmissions associated performed using multiple beams at the UE 115-*b* (e.g., mTRP). In particular, aspects of the present disclosure may enable the UE 115-*b* to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting the UE 115-*b*, and may reduce a quantity of signaling used for PHR reporting, which may lead to reduced control signaling and more efficient utilization of resources.

Figure 7:
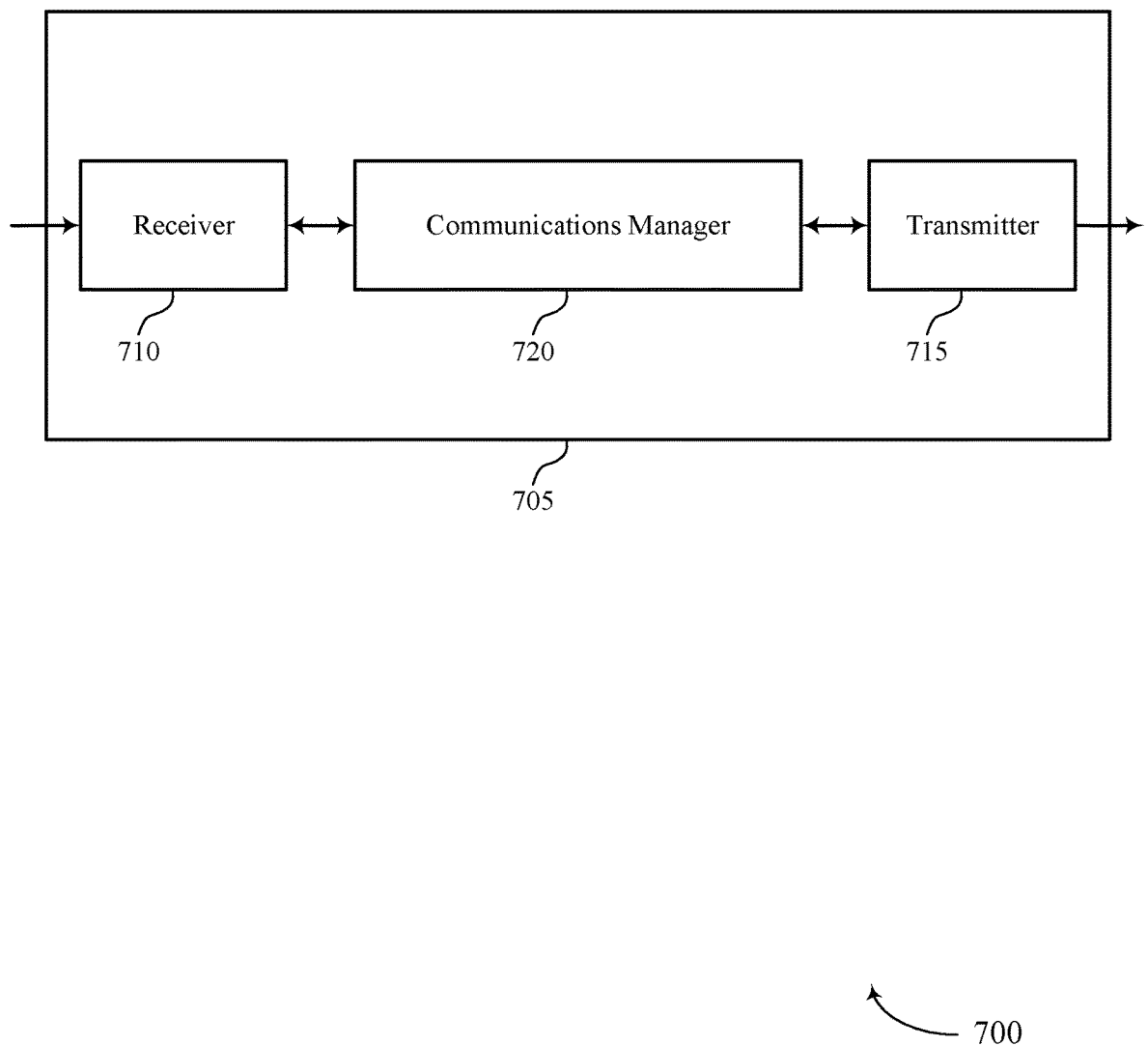
FIGS. 7 and 8 show block diagrams of devices that support techniques for reporting PHR for multiple uplink shared channel repetitions in accordance with aspects of the present disclosure.

FIG. 7 shows a block diagram 700 of a device 705 that supports techniques for reporting PHR for multiple uplink shared channel repetitions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for reporting PHR for multiple uplink shared channel repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for reporting PHR for multiple uplink shared channel repetitions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for reporting PHR for multiple uplink shared channel repetitions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The communications manager 720 may be configured as or otherwise support a means for determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The communications manager 720 may be configured as or otherwise support a means for generating a PHR report that includes the first PHR value, the second PHR value, or both. The communications manager 720 may be configured as or otherwise support a means for transmitting the PHR report to the base station.

By including or configuring the communications manager 720 in accordance with examples as described herein, the device 705 (e.g., a processor controlling or otherwise coupled to the receiver 710, the transmitter 715, the communications manager 720, or a combination thereof) may support techniques which provide for improved PHR reporting in the context of linked PUSCH transmissions associated performed using multiple beams at a UE 115 (e.g., mTRP). In particular, aspects of the present disclosure may enable UEs to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting at UEs 115, and may reduce a quantity of signaling used for PHR reporting, which may lead to reduced control signaling and more efficient utilization of resources.

Figure 8:
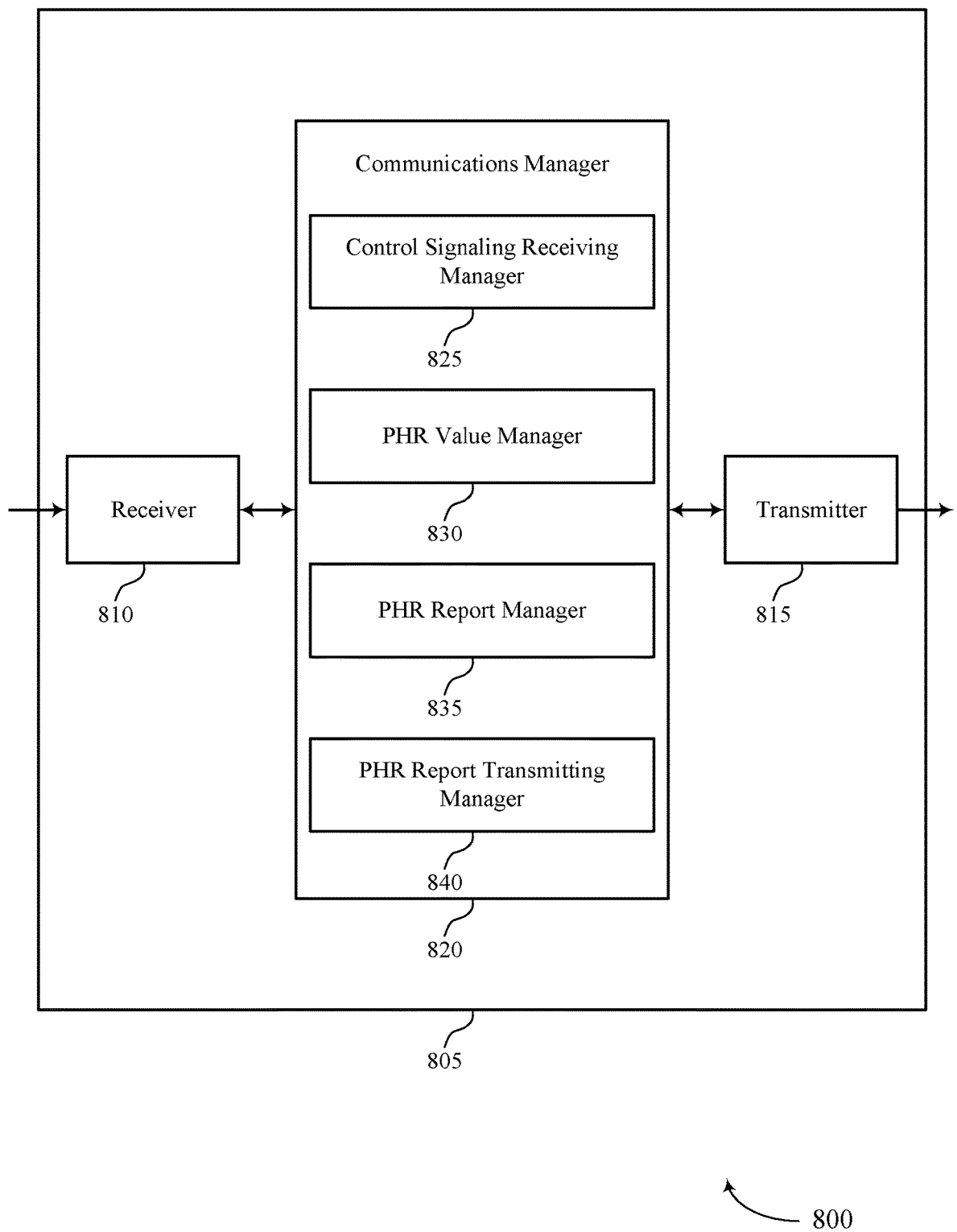

FIG. 8 shows a block diagram 800 of a device 805 that supports techniques for reporting PHR for multiple uplink shared channel repetitions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reporting PHR for multiple uplink shared channel repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reporting PHR for multiple uplink shared channel repetitions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for reporting PHR for multiple uplink shared channel repetitions as described herein. For example, the communications manager 820 may include a control signaling receiving manager 825, an PHR value manager 830, an PHR report manager 835, an PHR report transmitting manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control signaling receiving manager 825 may be configured as or otherwise support a means for receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The PHR value manager 830 may be configured as or otherwise support a means for determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The PHR report manager 835 may be configured as or otherwise support a means for generating a PHR report that includes the first PHR value, the second PHR value, or both. The PHR report transmitting manager 840 may be configured as or otherwise support a means for transmitting the PHR report to the base station.

Figure 9:
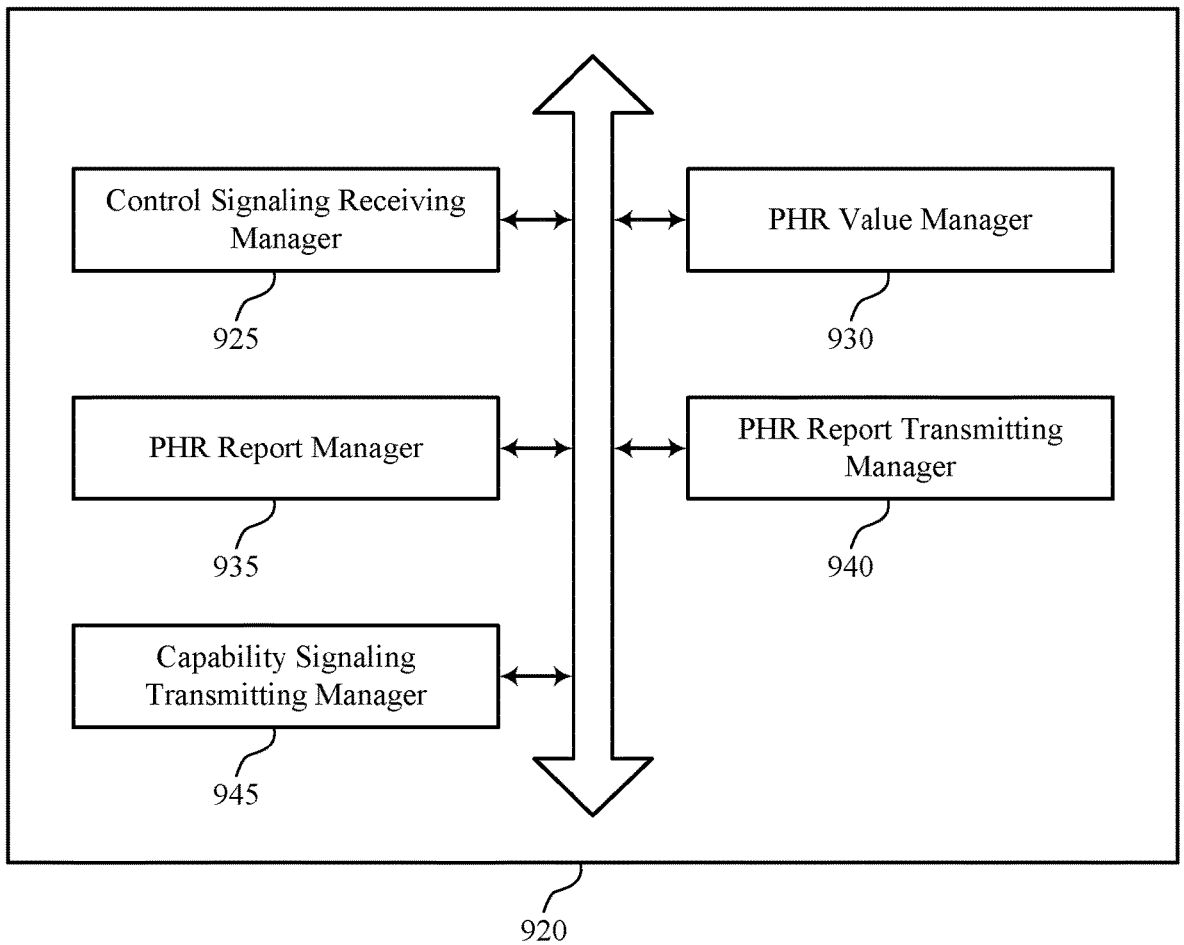
FIG. 9 shows a block diagram of a communications manager that supports techniques for reporting PHR for multiple uplink shared channel repetitions in accordance with aspects of the present disclosure.

FIG. 9 shows a block diagram 900 of a communications manager 920 that supports techniques for reporting PHR for multiple uplink shared channel repetitions in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for reporting PHR for multiple uplink shared channel repetitions as described herein. For example, the communications manager 920 may include a control signaling receiving manager 925, an PHR value manager 930, an PHR report manager 935, an PHR report transmitting manager 940, a capability signaling transmitting manager 945, or any combination thereof. Each of these components may communicate, directly or indirectly, with one another (e.g., via one or more buses).

The communications manager 920 may support wireless communication at a UE in accordance with examples as disclosed herein. The control signaling receiving manager 925 may be configured as or otherwise support a means for receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The PHR value manager 930 may be configured as or otherwise support a means for determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The PHR report manager 935 may be configured as or otherwise support a means for generating a PHR report that includes the first PHR value, the second PHR value, or both. The PHR report transmitting manager 940 may be configured as or otherwise support a means for transmitting the PHR report to the base station.

In some examples, to support determining the first PHR value and the second PHR value, the PHR value manager 930 may be configured as or otherwise support a means for generating the second PHR value as a virtual PHR value in accordance with the first rule which defines the second PHR value as virtual regardless of whether the first PHR value is actual or virtual. In some examples, to support determining the first PHR value and the second PHR value, the PHR value manager 930 may be configured as or otherwise support a means for generating the second PHR value as an actual PHR value in accordance with the first rule which defines the second PHR value as actual based on the first PHR value also being actual.

In some examples, to support determining the first PHR value and the second PHR value, the PHR value manager 930 may be configured as or otherwise support a means for generating the second PHR value as a virtual PHR value based on one of an ordered pair of sets of default transmission power settings. In some examples, each of the sets of default transmission power settings includes one or more of a reference power level value, a reference pathloss compensation value, a reference pathloss value associated with a reference signal, or a reference closed loop index.

In some examples, a first of the ordered pair of sets of default transmission power settings is associated with the first sounding reference resource set and a second of the ordered pair of sets of default transmission power settings is associated with the second sounding reference resource set, and the PHR value manager 930 may be configured as or otherwise support a means for selecting the second of the ordered pair for generating the second PHR value as a virtual PHR value based on the second SRS resource set being associated with the virtual value.

In some examples, the PHR value manager 930 may be configured as or otherwise support a means for selecting a second of the ordered pair of sets of default transmission power settings as the one of the ordered pair of sets of default transmission power settings based on the PHR report including both the first PHR value and the second PHR value.

In some examples, to support determining the first PHR value and the second PHR value, the PHR value manager 930 may be configured as or otherwise support a means for generating the first PHR value as a virtual PHR value based on each of the first set of repetitions being transmitted in a different TTI as the PHR report.

In some examples, to support generating the PHR report, the PHR value manager 930 may be configured as or otherwise support a means for generating the PHR report without including the second PHR value based on the first PHR value being virtual.

In some examples, to support determining the first PHR value and the second PHR value, the PHR value manager 930 may be configured as or otherwise support a means for generating the first PHR value as an actual PHR value based on an uplink transmission repetition of the first set of repetitions being transmitted in a same TTI as the PHR report.

In some examples, to support determining the first PHR value and the second PHR value, the PHR value manager 930 may be configured as or otherwise support a means for generating the second PHR value as an actual PHR value based on a first uplink transmission repetition of the first set of repetitions being transmitted in a same TTI as the PHR report.

In some examples, to support determining the first PHR value and the second PHR value, the PHR value manager 930 may be configured as or otherwise support a means for generating the second PHR value based on a transmission power associated with an uplink transmission repetition of the second set of repetitions which is closest in time to the same TTI in which the PHR report is transmitted.

In some examples, the PHR value manager 930 may be configured as or otherwise support a means for selecting the uplink transmission repetition of the second set of repetitions based on a preference for repetitions of the second set of repetitions that precede or are during the same TTI in which the PHR report is transmitted.

In some examples, to support determining the first PHR value and the second PHR value, the PHR value manager 930 may be configured as or otherwise support a means for generating the second PHR value as an actual PHR value based on a first uplink transmission repetition of the first set of repetitions being transmitted in a same TTI as the PHR report and based on one or more uplink transmission repetitions of the second set of repetitions preceding or being during the same TTI in which the PHR report is transmitted.

In some examples, to support determining the first PHR value and the second PHR value, the PHR value manager 930 may be configured as or otherwise support a means for generating the second PHR value based on a transmission power associated with an uplink transmission repetition of the second set of repetitions which is closest in time to the same TTI in which the PHR report is transmitted.

In some examples, to support determining the first PHR value and the second PHR value, the PHR value manager 930 may be configured as or otherwise support a means for generating the second PHR value as an actual PHR value based on a first uplink transmission repetition of the first set of repetitions being transmitted in a same TTI as the PHR report and based on one or more uplink transmission repetitions of the second set of repetitions being during the same TTI in which the PHR report is transmitted or during an overlapping TTI that overlaps with the same TTI in which the PHR report is transmitted.

In some examples, to support determining the first PHR value and the second PHR value, the PHR value manager 930 may be configured as or otherwise support a means for generating the first PHR value as an actual PHR value based on a transmission power of an earliest uplink transmission repetition of the first set of repetitions in the overlapping TTI or in the same TTI in which the PHR report is transmitted.

In some examples, to support determining the first PHR value and the second PHR value, the PHR value manager 930 may be configured as or otherwise support a means for generating the second PHR value based on a transmission power associated with an earliest uplink transmission repetition of the second set of repetitions in the overlapping TTI or in the same TTI in which the PHR report is transmitted.

In some examples, to support transmitting the PHR report to the base station, the PHR report transmitting manager 940 may be configured as or otherwise support a means for transmitting, via the PHR report, one or more bit field values indicating whether the PHR report includes the first PHR value, the second PHR value, or both, for a first component carrier.

In some examples, to support generating the PHR report, the PHR report manager 935 may be configured as or otherwise support a means for arranging the first PHR value and the second PHR value within the PHR report based on an ordering of the first SRS resource set and the second SRS resource set, where the first PHR value is first in the PHR report if the ordering includes the first SRS resource set before the second SRS resource set, and where the second PHR value is first in the PHR report if the ordering includes the second SRS resource set before the first SRS resource set.

In some examples, to support generating the PHR report, the PHR report manager 935 may be configured as or otherwise support a means for arranging the first PHR value and the second PHR value within the PHR report such that actual PHR values precede virtual PHR values in the PHR report.

In some examples, to support generating the PHR report, the PHR report manager 935 may be configured as or otherwise support a means for arranging the first PHR value and the second PHR value within the PHR report based on an ordering of an earliest uplink transmission repetition of the first set of repetitions and an earliest uplink transmission repetition of the second set of repetitions.

In some examples, the one or more bit field values or one or more additional bit field values indicate whether the first PHR value, the second PHR value, or both, are actual PHR values or virtual PHR values.

In some examples, the capability signaling transmitting manager 945 may be configured as or otherwise support a means for transmitting, to the base station, capability signaling indicating that the UE supports one or more PHR reporting configurations for reporting multiple PHR values per component carrier, where generating the PHR report is based on the capability signaling.

In some examples, the control signaling receiving manager 925 may be configured as or otherwise support a means for receiving, from the base station, additional control signaling including an indication of a PHR reporting configuration from the one or more PHR reporting configurations.

In some examples, the capability signaling transmitting manager 945 may be configured as or otherwise support a means for transmitting, to the base station, capability signaling indicating that the UE supports reporting multiple actual PHR values via the PHR report, where generating the PHR report is based on the capability signaling.

In some examples, the capability signaling transmitting manager 945 may be configured as or otherwise support a means for transmitting, to the base station, capability signaling indicating that the UE supports a determination of actual PHR values based on uplink transmission repetitions scheduled before transmission of the PHR report, scheduled after transmission of the PHR report, or both, where generating the PHR report is based on the capability signaling.

Figure 10:
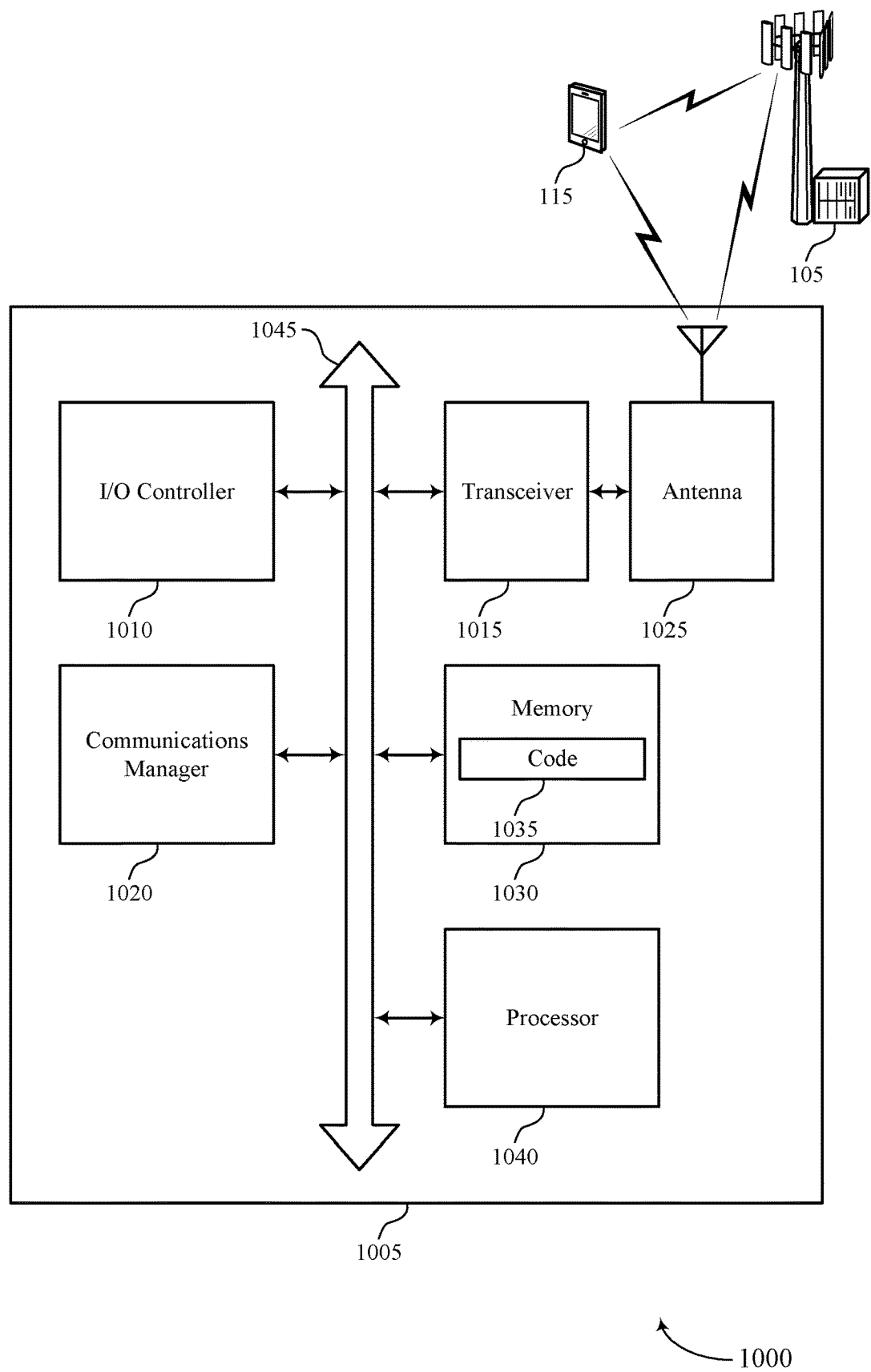
FIG. 10 shows a diagram of a system including a device that supports techniques for reporting PHR for multiple uplink shared channel repetitions in accordance with aspects of the present disclosure.

FIG. 10 shows a diagram of a system 1000 including a device 1005 that supports techniques for reporting PHR for multiple uplink shared channel repetitions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for reporting PHR for multiple uplink shared channel repetitions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The communications manager 1020 may be configured as or otherwise support a means for determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The communications manager 1020 may be configured as or otherwise support a means for generating a PHR report that includes the first PHR value, the second PHR value, or both. The communications manager 1020 may be configured as or otherwise support a means for transmitting the PHR report to the base station.

By including or configuring the communications manager 1020 in accordance with examples as described herein, the device 1005 may support techniques which provide for improved PHR reporting in the context of linked PUSCH transmissions associated performed using multiple beams at a UE 115 (e.g., mTRP). In particular, aspects of the present disclosure may enable UEs to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting at UEs 115, and may reduce a quantity of signaling used for PHR reporting, which may lead to reduced control signaling and more efficient utilization of resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for reporting PHR for multiple uplink shared channel repetitions as described herein, or the processor 1040 and the memory 1030 may be otherwise configured to perform or support such operations.

Figure 11:
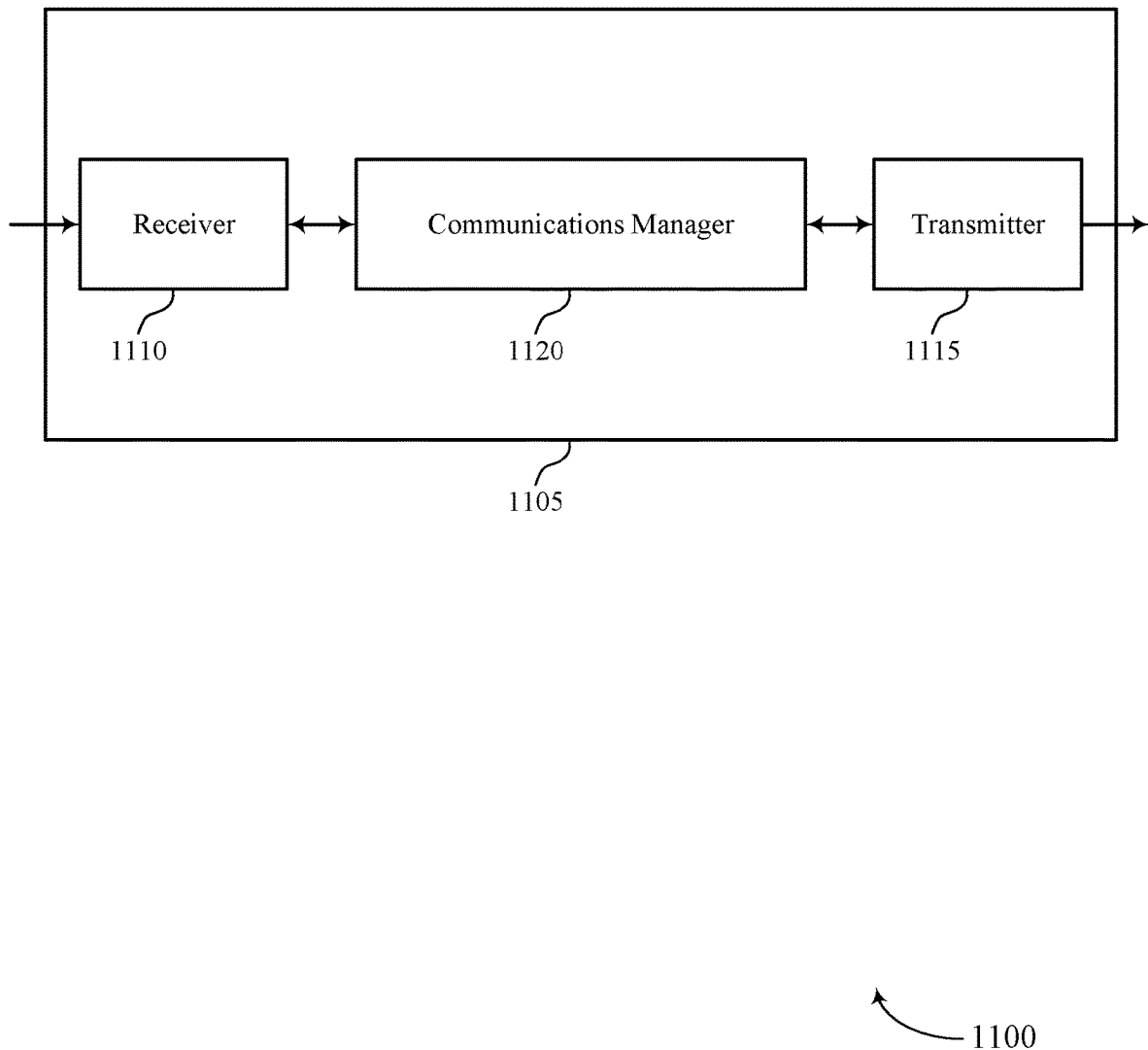
FIGS. 11 and 12 show block diagrams of devices that support techniques for reporting PHR for multiple uplink shared channel repetitions in accordance with aspects of the present disclosure.

FIG. 11 shows a block diagram 1100 of a device 1105 that supports techniques for reporting PHR for multiple uplink shared channel repetitions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for reporting PHR for multiple uplink shared channel repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for reporting PHR for multiple uplink shared channel repetitions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for reporting PHR for multiple uplink shared channel repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set. The communications manager 1120 may be configured as or otherwise support a means for receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques which provide for improved PHR reporting in the context of linked PUSCH transmissions associated performed using multiple beams at a UE 115 (e.g., mTRP). In particular, aspects of the present disclosure may enable UEs to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting at UEs 115, and may reduce a quantity of signaling used for PHR reporting, which may lead to reduced control signaling and more efficient utilization of resources.

Figure 12:
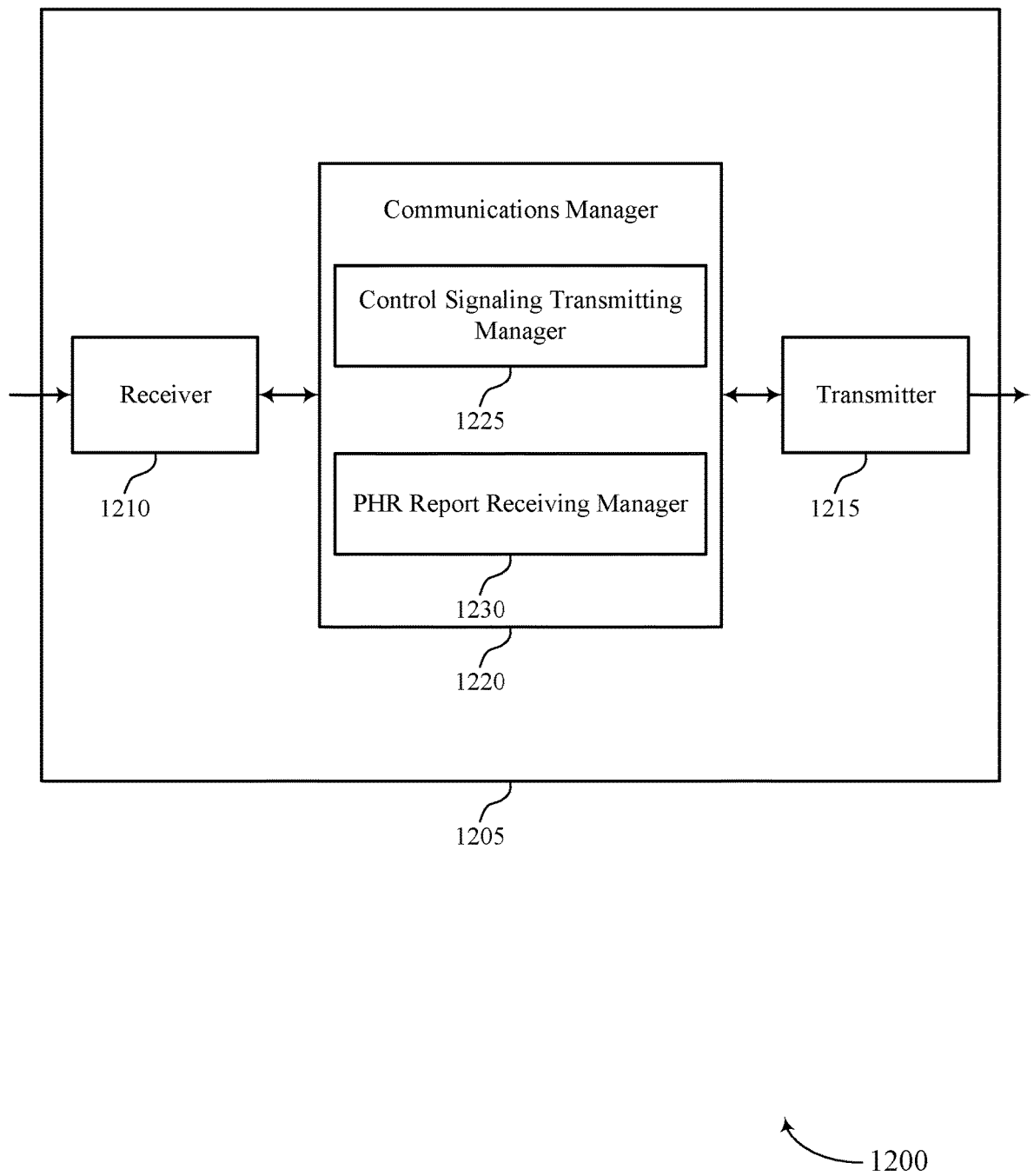

FIG. 12 shows a block diagram 1200 of a device 1205 that supports techniques for reporting PHR for multiple uplink shared channel repetitions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for reporting PHR for multiple uplink shared channel repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for reporting PHR for multiple uplink shared channel repetitions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for reporting PHR for multiple uplink shared channel repetitions as described herein. For example, the communications manager 1220 may include a control signaling transmitting manager 1225 an PHR report receiving manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The control signaling transmitting manager 1225 may be configured as or otherwise support a means for transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set. The PHR report receiving manager 1230 may be configured as or otherwise support a means for receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

Figure 13:
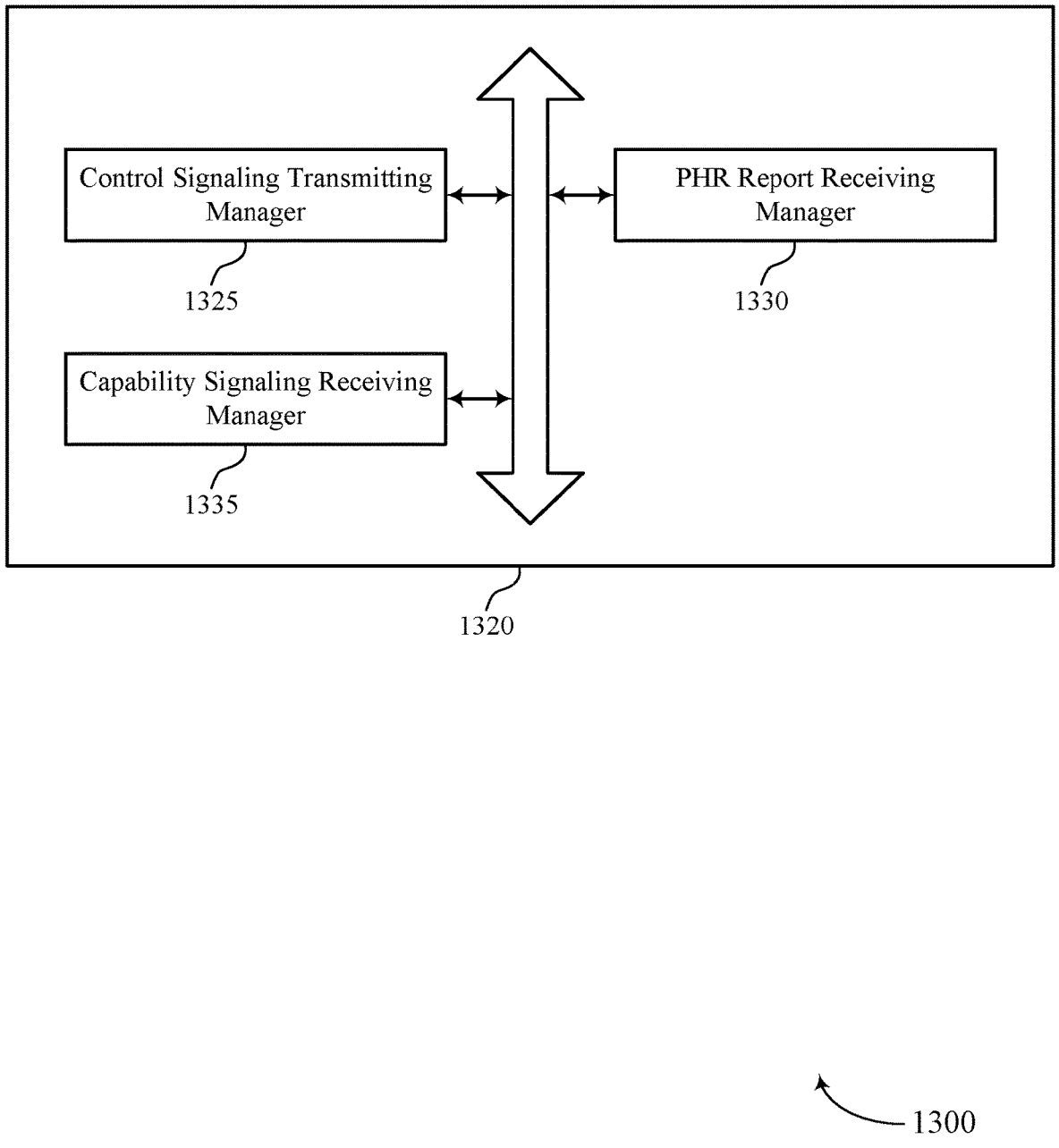
FIG. 13 shows a block diagram of a communications manager that supports techniques for reporting PHR for multiple uplink shared channel repetitions in accordance with aspects of the present disclosure.

FIG. 13 shows a block diagram 1300 of a communications manager 1320 that supports techniques for reporting PHR for multiple uplink shared channel repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for reporting PHR for multiple uplink shared channel repetitions as described herein. For example, the communications manager 1320 may include a control signaling transmitting manager 1325, an PHR report receiving manager 1330, a capability signaling receiving manager 1335, or any combination thereof. Each of these components may communicate, directly or indirectly, with one another (e.g., via one or more buses).

The communications manager 1320 may support wireless communication at a base station in accordance with examples as disclosed herein. The control signaling transmitting manager 1325 may be configured as or otherwise support a means for transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set. The PHR report receiving manager 1330 may be configured as or otherwise support a means for receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

In some examples, the first rule defines the second PHR value as virtual regardless of whether the first PHR value is actual or virtual. In some examples, first rule defines the second PHR value as actual based on the first PHR value also being actual.

In some examples, to support receiving the PHR report, the PHR report receiving manager 1330 may be configured as or otherwise support a means for receiving, via the PHR report, one or more bit field values indicating that the PHR report includes the first PHR value and the second PHR value for a first component carrier.

In some examples, the first PHR value and the second PHR value are arranged within the PHR report based on an ordering of the first SRS resource set and the second SRS resource set. In some examples, the first PHR value is first in the PHR report if the ordering includes the first SRS resource set before the second SRS resource set. In some examples, the second PHR value is first in the PHR report if the ordering includes the second SRS resource set before the first SRS resource set.

In some examples, the first PHR value and the second PHR value are arranged within the PHR report such that actual PHR values precede virtual PHR values in the PHR report. In some examples, the first PHR value and the second PHR value are arranged within the PHR report based on an ordering of an earliest uplink transmission repetition of the first set of repetitions and an earliest uplink transmission repetition of the second set of repetitions. In some examples, the one or more bit field values or one or more additional bit field values indicate whether the first PHR value, the second PHR value, or both, are actual PHR values or virtual PHR values.

In some examples, the capability signaling receiving manager 1335 may be configured as or otherwise support a means for receiving, from the UE, capability signaling indicating that the UE supports one or more PHR reporting configurations for reporting multiple PHR values per component carrier.

In some examples, the control signaling transmitting manager 1325 may be configured as or otherwise support a means for transmitting, to the UE, additional control signaling including an indication of a PHR reporting configuration from the one or more PHR reporting configurations.

In some examples, the capability signaling receiving manager 1335 may be configured as or otherwise support a means for receiving, from the UE, capability signaling indicating that the UE supports reporting multiple actual PHR values via the PHR report. In some examples, the capability signaling receiving manager 1335 may be configured as or otherwise support a means for receiving, from the UE, capability signaling indicating that the UE supports a determination of actual PHR values based on uplink transmission repetitions scheduled before transmission of the PHR report, scheduled after transmission of the PHR report, or both.

Figure 14:
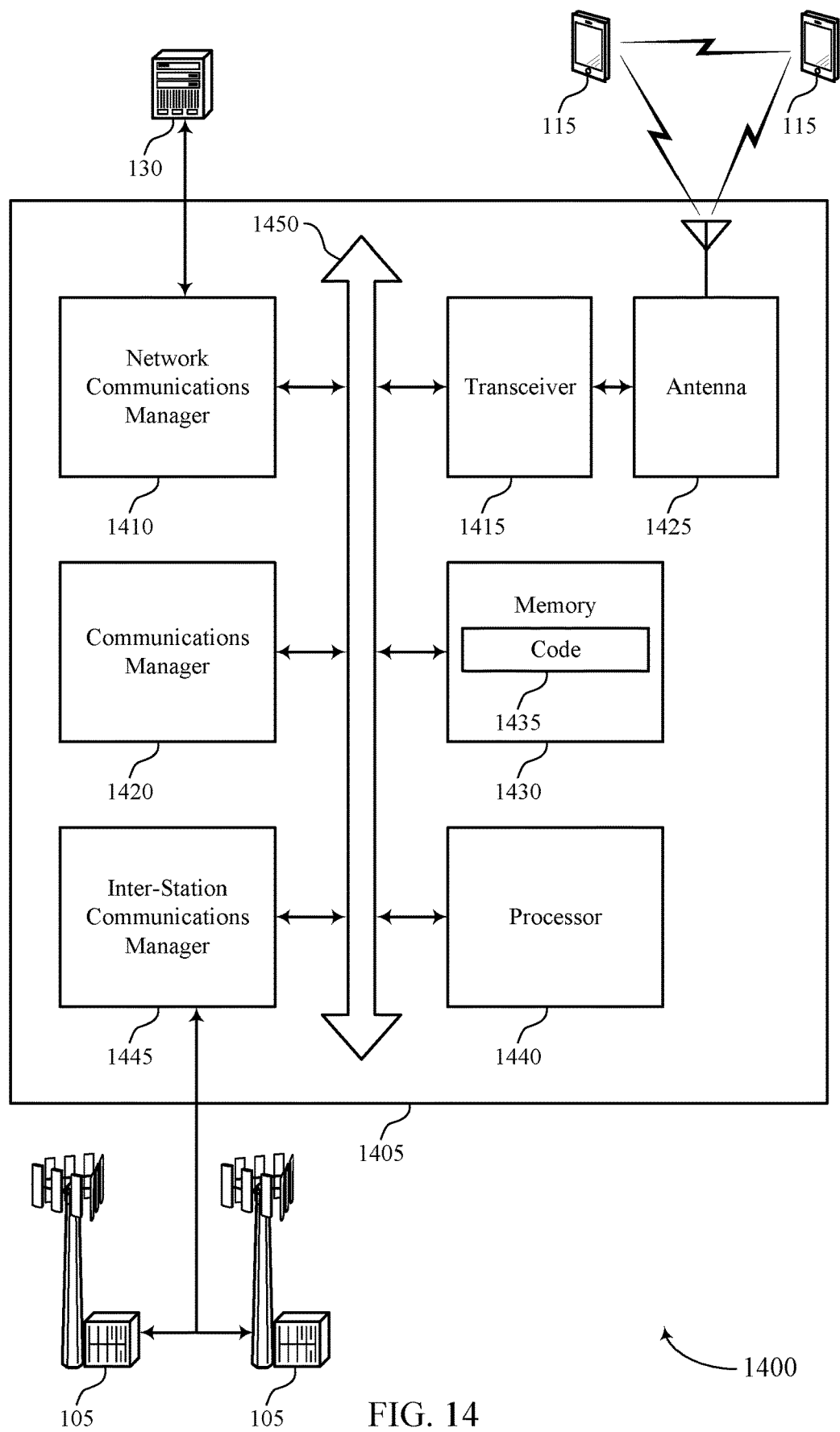
FIG. 14 shows a diagram of a system including a device that supports techniques for reporting PHR for multiple uplink shared channel repetitions in accordance with aspects of the present disclosure.

FIG. 14 shows a diagram of a system 1400 including a device 1405 that supports techniques for reporting PHR for multiple uplink shared channel repetitions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for reporting PHR for multiple uplink shared channel repetitions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set. The communications manager 1420 may be configured as or otherwise support a means for receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets.

By including or configuring the communications manager 1420 in accordance with examples as described herein, the device 1405 may support techniques which provide for improved PHR reporting in the context of linked PUSCH transmissions associated performed using multiple beams at a UE 115 (e.g., mTRP). In particular, aspects of the present disclosure may enable UEs to support different rules for reporting multiple PHR values for a single component carrier when the component carrier is scheduled for PUSCH repetitions using multiple beams. By enabling multiple PHR values to be reported for mTRP PUSCH repetitions, aspects of the present disclosure may improve PHR reporting at UEs 115, and may reduce a quantity of signaling used for PHR reporting, which may lead to reduced control signaling and more efficient utilization of resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for reporting PHR for multiple uplink shared channel repetitions as described herein, or the processor 1440 and the memory 1430 may be otherwise configured to perform or support such operations.

Figure 15:
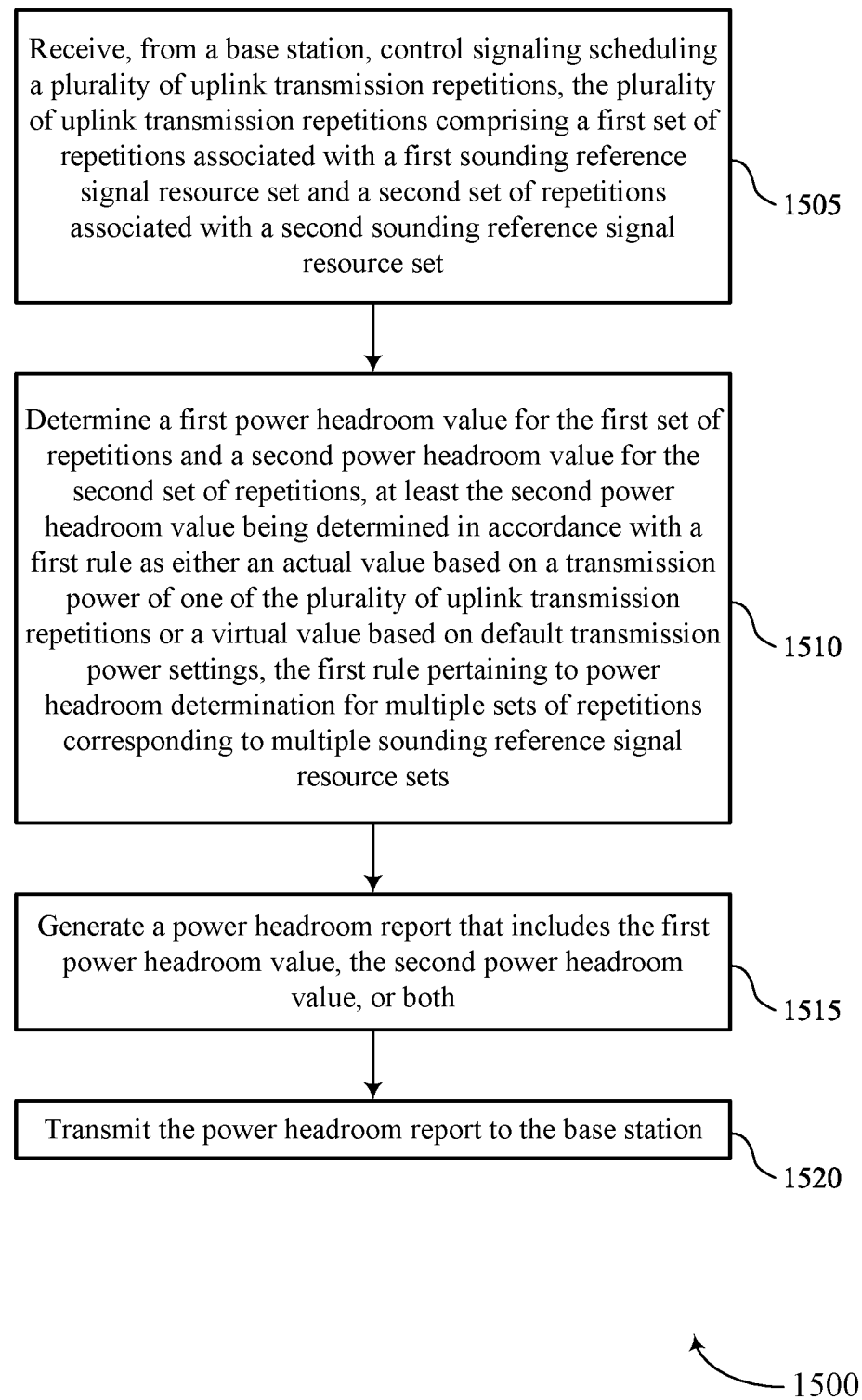
FIGS. 15 through 20 show flowcharts illustrating methods that support techniques for reporting PHR for multiple uplink shared channel repetitions in accordance with aspects of the present disclosure.

FIG. 15 shows a flowchart illustrating a method 1500 that supports techniques for reporting PHR for multiple uplink shared channel repetitions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The operations of 1505 may be performed in accordance with examples as disclosed herein. In some examples, aspects of the operations of 1505 may be performed by a control signaling receiving manager 925 as described with reference to FIG. 9.

At 1510, the method may include determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The operations of 1510 may be performed in accordance with examples as disclosed herein. In some examples, aspects of the operations of 1510 may be performed by an PHR value manager 930 as described with reference to FIG. 9.

At 1515, the method may include generating a PHR report that includes the first PHR value, the second PHR value, or both. The operations of 1515 may be performed in accordance with examples as disclosed herein. In some examples, aspects of the operations of 1515 may be performed by an PHR report manager 935 as described with reference to FIG. 9.

At 1520, the method may include transmitting the PHR report to the base station. The operations of 1520 may be performed in accordance with examples as disclosed herein. In some examples, aspects of the operations of 1520 may be performed by an PHR report transmitting manager 940 as described with reference to FIG. 9.

Figure 16:
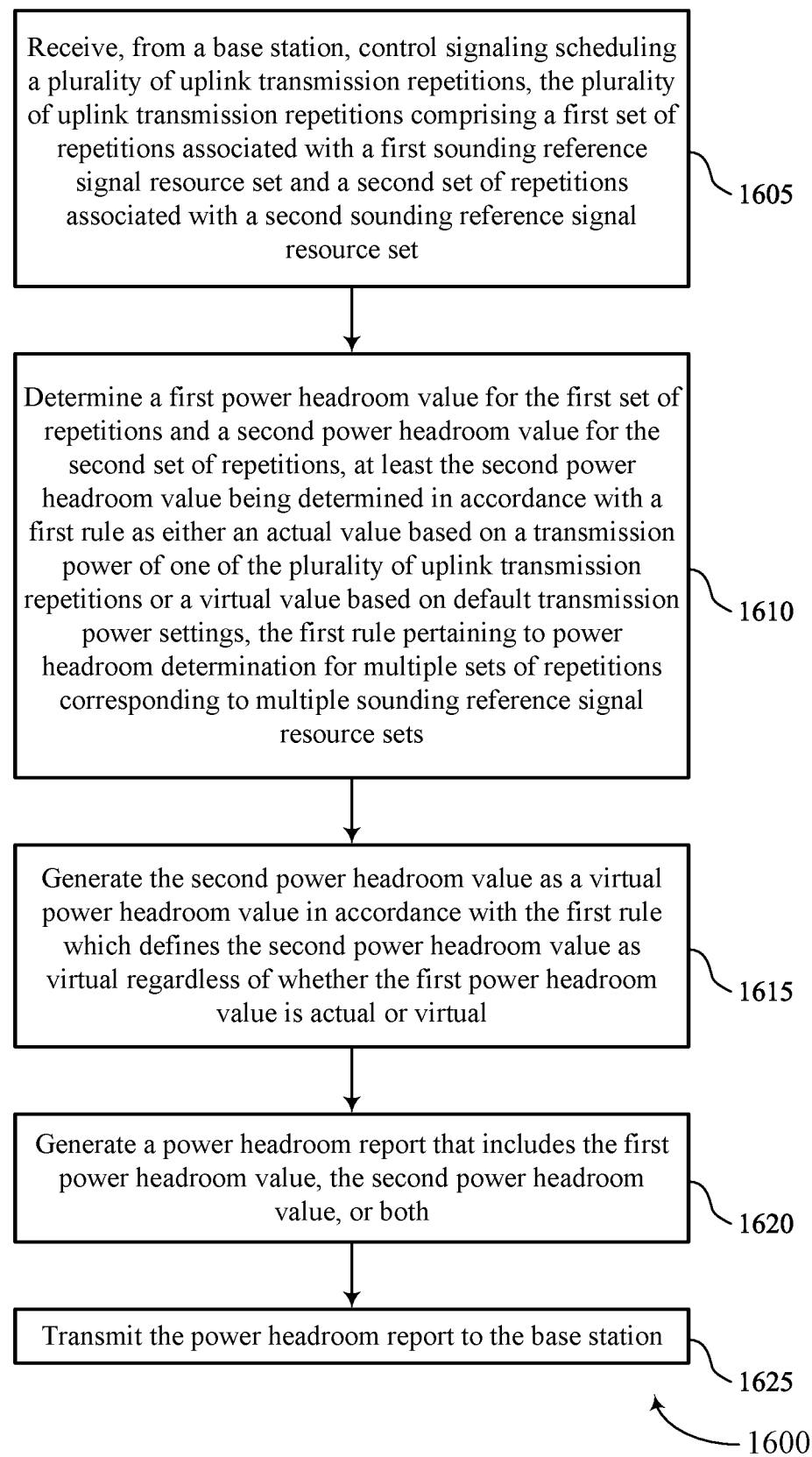

FIG. 16 shows a flowchart illustrating a method 1600 that supports techniques for reporting PHR for multiple uplink shared channel repetitions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The operations of 1605 may be performed in accordance with examples as disclosed herein. In some examples, aspects of the operations of 1605 may be performed by a control signaling receiving manager 925 as described with reference to FIG. 9.

At 1610, the method may include determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The operations of 1610 may be performed in accordance with examples as disclosed herein. In some examples, aspects of the operations of 1610 may be performed by an PHR value manager 930 as described with reference to FIG. 9.

At 1615, the method may include generating the second PHR value as a virtual PHR value in accordance with the first rule which defines the second PHR value as virtual regardless of whether the first PHR value is actual or virtual. The operations of 1615 may be performed in accordance with examples as disclosed herein. In some examples, aspects of the operations of 1615 may be performed by an PHR value manager 930 as described with reference to FIG. 9.

At 1620, the method may include generating a PHR report that includes the first PHR value, the second PHR value, or both. The operations of 1620 may be performed in accordance with examples as disclosed herein. In some examples, aspects of the operations of 1620 may be performed by an PHR report manager 935 as described with reference to FIG. 9.

At 1625, the method may include transmitting the PHR report to the base station. The operations of 1625 may be performed in accordance with examples as disclosed herein. In some examples, aspects of the operations of 1625 may be performed by an PHR report transmitting manager 940 as described with reference to FIG. 9.

Figure 17:
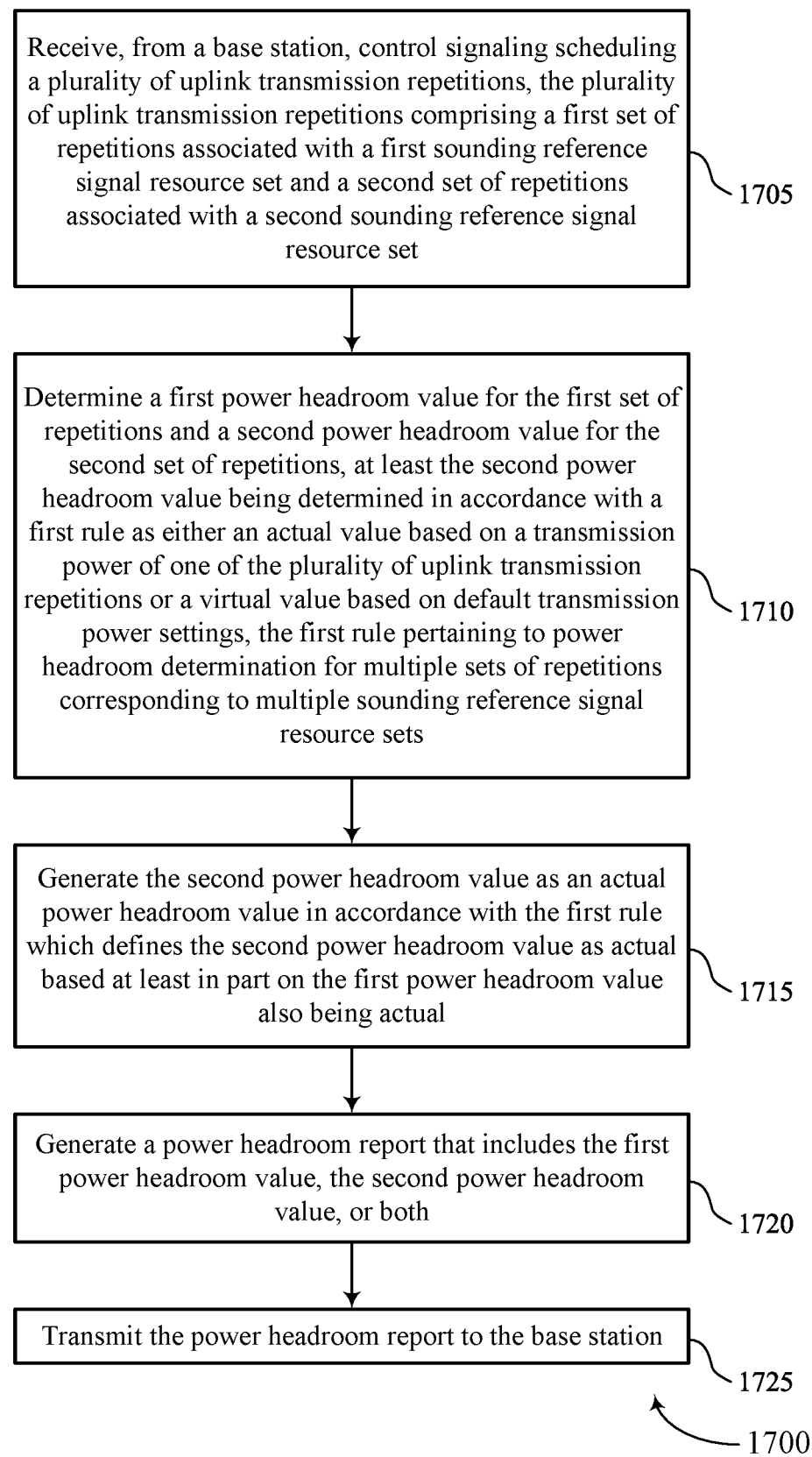

FIG. 17 shows a flowchart illustrating a method 1700 that supports techniques for reporting PHR for multiple uplink shared channel repetitions in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The operations of 1705 may be performed in accordance with examples as disclosed herein. In some examples, aspects of the operations of 1705 may be performed by a control signaling receiving manager 925 as described with reference to FIG. 9.

At 1710, the method may include determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The operations of 1710 may be performed in accordance with examples as disclosed herein. In some examples, aspects of the operations of 1710 may be performed by an PHR value manager 930 as described with reference to FIG. 9.

At 1715, the method may include generating the second PHR value as an actual PHR value in accordance with the first rule which defines the second PHR value as actual based on the first PHR value also being actual. The operations of 1715 may be performed in accordance with examples as disclosed herein. In some examples, aspects of the operations of 1715 may be performed by an PHR value manager 930 as described with reference to FIG. 9.

At 1720, the method may include generating a PHR report that includes the first PHR value, the second PHR value, or both. The operations of 1720 may be performed in accordance with examples as disclosed herein. In some examples, aspects of the operations of 1720 may be performed by an PHR report manager 935 as described with reference to FIG. 9.

At 1725, the method may include transmitting the PHR report to the base station. The operations of 1725 may be performed in accordance with examples as disclosed herein. In some examples, aspects of the operations of 1725 may be performed by an PHR report transmitting manager 940 as described with reference to FIG. 9.

Figure 18:
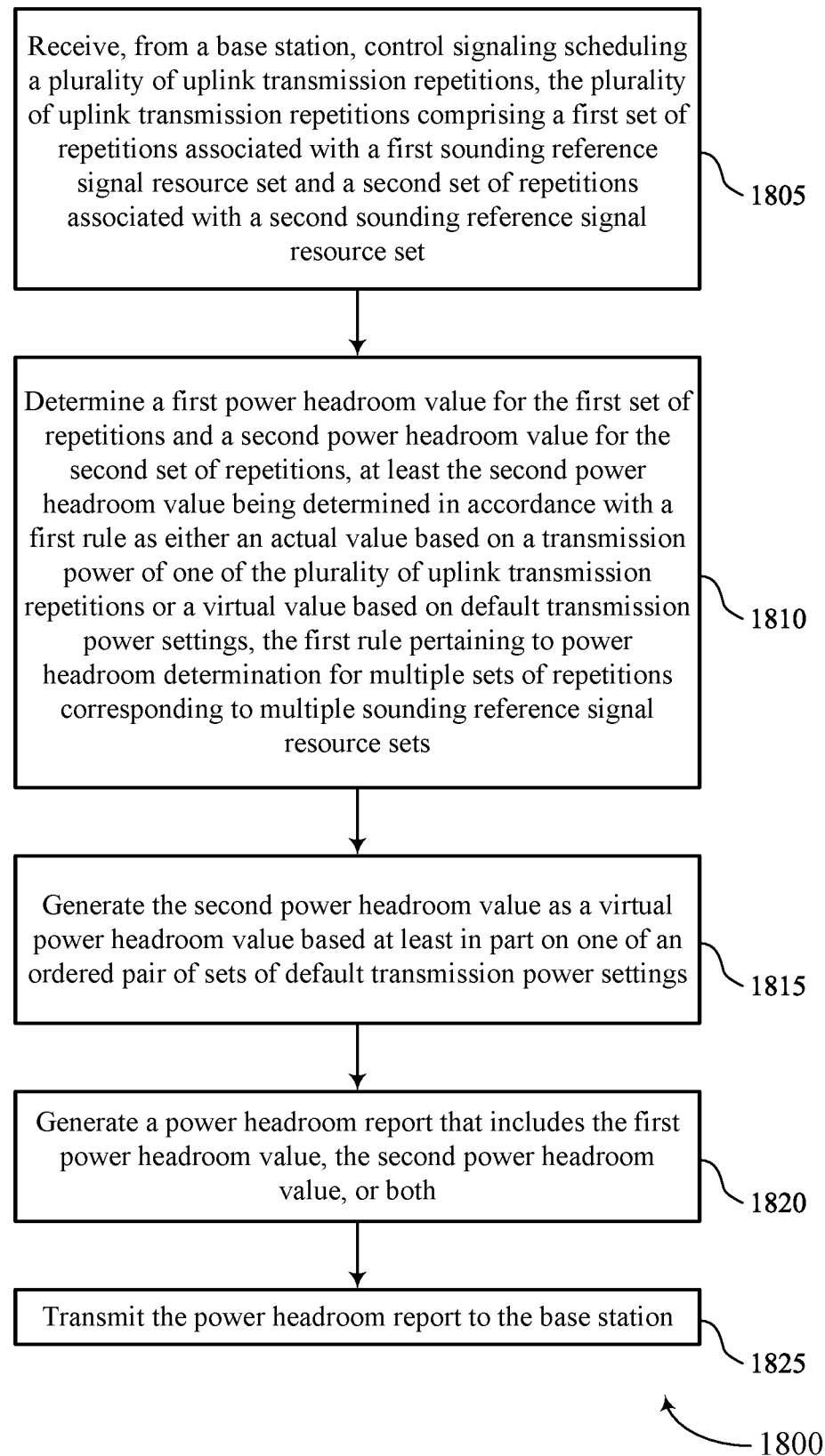

FIG. 18 shows a flowchart illustrating a method 1800 that supports techniques for reporting PHR for multiple uplink shared channel repetitions in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The operations of 1805 may be performed in accordance with examples as disclosed herein. In some examples, aspects of the operations of 1805 may be performed by a control signaling receiving manager 925 as described with reference to FIG. 9.

At 1810, the method may include determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The operations of 1810 may be performed in accordance with examples as disclosed herein. In some examples, aspects of the operations of 1810 may be performed by an PHR value manager 930 as described with reference to FIG. 9.

At 1815, the method may include generating the second PHR value as a virtual PHR value based on one of an ordered pair of sets of default transmission power settings. The operations of 1815 may be performed in accordance with examples as disclosed herein. In some examples, aspects of the operations of 1815 may be performed by an PHR value manager 930 as described with reference to FIG. 9.

At 1820, the method may include generating a PHR report that includes the first PHR value, the second PHR value, or both. The operations of 1820 may be performed in accordance with examples as disclosed herein. In some examples, aspects of the operations of 1820 may be performed by an PHR report manager 935 as described with reference to FIG. 9.

At 1825, the method may include transmitting the PHR report to the base station. The operations of 1825 may be performed in accordance with examples as disclosed herein. In some examples, aspects of the operations of 1825 may be performed by an PHR report transmitting manager 940 as described with reference to FIG. 9.

Figure 19:
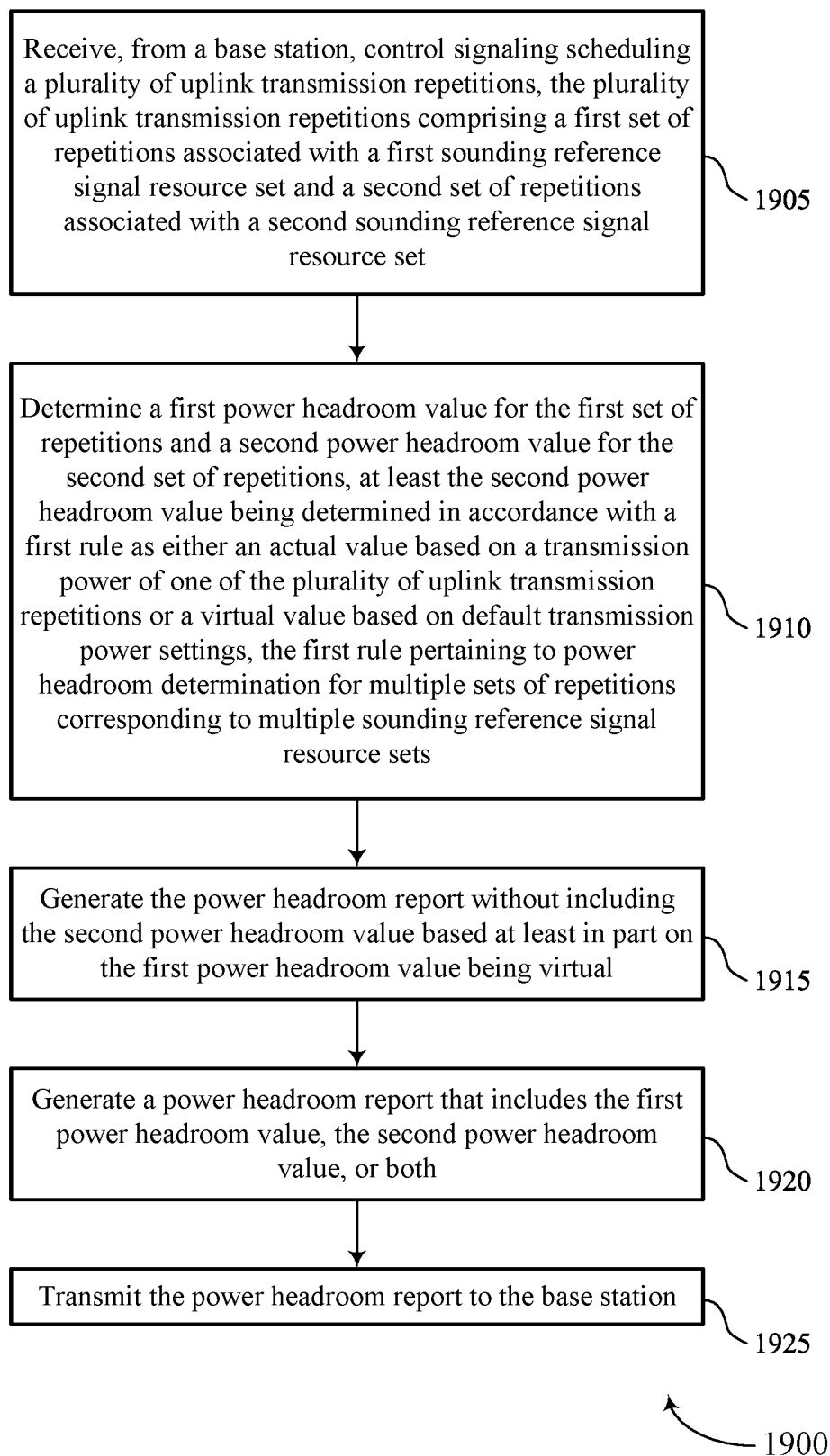

FIG. 19 shows a flowchart illustrating a method 1900 that supports techniques for reporting PHR for multiple uplink shared channel repetitions in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control signaling scheduling a set of multiple uplink transmission repetitions, the set of multiple uplink transmission repetitions including a first set of repetitions associated with a first SRS resource set and a second set of repetitions associated with a second SRS resource set. The operations of 1905 may be performed in accordance with examples as disclosed herein. In some examples, aspects of the operations of 1905 may be performed by a control signaling receiving manager 925 as described with reference to FIG. 9.

At 1910, the method may include determining a first PHR value for the first set of repetitions and a second PHR value for the second set of repetitions, at least the second PHR value being determined in accordance with a first rule as either an actual value based on a transmission power of one of the set of multiple uplink transmission repetitions or a virtual value based on default transmission power settings, the first rule pertaining to PHR determination for multiple sets of repetitions corresponding to multiple SRS resource sets. The operations of 1910 may be performed in accordance with examples as disclosed herein. In some examples, aspects of the operations of 1910 may be performed by an PHR value manager 930 as described with reference to FIG. 9.

At 1915, the method may include generating the PHR report without including the second PHR value based on the first PHR value being virtual. The operations of 1915 may be performed in accordance with examples as disclosed herein. In some examples, aspects of the operations of 1915 may be performed by an PHR value manager 930 as described with reference to FIG. 9.

At 1920, the method may include generating a PHR report that includes the first PHR value, the second PHR value, or both. The operations of 1920 may be performed in accordance with examples as disclosed herein. In some examples, aspects of the operations of 1920 may be performed by an PHR report manager 935 as described with reference to FIG. 9.

At 1925, the method may include transmitting the PHR report to the base station. The operations of 1925 may be performed in accordance with examples as disclosed herein. In some examples, aspects of the operations of 1925 may be performed by an PHR report transmitting manager 940 as described with reference to FIG. 9.

Figure 20:
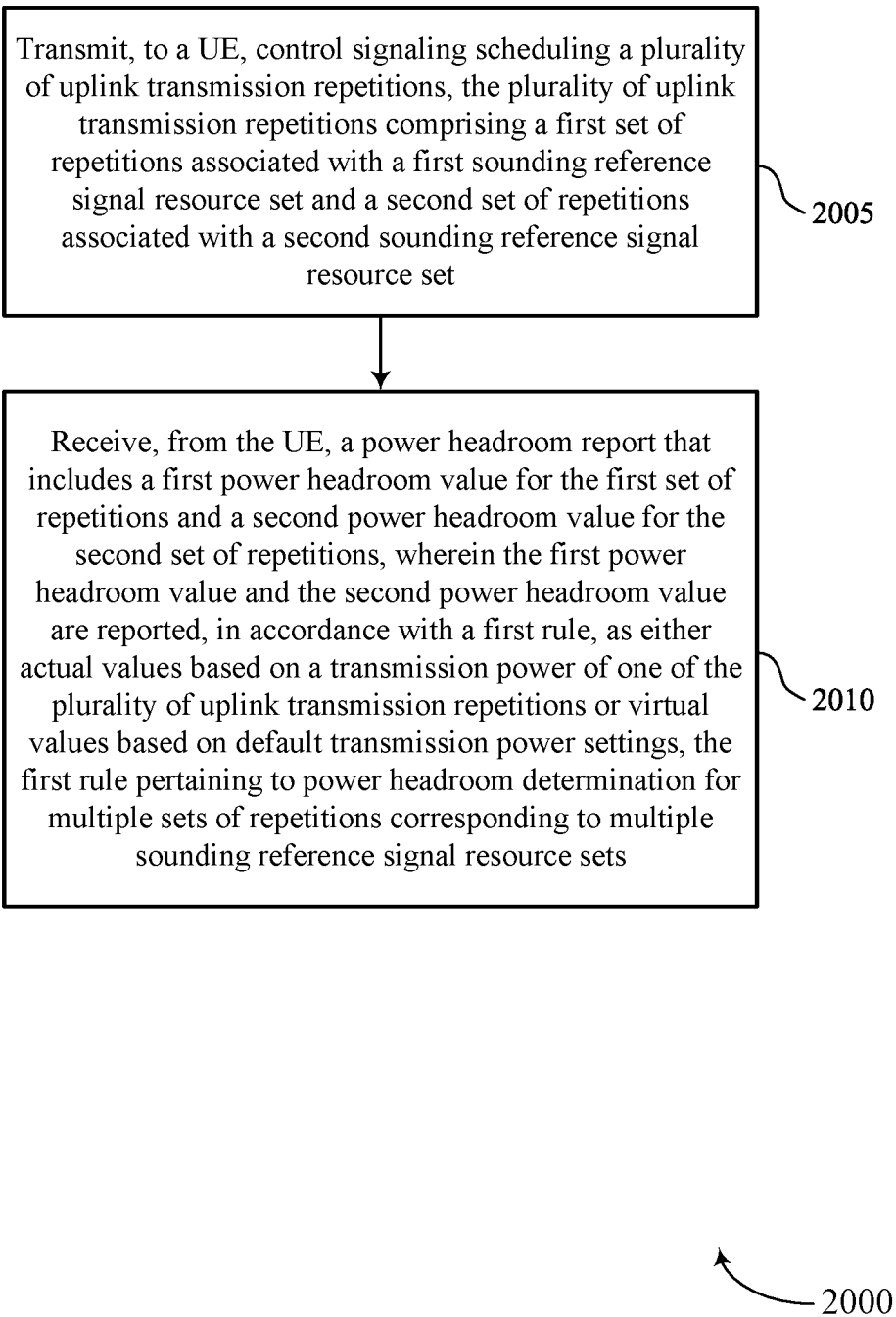

FIG. 20 shows a flowchart illustrating a method 2000 that supports techniques for reporting PHR for multiple uplink shared channel repetitions in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control signaling scheduling a set of multiple uplink transmission repetitions, the set of multiple uplink transmission repetitions including a first set of repetitions associated with a first SRS resource set and a second set of repetitions associated with a second SRS resource set. The operations of 2005 may be performed in accordance with examples as disclosed herein. In some examples, aspects of the operations of 2005 may be performed by a control signaling transmitting manager 1325 as described with reference to FIG. 13.

At 2010, the method may include receiving, from the UE, a PHR report that includes a first PHR value for the first set of repetitions and a second PHR value for the second set of repetitions, where the first PHR value and the second PHR value are reported, in accordance with a first rule, as either actual values based on a transmission power of one of the set of multiple uplink transmission repetitions or virtual values based on default transmission power settings, the first rule pertaining to PHR determination for multiple sets of repetitions corresponding to multiple SRS resource sets. The operations of 2010 may be performed in accordance with examples as disclosed herein. In some examples, aspects of the operations of 2010 may be performed by an PHR report receiving manager 1330 as described with reference to FIG. 13.

The following provides an overview of aspects of the present disclosure:

Aspect 1: A method for wireless communication at a UE, comprising: receiving, from a base station, control signaling scheduling a plurality of uplink transmission repetitions, the plurality of uplink transmission repetitions comprising a first set of repetitions associated with a first SRS resource set and a second set of repetitions associated with a second SRS resource set; determining a first PHR value for the first set of repetitions and a second PHR value for the second set of repetitions, at least the second PHR value being determined in accordance with a first rule as either an actual value based on a transmission power of one of the plurality of uplink transmission repetitions or a virtual value based on default transmission power settings, the first rule pertaining to PHR determination for multiple sets of repetitions corresponding to multiple SRS resource sets; generating a PHR report that includes the first PHR value, the second PHR value, or both; and transmitting the PHR report to the base station.

Aspect 2: The method of aspect 1, wherein determining the first PHR value and the second PHR value further comprises: generating the second PHR value as a virtual PHR value in accordance with the first rule which defines the second PHR value as virtual regardless of whether the first PHR value is actual or virtual.

Aspect 3: The method of any of aspects 1 through 2, wherein determining the first PHR value and the second PHR value further comprises: generating the second PHR value as an actual PHR value in accordance with the first rule which defines the second PHR value as actual based at least in part on the first PHR value also being actual.

Aspect 4: The method of any of aspects 1 through 3, wherein determining the first PHR value and the second PHR value further comprises: generating the second PHR value as a virtual PHR value based at least in part on one of an ordered pair of sets of default transmission power settings.

Aspect 5: The method of aspect 4, wherein each of the sets of default transmission power settings includes one or more of a reference power level value, a reference pathloss compensation value, a reference pathloss value associated with a reference signal, or a reference closed loop index.

Aspect 6: The method of any of aspects 4 through 5, wherein a first of the ordered pair of sets of default transmission power settings is associated with the first sounding reference resource set and a second of the ordered pair of sets of default transmission power settings is associated with the second sounding reference resource set, the method further comprising: selecting the second of the ordered pair for generating the second PHR value as a virtual PHR value based at least in part on the second SRS resource set being associated with the virtual value.

Aspect 7: The method of any of aspects 4 through 6, further comprising: selecting a second of the ordered pair of sets of default transmission power settings as the one of the ordered pair of sets of default transmission power settings based at least in part on the PHR report including both the first PHR value and the second PHR value.

Aspect 8: The method of any of aspects 1 through 7, wherein determining the first PHR value and the second PHR value further comprises: generating the first PHR value as a virtual PHR value based at least in part on each of the first set of repetitions being transmitted in a different transmission time interval as the PHR report.

Aspect 9: The method of any of aspects 1 through 8, wherein generating the PHR report further comprises: generating the PHR report without including the second PHR value based at least in part on the first PHR value being virtual.

Aspect 10: The method of any of aspects 1 through 9, wherein determining the first PHR value and the second PHR value further comprises: generating the first PHR value as an actual PHR value based at least in part on an uplink transmission repetition of the first set of repetitions being transmitted in a same transmission time interval as the PHR report.

Aspect 11: The method of any of aspects 1 through 10, wherein determining the first PHR value and the second PHR value further comprises: generating the second PHR value as an actual PHR value based at least in part on a first uplink transmission repetition of the first set of repetitions being transmitted in a same transmission time interval as the PHR report.

Aspect 12: The method of aspect 11, wherein determining the first PHR value and the second PHR value further comprises: generating the second PHR value based at least in part on a transmission power associated with an uplink transmission repetition of the second set of repetitions which is closest in time to the same transmission time interval in which the PHR report is transmitted.

Aspect 13: The method of aspect 12, further comprising: selecting the uplink transmission repetition of the second set of repetitions based at least in part on a preference for repetitions of the second set of repetitions that precede or are during the same transmission time interval in which the PHR report is transmitted.

Aspect 14: The method of any of aspects 1 through 13, wherein determining the first PHR value and the second PHR value further comprises: generating the second PHR value as an actual PHR value based at least in part on a first uplink transmission repetition of the first set of repetitions being transmitted in a same transmission time interval as the PHR report and based at least in part on one or more uplink transmission repetitions of the second set of repetitions preceding or being during the same transmission time interval in which the PHR report is transmitted.

Aspect 15: The method of aspect 14, wherein determining the first PHR value and the second PHR value further comprises: generating the second PHR value based at least in part on a transmission power associated with an uplink transmission repetition of the second set of repetitions which is closest in time to the same transmission time interval in which the PHR report is transmitted.

Aspect 16: The method of any of aspects 1 through 15, wherein determining the first PHR value and the second PHR value further comprises: generating the second PHR value as an actual PHR value based at least in part on a first uplink transmission repetition of the first set of repetitions being transmitted in a same transmission time interval as the PHR report and based at least in part on one or more uplink transmission repetitions of the second set of repetitions being during the same transmission time interval in which the PHR report is transmitted or during an overlapping transmission time interval that overlaps with the same transmission time interval in which the PHR report is transmitted.

Aspect 17: The method of aspect 16, wherein determining the first PHR value and the second PHR value further comprises: generating the first PHR value as an actual PHR value based at least in part on a transmission power of an earliest uplink transmission repetition of the first set of repetitions in the overlapping transmission time interval or in the same transmission time interval in which the PHR report is transmitted; and generating the second PHR value based at least in part on a transmission power associated with an earliest uplink transmission repetition of the second set of repetitions in the overlapping transmission time interval or in the same transmission time interval in which the PHR report is transmitted.

Aspect 18: The method of any of aspects 1 through 17, wherein transmitting the PHR report to the base station further comprises: transmitting, via the PHR report, one or more bit field values indicating whether the PHR report comprises the first PHR value, the second PHR value, or both, for a first component carrier.

Aspect 19: The method of aspect 18, wherein generating the PHR report further comprises: arranging the first PHR value and the second PHR value within the PHR report based at least in part on an ordering of the first SRS resource set and the second SRS resource set, wherein the first PHR value is first in the PHR report if the ordering includes the first SRS resource set before the second SRS resource set, and wherein the second PHR value is first in the PHR report if the ordering includes the second SRS resource set before the first SRS resource set.

Aspect 20: The method of any of aspects 18 through 19, wherein generating the PHR report further comprises: arranging the first PHR value and the second PHR value within the PHR report such that actual PHR values precede virtual PHR values in the PHR report.

Aspect 21: The method of any of aspects 18 through 20, wherein generating the PHR report further comprises: arranging the first PHR value and the second PHR value within the PHR report based at least in part on an ordering of an earliest uplink transmission repetition of the first set of repetitions and an earliest uplink transmission repetition of the second set of repetitions.

Aspect 22: The method of any of aspects 18 through 21, wherein the one or more bit field values or one or more additional bit field values indicate whether the first PHR value, the second PHR value, or both, are actual PHR values or virtual PHR values.

Aspect 23: The method of any of aspects 1 through 22, further comprising: transmitting, to the base station, capability signaling indicating that the UE supports one or more PHR reporting configurations for reporting multiple PHR values per component carrier, wherein generating the PHR report is based at least in part on the capability signaling.

Aspect 24: The method of aspect 23, further comprising: receiving, from the base station, additional control signaling comprising an indication of a PHR reporting configuration from the one or more PHR reporting configurations.

Aspect 25: The method of any of aspects 1 through 24, further comprising: transmitting, to the base station, capability signaling indicating that the UE supports reporting multiple actual PHR values via the PHR report, wherein generating the PHR report is based at least in part on the capability signaling.

Aspect 26: The method of any of aspects 1 through 25, further comprising: transmitting, to the base station, capability signaling indicating that the UE supports a determination of actual PHR values based on uplink transmission repetitions scheduled before transmission of the PHR report, scheduled after transmission of the PHR report, or both, wherein generating the PHR report is based at least in part on the capability signaling.

Aspect 27: A method for wireless communication at a base station, comprising: transmitting, to a UE, control signaling scheduling a plurality of uplink transmission repetitions, the plurality of uplink transmission repetitions comprising a first set of repetitions associated with a first SRS resource set and a second set of repetitions associated with a second SRS resource set; and receiving, from the UE, a PHR report that includes a first PHR value for the first set of repetitions and a second PHR value for the second set of repetitions, wherein the first PHR value and the second PHR value are reported, in accordance with a first rule, as either actual values based on a transmission power of one of the plurality of uplink transmission repetitions or virtual values based on default transmission power settings, the first rule pertaining to PHR determination for multiple sets of repetitions corresponding to multiple SRS resource sets.

Aspect 28: The method of aspect 27, wherein the first rule defines the second PHR value as virtual regardless of whether the first PHR value is actual or virtual.

Aspect 29: The method of any of aspects 27 through 28, wherein first rule defines the second PHR value as actual based at least in part on the first PHR value also being actual.

Aspect 30: The method of any of aspects 27 through 29, wherein receiving the PHR report further comprises: receiving, via the PHR report, one or more bit field values indicating that the PHR report comprises the first PHR value and the second PHR value for a first component carrier.

Aspect 31: The method of aspect 30, wherein the first PHR value and the second PHR value are arranged within the PHR report based at least in part on an ordering of the first SRS resource set and the second SRS resource set, the first PHR value is first in the PHR report if the ordering includes the first SRS resource set before the second SRS resource set, and the second PHR value is first in the PHR report if the ordering includes the second SRS resource set before the first SRS resource set.

Aspect 32: The method of any of aspects 30 through 31, wherein the first PHR value and the second PHR value are arranged within the PHR report such that actual PHR values precede virtual PHR values in the PHR report.

Aspect 33: The method of any of aspects 30 through 32, wherein the first PHR value and the second PHR value are arranged within the PHR report based at least in part on an ordering of an earliest uplink transmission repetition of the first set of repetitions and an earliest uplink transmission repetition of the second set of repetitions.

Aspect 34: The method of any of aspects 30 through 33, wherein the one or more bit field values or one or more additional bit field values indicate whether the first PHR value, the second PHR value, or both, are actual PHR values or virtual PHR values.

Aspect 35: The method of any of aspects 27 through 34, further comprising: receiving, from the UE, capability signaling indicating that the UE supports one or more PHR reporting configurations for reporting multiple PHR values per component carrier.

Aspect 36: The method of aspect 35, further comprising: transmitting, to the UE, additional control signaling comprising an indication of a PHR reporting configuration from the one or more PHR reporting configurations.

Aspect 37: The method of any of aspects 27 through 36, further comprising: receiving, from the UE, capability signaling indicating that the UE supports reporting multiple actual PHR values via the PHR report.

Aspect 38: The method of any of aspects 27 through 37, further comprising: receiving, from the UE, capability signaling indicating that the UE supports a determination of actual PHR values based on uplink transmission repetitions scheduled before transmission of the PHR report, scheduled after transmission of the PHR report, or both.

Aspect 39: An apparatus for wireless communication at a UE, comprising at least one processor; memory coupled with the at least one processor; and instructions stored in the memory and executable by the at least one processor to cause the apparatus to perform a method of any of aspects 1 through 26.

Aspect 40: An apparatus for wireless communication at a UE, comprising at least one means for performing a method of any of aspects 1 through 26.

Aspect 41: A non-transitory computer-readable medium storing code for wireless communication at a UE, the code comprising instructions executable by at least one processor to perform a method of any of aspects 1 through 26.

Aspect 42: An apparatus for wireless communication at a base station, comprising at least one processor; memory coupled with the at least one processor; and instructions stored in the memory and executable by the at least one processor to cause the apparatus to perform a method of any of aspects 27 through 38.

Aspect 43: An apparatus for wireless communication at a base station, comprising at least one means for performing a method of any of aspects 27 through 38.

Aspect 44: A non-transitory computer-readable medium storing code for wireless communication at a base station, the code comprising instructions executable by at least one processor to perform a method of any of aspects 27 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   receive, from a network device, control signaling scheduling a plurality of uplink transmission repetitions, the plurality of uplink transmission repetitions comprising a first set of repetitions associated with a first sounding reference signal resource set and a second set of repetitions associated with a second sounding reference signal resource set;
   determine a first power headroom value for the first set of repetitions and a second power headroom value for the second set of repetitions, at least the second power headroom value being determined as a virtual value based at least in part on one of an ordered pair of sets of default transmission power settings;
   generate a power headroom report that includes the first power headroom value, the second power headroom value, or both; and
   transmit the power headroom report to the network device.

2. The UE of claim 1, wherein each of the sets of default transmission power settings includes one or more of a reference power level value, a reference pathloss compensation value, a reference pathloss value associated with a reference signal, or a reference closed loop index.

3. The UE of claim 1, wherein a first of the ordered pair of sets of default transmission power settings is associated with the first sounding reference signal resource set and a second of the ordered pair of sets of default transmission power settings is associated with the second sounding reference signal resource set, and the one or more processors are individually or collectively further operable to execute the code to cause the UE to:
   select the second of the ordered pair for generating the second power headroom value as a virtual power headroom value based at least in part on the second sounding reference signal resource set being associated with the virtual value.

4. The UE of claim 1, wherein the one or more processors are individually or collectively further operable to execute the code to cause the UE to:
   select a second of the ordered pair of sets of default transmission power settings as the one of the ordered pair of sets of default transmission power settings based at least in part on the power headroom report including both the first power headroom value and the second power headroom value.

5. The UE of claim 1, wherein, to determine the first power headroom value and the second power headroom value, the one or more processors are individually or collectively further operable to execute the code to cause the UE to:
   generate the first power headroom value as a virtual power headroom value based at least in part on each of the first set of repetitions being transmitted in a different transmission time interval as the power headroom report.

6. The UE of claim 1, wherein, to generate the power headroom report, the one or more processors are individually or collectively further operable to execute the code to cause the UE to:
   generate the power headroom report without including the second power headroom value based at least in part on the first power headroom value being virtual.

7. The UE of claim 1, wherein, to determine the first power headroom value and the second power headroom value, the one or more processors are individually or collectively further operable to execute the code to cause the UE to:
   generate the first power headroom value as an actual power headroom value based at least in part on an uplink transmission repetition of the first set of repetitions being transmitted in a same transmission time interval as the power headroom report.

8. The UE of claim 1, wherein, to transmit the power headroom report to the network device, the one or more processors are individually or collectively further operable to execute the code to cause the UE to:
transmit, via the power headroom report, one or more bit field values indicating whether the power headroom report comprises the first power headroom value, the second power headroom value, or both.

9. The UE of claim 8, wherein, to generate the power headroom report, the one or more processors are individually or collectively further operable to execute the code to cause the UE to:
arrange the first power headroom value and the second power headroom value within the power headroom report based at least in part on an ordering of the first sounding reference signal resource set and the second sounding reference signal resource set, wherein the first power headroom value is first in the power headroom report if the ordering includes the first sounding reference signal resource set before the second sounding reference signal resource set, and wherein the second power headroom value is first in the power headroom report if the ordering includes the second sounding reference signal resource set before the first sounding reference signal resource set.

10. The UE of claim 1, wherein the one or more processors are individually or collectively further operable to execute the code to cause the UE to:
transmit, to the network device, capability signaling indicating that the UE supports one or more power headroom reporting configurations for reporting multiple power headroom values per component carrier, wherein generating the power headroom report is based at least in part on the capability signaling.

11. The UE of claim 10, wherein the one or more processors are individually or collectively further operable to execute the code to cause the UE to:
receive, from the network device, additional control signaling comprising an indication of a power headroom reporting configuration from the one or more power headroom reporting configurations.

12. A network device, comprising:
one or more memories storing processor-executable code; and
one or more processors coupled with the one or more memories and individually or collectively operable to execute the code to cause the network device to:
transmit, to a user equipment (UE), control signaling scheduling a plurality of uplink transmission repetitions, the plurality of uplink transmission repetitions comprising a first set of repetitions associated with a first sounding reference signal resource set and a second set of repetitions associated with a second sounding reference signal resource set; and
receive, from the UE, a power headroom report that includes a first power headroom value for the first set of repetitions and a second power headroom value for the second set of repetitions, wherein the second power headroom value is reported as a virtual value based at least in part on one of an ordered pair of sets of default transmission power settings.

13. The network device of claim 12, wherein each of the sets of default transmission power settings includes one or more of a reference power level value, a reference pathloss compensation value, a reference pathloss value associated with a reference signal, or a reference closed loop index.

14. The network device of claim 12, wherein the one or more processors are individually or collectively further operable to execute the code to cause the network device to:
receive, from the UE, capability signaling indicating that the UE supports one or more power headroom reporting configurations for reporting multiple power headroom values per component carrier.

15. The network device of claim 14, wherein the one or more processors are individually or collectively further operable to execute the code to cause the network device to:
transmit, to the UE, additional control signaling comprising an indication of a power headroom reporting configuration from the one or more power headroom reporting configurations.

16. A method for wireless communication at a user equipment (UE), comprising:
receiving, from a network device, control signaling scheduling a plurality of uplink transmission repetitions, the plurality of uplink transmission repetitions comprising a first set of repetitions associated with a first sounding reference signal resource set and a second set of repetitions associated with a second sounding reference signal resource set;
determining a first power headroom value for the first set of repetitions and a second power headroom value for the second set of repetitions, at least the second power headroom value being determined as a virtual value based at least in part on one of an ordered pair of sets of default transmission power settings;
generating a power headroom report that includes the first power headroom value, the second power headroom value, or both; and
transmitting the power headroom report to the network device.

17. The method of claim 16, wherein each of the sets of default transmission power settings includes one or more of a reference power level value, a reference pathloss compensation value, a reference pathloss value associated with a reference signal, or a reference closed loop index.

18. The method of claim 16, wherein a first of the ordered pair of sets of default transmission power settings is associated with the first sounding reference signal resource set and a second of the ordered pair of sets of default transmission power settings is associated with the second sounding reference signal resource set, the method further comprising:
selecting the second of the ordered pair for generating the second power headroom value as a virtual power headroom value based at least in part on the second sounding reference signal resource set being associated with the virtual value.

19. The method of claim 16, further comprising:
selecting a second of the ordered pair of sets of default transmission power settings as the one of the ordered pair of sets of default transmission power settings based at least in part on the power headroom report including both the first power headroom value and the second power headroom value.

20. The method of claim 16, wherein determining the first power headroom value and the second power headroom value further comprises:
generating the first power headroom value as a virtual power headroom value based at least in part on each of the first set of repetitions being transmitted in a different transmission time interval as the power headroom report.

21. The method of claim 16, wherein generating the power headroom report further comprises:
generating the power headroom report without including the second power headroom value based at least in part on the first power headroom value being virtual.

22. The method of claim 16, wherein determining the first power headroom value and the second power headroom value further comprises:
generating the first power headroom value as an actual power headroom value based at least in part on an uplink transmission repetition of the first set of repetitions being transmitted in a same transmission time interval as the power headroom report.

23. The method of claim 16, wherein transmitting the power headroom report to the network device further comprises:
transmitting, via the power headroom report, one or more bit field values indicating whether the power headroom report comprises the first power headroom value, the second power headroom value, or both.

24. The method of claim 23, wherein generating the power headroom report further comprises:
arranging the first power headroom value and the second power headroom value within the power headroom report based at least in part on an ordering of the first sounding reference signal resource set and the second sounding reference signal resource set, wherein the first power headroom value is first in the power headroom report if the ordering includes the first sounding reference signal resource set before the second sounding reference signal resource set, and wherein the second power headroom value is first in the power headroom report if the ordering includes the second sounding reference signal resource set before the first sounding reference signal resource set.

25. The method of claim 16, further comprising:
transmitting, to the network device, capability signaling indicating that the UE supports one or more power headroom reporting configurations for reporting multiple power headroom values per component carrier, wherein generating the power headroom report is based at least in part on the capability signaling.

26. The method of claim 25, further comprising:
receiving, from the network device, additional control signaling comprising an indication of a power headroom reporting configuration from the one or more power headroom reporting configurations.

27. A method for wireless communication at a network device, comprising:
transmitting, to a user equipment (UE), control signaling scheduling a plurality of uplink transmission repetitions, the plurality of uplink transmission repetitions comprising a first set of repetitions associated with a first sounding reference signal resource set and a second set of repetitions associated with a second sounding reference signal resource set; and
receiving, from the UE, a power headroom report that includes a first power headroom value for the first set of repetitions and a second power headroom value for the second set of repetitions, wherein the second power headroom value is reported as a virtual value based at least in part on one of an ordered pair of sets of default transmission power settings.

28. The method of claim 27, wherein each of the sets of default transmission power settings includes one or more of a reference power level value, a reference pathloss compensation value, a reference pathloss value associated with a reference signal, or a reference closed loop index.

29. The method of claim 27, further comprising:
receiving, from the UE, capability signaling indicating that the UE supports one or more power headroom reporting configurations for reporting multiple power headroom values per component carrier.

30. The method of claim 29, further comprising:
transmitting, to the UE, additional control signaling comprising an indication of a power headroom reporting configuration from the one or more power headroom reporting configurations.

* * * * *